United States Patent [19]

Kobayashi et al.

[11] Patent Number: 5,619,268
[45] Date of Patent: Apr. 8, 1997

[54] MOTION ESTIMATION METHOD AND APPARATUS FOR CALCULATING A MOTION VECTOR

[75] Inventors: Takayuki Kobayashi; David Wuertele; Yutaka Okada, all of Tokyo, Japan

[73] Assignee: Graphics Communication Laboratories, Tokyo, Japan

[21] Appl. No.: 579,760

[22] Filed: Dec. 28, 1995

[30] Foreign Application Priority Data

Jan. 17, 1995 [JP] Japan ................................. 7-004758
May 26, 1995 [JP] Japan ................................. 7-127632

[51] Int. Cl.$^6$ ..................................................... H04N 7/36
[52] U.S. Cl. ........................... 348/416; 348/402; 348/699
[58] Field of Search .................................... 348/402, 416, 348/699

[56] References Cited

U.S. PATENT DOCUMENTS

| | | | |
|---|---|---|---|
| 5,151,784 | 9/1992 | Lavagetto et al. | 348/416 |
| 5,400,087 | 3/1995 | Uramoto et al. | 348/699 |
| 5,421,023 | 5/1995 | Murakami | 395/800 |
| 5,424,779 | 6/1995 | Odaka et al. | 348/416 |
| 5,537,155 | 7/1996 | O'Connell et al. | 348/699 |
| 5,541,661 | 7/1996 | Odaka et al. | 348/416 |

Primary Examiner—Tommy P. Chin
Assistant Examiner—Frank Snow
Attorney, Agent, or Firm—Lane, Aitken & McCann

[57] ABSTRACT

A motion estimation method and a motion estimation apparatus for calculating a motion vector to estimate a current picture partially forming a video sequence on the basis of first and second reference pictures partially forming the video sequence. In the method and apparatus, a reference block included in the first reference picture similar to a current block included in the current picture is specified and multiplied by a first coefficient. By performing a subtraction between the multiplied reference block and the current block, a template block indicative of a difference between the multiplied reference block and the current block is obtained. On the other hand, candidate blocks are calculated by multiplying, by a second coefficient, each reference blocks included in a search window partly forming the second reference picture. Based on the candidate blocks and template block are calculated distortion values each indicative of a difference between the following interpolated blocks and current block. Each of the interpolated blocks is indicative of a mean between the specified reference block of the first reference picture and each reference blocks of the search window.

42 Claims, 50 Drawing Sheets

FIG.5

| a(0,0)<br>-b(0,0)/2 | a(1,0)<br>-b(1,0)/2 |
|---|---|
| a(0,1)<br>-b(0,1)/2 | a(1,1)<br>-b(1,1)/2 |

| c(0,0)/2 | c(1,0)/2 | c(2,0)/2 | c(3,0)/2 |
|---|---|---|---|
| c(0,1)/2 | c(1,1)/2 | c(2,1)/2 | c(3,1)/2 |
| c(0,2)/2 | c(1,2)/2 | c(2,2)/2 | c(3,2)/2 |
| c(0,3)/2 | c(1,3)/2 | c(2,3)/2 | c(3,3)/2 |

| c(x,y)/2 | c(x+1)/2 |
|---|---|
| c(x,y+1)/2 | c(x+1,y+1)/2 |

|  | k | l | m |
|---|---|---|---|
| $I_0$ | D (0,0) | D (1,0) | D (2,0) |
| $I_1$ | D (0,0.5) | D (1,0.5) | D (2,0.5) |
| $I_2$ | D (0,1) | D (1,1) | D (2,1) |
| $I_3$ | D (0,1.5) | D (1,1.5) | D (2,1.5) |
| $I_4$ | D (0,2) | D (1,2) | D (2,2) |
| $I_5$ | D (0.5,0) | D (1.5,0) | |
| $I_6$ | D (0.5,0.5) | D (1.5,0.5) | |
| $I_7$ | D (0.5,1) | D (1.5,1) | |
| $I_8$ | D (0.5,1.5) | D (1.5,1.5) | |
| $I_9$ | D (0.5,2) | D (1.5,2) | |

FIG.28

| b(0,0)/2<br>-a(0,0) | b(1,0)/2<br>-a(1,0) |
|---|---|
| b(0,1)/2<br>-a(0,1) | b(1,1)/2<br>-a(1,1) |

4b

FIG.48
PRIOR ART
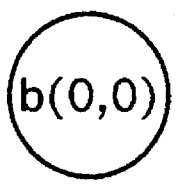 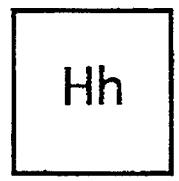 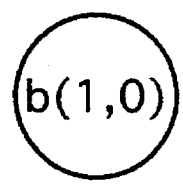
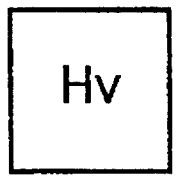 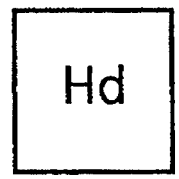
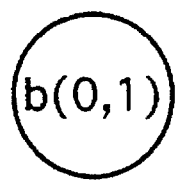 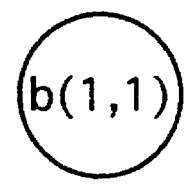

MOTION ESTIMATION METHOD AND APPARATUS FOR CALCULATING A MOTION VECTOR

BACKGROUND OF THE INVENTION

1. Field of the Invention

The present invention relates to motion estimation method and apparatus for calculating a motion vector, and more particularly to method and apparatus for calculating a motion vector to estimate a current picture partially forming a video sequence on the basis of a reference picture partially forming the video sequence.

2. Description of the Prior Art

In the recent years, information transmitting media such as news paper, TV and radio have been flooded with information relative to "multimedia" to which ardent attention is paid by all the world. Although variously interpreted, the term "multimedia" as used herein is considered to be information presented in the combination of text, graphics, video, sound and the like. Since such information is generally handled by a computer, data representative of the video and sound as well as the text and graphics are required to be digitized. When data representative of a video sequence such as a motion picture are digitized, the amount of digitized data is extremely large in comparison with data indicative of sound, text or graphics. For this reason, the data of a motion picture to be handled by the computer are required to be compressed when the data is stored in a storage device or transmitted over a communication line.

Up until now, there have been proposed a wide variety of data compression processes for compressing the data of a motion picture in accordance with a correlation between two pictures (occasionally referred to as frames) partly forming the motion picture. Such a data compression process is applied to a so-called basic inter-frame predicting coding method and a so-called motion compensation inter-frame predicting coding method which will become apparent as this description proceeds.

First, the former basic inter-frame predicting coding method will be described hereinlater with reference to FIG. 43. This method comprises a step of calculating a difference between pel data of each pel (picture element) of a current picture 12 and pel data of each pel of a reference picture 11 corresponding in position to each other, the current picture 12 and the reference picture 11 partially forming a motion picture. The reference picture 11 may be either of feature and past pictures with respect to the current picture 12 upon condition that data indicative of the reference picture 11 have been already encoded. The method further comprises steps of comparing the difference with a predetermined threshold value, and dividing the pel data of the reference picture 11 into two data groups consisting of a significant pel data group having differences each larger than the threshold value and an insignificant pel data group having differences each equal to or less than the threshold value. The significant pel data are considered to be useful data that are not allowed to be omitted when the current picture 12 is estimated on the basis of the reference picture 11. On the contrary, the insignificant pel data are considered to be unnecessary data that are allowed to be omitted when the current picture 12 is estimated on the basis of the reference picture 11.

As shown in FIG. 43, if a person image 10 in the reference picture 11 has been moved right in the current picture 12, there are produced two significant pel data regions by reference numerals of 13 and 14, respectively and an insignificant pel data region indicated by a blank surrounding the significant pel data regions 13 and 14. By adding, to pel data of a pel of the reference picture 11 within the significant pel data regions 13 and 14, a difference between pel data of a pel of current picture 12 and the pel data of the pel of the reference picture 11 corresponding in position to each other, can be estimated the pel data of the pel of the current block picture 12. Pel data of each pel of the current picture 12 within the insignificant pel data region are represented by pel data of a pel of the reference picture 11 corresponding in position to the pel of the current picture 12.

In the case that the basic inter-frame predicting coding method is utilized, the difference data between two pels decrease fast as the significant pel data is fewer. This means that compression efficiency can be enhanced. The number of the significant pel is decreased by setting the threshold value large and as a consequence the compression efficiency can be further enhanced. If, however, the threshold value becomes extremely large, motion of the image looks to be jerky, or moving portion of the image looks to be at a standstill in part, thereby resulting in an drawback of the fact that image quality becomes poor.

In view of the property of the basic inter-frame predicting coding method, the compression efficiency is enhanced under the condition that variation between the current picture and the reference picture is small because of the fact that the difference data are decreased in proportion to the size of standstill image regions of the current picture with respect to the reference picture. The following motion compensation inter-frame predicting coding method, however, realizes higher compression efficiency in comparison with the basic inter-frame predicting coding method.

Likewise, on the assumption that the person image 10 in the reference picture is moved right in the current picture 12, the motion compensation inter-frame predicting coding method is explained hereinafter with reference to FIG. 44. The motion compensation inter-frame predicting coding method comprises a step of calculating a motion vector MV indicating the movement distance and movement direction of the person image 10 between the reference picture 11 and the current picture 12. The motion compensation inter-frame predicting coding method further comprises a step of estimating the person image 10 in the current picture 12 with the aid of the motion vector MV and pel data defining the person image 10 in the reference picture 11. In this case, there is produced only one significant pel data region 13 as shown in FIG. 44. Accordingly, the motion compensation inter-frame predicting coding method is superior to the basic inter-frame predicting coding method in the fact that the number of the significant pels can be sharply decreased and accordingly that the compression efficiency can be extremely enhanced.

The motion compensation inter-frame predicting coding method will be described hereinafter in detail with reference to FIGS. 45 to 47. According to ITU-T (International telecommunication Union-Telecommunication Standardization Sector) H.261, the motion compensation inter-frame predicting coding method comprises steps of dividing a current picture 20 shown in FIG. 45 into a plurality of blocks including a block (referred to hereinlater as a current block) 21, specifying a search window 31 including blocks (referred to hereinlater as candidate blocks) in a reference picture 30, and calculating distortion values each indicative a difference between the current block 21 and each of the candidate blocks. The distortion value is calculated by converting, into positive numbers, local distortion values each indicative of a difference between pel data of each pel of the current block 21 and pel data of each pel of the candidate block corresponding in position to each other, and summing up the converted local distortion values. The motion compensation inter-frame predicting coding method further comprises steps of specifying a candidate block 32 which provides a minimum distortion value, i.e. the smallest in the distortion values calculated in the above mentioned manner, and calculating a motion vector representative of a distance between and a direction defined by the current block 21 and the candidate block 32. By an encoder not shown, are encoded the motion vector MV thus calculated and the distortion value between the candidate block 32 included in the reference picture 30 and the current block 21.

FIGS. 46(a) and 46(b) represent relations between the current block 21, search window 31 and candidate blocks 32. If the current block 21 and the search window 31 contain N columns of M pels and L columns H pels as shown in FIGS. 46(b) and 46(a), respectively. The search window 31 includes (L-M+1)×(H-N+1) candidate blocks 32 similar to the current blocks 21. In the case that pel data of a pel at the top left-hand corner of current block 21 in FIG. 46(b) is indicated by a(0,0), pel data of each of the candidate blocks 32 corresponding in position to the pel data a(0,0) of the current block 21 are included in an area defined by oblique lines in FIG. 46(a).

FIGS. 47(a) and 47(b) represent a relations between pel data of the current block 21 and pel data of each of the candidate block 32 corresponding in position to each other. By b(l+m, h+n) in FIG. 34(a), is indicated pel data of each of the candidate blocks corresponding in position to the pel data a(m, n) of the current block 21 shown in FIG. 47(b). Pel data b(l,h) in the search window 31 shown in FIG. 47(a) is pel data at the upper left-hand corner of the candidate block 32 and accordingly corresponds in position to the pel data a(0, 0) of the current block 21. In the current block 21, search window 31 and candidate block 32 shown in FIGS. 47(a) and 47(b), a distortion value between the current block 21 and the candidate block 32 is indicated by D(l,h) defined as follows:

$$D(l,h) = \sum_{m=0}^{M-1} \sum_{n=0}^{N-1} \|b(m+l, n+h) - a(m,n)\| = \sum_{m=0}^{M-1} \sum_{n=0}^{N-1} \|d(l,h)\|$$

Note that "|| ||" is a notation called the norm and that d(l,h) is defined by an equation, d(l,h)=b(m+l, n+h)−a(m,n), and represents a local distortion value indicative of a difference between pel data of two pels corresponding in position to each other. The norm arithmetic is absolute-value arithmetic, square arithmetic or the like. The above-mentioned process of comparing a block of the current picture with each of blocks of the reference picture in motion compensation inter-frame predicting coding method is so-called as a block matching method, particularly as a full search block matching method if the current block is compared with all the candidate blocks included in the search window.

There has been proposed MPEG (Moving Pictures Experts Group) including MPEG1 and MPEG2 which are supported by ISO/IEC (International Organization for Standardization/International Electrotechnical Commission) 11172-2 and 13818-2, respectively. In MPEG, the pels handled in the foregoing ITU-T H. 261 are referred as integer pels. In addition to the integer pels, the MPEG generates and handles half-pels each interposed between the adjoining integer pels. Four integer pels b(0,0), b(0,1), b(1,0) and b(1,1) are shown in FIG. 48 as forming a matrix array indicated by two columns of two pels. Between and based on the integer pels b(0,0) and b(1,0), the integer pels b(0,0) and b(0,1), and the integer pels b(0,0) and b(1,1), are generated half-pels Hh, Hv and Hd defined as follows:

Hh={b(0,0)+b(1,0)}/2

Hv={b(0,0)+b(0,1)}/2

Hd={b(0,0)+b(1,0)+b(0,1)+b(1,1)}/4

The generation of the half-pels makes it possible to search, from the search window, the candidate blocks horizontally, vertically and diagonally aligned at not one-pel pitches but half-pel pitches in the search window, so that the precision of the motion estimation can be enhanced more and more.

As shown in FIG. 49, the MPEG prepares the motion estimation a bi-directional prediction mode utilizing not only a forward prediction mode wherein the current picture is estimated with reference to the past picture, but also a backward prediction mode wherein the current picture is estimated with reference to the future picture. The implementation results of the forward and backward prediction modes are compared in prediction ability with each other. Between the forward prediction and the backward prediction is chosen one superior to the other. The implementation of the chosen mode is adopted, so that the prediction ability can be enhanced.

The MPEG also prepares the motion estimation a bi-directional interpolation prediction mode wherein the current picture is estimated with reference to an interpolated picture that is representative of a mean between the past picture and the future picture. The bi-directional interpolation prediction mode is used in order to further enhance the prediction ability in comparison with the bi-directional prediction mode.

The interpolated picture is formed depending upon a way which is described hereinafter with reference to FIGS. 50(a) and 50(b). In FIG. 50(a), reference numerals 50, 60 and 70 designate the current picture, a first reference picture previous to the current picture and a second reference picture subsequent to the current picture, respectively. By utilizing the aforementioned motion compensation inter-frame prediction technique, a reference block B included in the first reference picture 60 and most similar to a current block A included in the current picture 50 is specified, thereby obtaining a motion vector MV indicative of a displacement between the reference block B and the current block A. The motion vector MV is scaled with respect to the second reference picture 70 to obtain a scaled vector SV. In this instance, the motion vector MV is identical with the scaled vector SV because of the fact that a time-lag between the current picture 50 and the first reference picture 60 is equal to that between the current picture 50 and the second reference picture 70. Based on the scaled vector SV, a search window 72 partially forming the second reference picture 70 is specified. The search window 72 extends from a pel 71 included in the second reference picture 70 and most close to the end point of the scaled vector SV.

The search window 72 includes a plurality of reference blocks C1, C2 . . . Cn. In accordance with an expression indicated by (B+Cn)/2, interpolated blocks Dn (not shown) each indicative of a mean between the reference block 62 and each of the reference blocks Cn are calculated. The distortion values each indicative of a difference between each of the interpolated blocks Dn and the current block A are calculated by an expression indicated by ||Dn-A||. This means that the number of the distortion values is "n". The minimum distortion value is selected from among the distortion values, and as a consequence a target interpolated block is specified from the interpolated blocks Dn.

The MPEG further prepares the motion estimation a dual-prime prediction mode partly described hereinafter. In FIG. 51, reference numerals 81 and 82 designate a first field and a second field, respectively, of a current picture, while reference numerals 91 and 92 designate a first field and a second filed, respectively, of a reference picture. The current picture has a current block which consists of a field block 81a included in the first field 81 and a field block 82b included in the second field 82. The dual-prime prediction mode comprises a step of applying the aforementioned motion compensation inter-frame prediction to an estimation of the field block 81a with reference to the first field 91 of the reference picture to calculate a field motion vector FV. The field motion vector FV is scaled with respect to the second field 92 of the reference picture to obtain a scaled vector SV1. Assuming that a half-pel of the second field 92 most close to the starting point of the scaled vector SV1 forms the uppermost half-pel 92P of a reference block included in the second field 92, a search window for the motion estimation is formed by nine overlapping field blocks surrounding the half-pel 92. Specifically, the nine field blocks consist of a center reference block including a half-pel 92P as an uppermost pel, and eight field blocks deviated vertically, horizontally and diagonally by half-pel pitch from the center reference block. The dual-prime prediction mode further comprises steps of calculating interpolated blocks each indicative of a mean between the reference block 91a of the first field 91 and each of the nine reference blocks included in the search window, and calculating distortion values each indicative of each interpolated block and the current block 81a. From among the calculated distortion values, the minimum distortion value is selected to obtain a differential motion vector representative of a displacement between the half-pel 92P and the uppermost pel of the reference block of the second field 92 which is used for the calculation of the minimum distortion value. In case that a reference block 92a is used for the calculation of the minimum distortion value, a vector DMV shown in FIG. 51 serves as the differential motion vector.

The field motion vector FV is shifted from the field block 81a to the field block 82b until the endpoint of the field motion vector FV is coincided with the uppermost pel of the field block 82b. The shifted field block FV is denoted by "FV'" in FIG. 51. By the starting point of the field motion vector FV' is specified a field block 92b of the second field 92. The field motion vector FV' is scaled with respect to the first field 91 of the reference picture to obtain a scaled vector SV2 so that a half-pel 91P of the first field 91 most closed to the starting point of the scaled vector SV2 is specified. The differential motion vector DMV is shifted from the half-pel 92P to the half-pel 91P, and consequently a field block 91b is specified. On the basis of the field block 91b and the field block 92b is calculated an interpolated block indicative of a mean between the field block 91b of the first field 91 and the field block 92b. Based on the interpolated block and the current field block 82b, a distortion value indicative of a difference between those blocks is calculated. In case of the dual-prime prediction mode, the field motion vector FV and the differential motion vector DMV serve as motion vectors for the motion estimation.

A drawback is encountered in the motion estimation according to a prior-art bi-directional interpolation prediction in that not only an apparatus or a circuit for performing the motion estimation becomes extremely large but also the motion vector calculation takes extremely long time. The reason is that it is required not only to calculate the distortion values the number of which is equal to that of the candidate blocks Cn included in the search window, but also to calculate the interpolated blocks the number of which is equal to that of the candidate blocks. In addition, the same drawback is encountered in the motion estimation according to a prior-art dual-prime prediction because of the fact that it is required to calculate the interpolated blocks the number of which is equal to that of candidate blocks.

The present invention contemplates provision of a motion estimation method and apparatus overcoming the drawbacks of prior-art motion estimation method and apparatus of the described general nature.

SUMMARY OF THE INVENTION

According to one aspect of the present invention, there is provided a motion estimation method for calculating a motion vector to estimate a current picture partially forming a video sequence on the basis of first and second reference pictures partially forming the video sequence. The current picture is partially formed by a current block including a plurality of pels represented by pel data sets, respectively. The first reference picture is formed by reference blocks each equal in size to the current block. Each of the reference blocks of the first reference picture includes a plurality of pels represented by pel data sets, respectively. The second reference picture is formed by reference blocks each equal in size to the current block. Each of the reference blocks of the second reference picture includes a plurality of pels represented by pel data sets, respectively. The motion vector is indicative of a displacement between the current block and one of the reference blocks of the second reference picture. The method comprises a step (a) of specifying a reference block similar to the current block from among the reference blocks of the first reference picture, a step (b) of multiplying each pel data set of the specified reference block by a first coefficient, a step (c) of obtaining a template block by calculating pel data sets each indicative of a difference between each multiplied pel data set of the specified reference block and each pel data set of the current block corresponding in position to each other, a step (d) of specifying part or the whole of the second reference picture as a search window, and a step (e) of obtaining candidate blocks by multiplying, by a second coefficient, each of the pel data sets of the reference blocks included in the search window, and a step (f) of calculating, on the basis of the pel data sets of each of candidate blocks and the pel data sets of the template block, distortion values each indicative of a difference between each of interpolated blocks and the current block. Each of the interpolated blocks is indicative of a mean between the specified reference block of the first reference picture and each of the reference blocks of the search window. The method further comprises a step (g) of selecting a minimum distortion value from among the distortion values, and a step (h) of specifying a reference block of the second reference picture bringing the minimum distortion value to obtain the motion vector.

According to another aspect of the present invention, there is provided a motion estimation apparatus for calculating a motion vector to estimate a current picture partially forming a video sequence on the basis of first and second reference pictures partially forming the video sequence. The current picture is partially formed by a current block including a plurality of pels represented by pel data sets, respectively. The first reference picture is formed by reference blocks each equal in size to the current block. Each of the reference blocks of the first reference picture includes a plurality of pels represented by pel data sets, respectively.

The second reference picture is formed by reference blocks each equal in size to the current block. Each of the reference blocks of the second reference picture includes a plurality of pels represented by pel data sets, respectively. The motion vector is indicative of a displacement between the current block and one of the reference blocks of the second reference picture. The apparatus comprises block specifying means for specifying a reference block similar to the current block from among the reference blocks of the first reference picture, and template block obtaining means for obtaining a template block by multiplying each pel data set of the specified reference block by a first coefficient and by calculating pel data sets each indicative of a difference between each multiplied pel data set of the specified reference block and each pel data set of the current block corresponding in position to each other. The apparatus further comprises search window specifying means for specifying part or the whole of the second reference picture as a search window, candidate block obtaining means for obtaining candidate blocks by multiplying, by a second coefficient, each of the pel data sets of the reference blocks included in the search window, and distortion calculating means for calculating, on the basis of the pel data sets of each of candidate blocks and the pel data sets of the template block, distortion values each indicative of a difference between each of interpolated blocks and the current block. Each of the interpolated blocks is indicative of a mean between the specified reference block of the first reference picture and each of the reference blocks of the search window. The apparatus further comprises distortion selecting means for selecting a minimum distortion value from among the distortion values, and motion vector calculating means for calculating the motion vector by specifying a reference block of the second reference picture bringing the minimum distortion value.

According to a further aspect of the present invention, there is provided a motion estimation apparatus for calculating a motion vector to estimate a current picture partially forming a video sequence on the basis of first and second reference pictures partially forming the video sequence. The current picture is partially formed by a current block including a plurality of pels represented by pel data sets, respectively. The first reference picture is formed by reference blocks each equal in size to the current block. Each of the reference blocks of the first reference picture includes a plurality of pels represented by pel data sets, respectively. The second reference picture is formed by reference blocks each equal in size to the current block. Each of the reference blocks of the second reference picture includes a plurality of pels represented by pel data sets, respectively. The motion vector is indicative of a displacement between the current block and one of the reference blocks of the second reference picture. The apparatus comprises block specifying means for specifying a reference block similar to the current block from among the reference blocks of the first reference picture provisional template block obtaining means for obtaining a provisional template block by multiplying each pel data set of the specified reference block by a first coefficient and by subtracting the multiplied pel data sets of the specified reference block from the pel data sets of the current block, respectively, and first selecting means for selecting one from the current block and the provisional template block and outputting the selected current block as a template block. The apparatus further comprises search window specifying means for specifying part or the whole of the second reference picture as a search window, provisional candidate block obtaining means for obtaining provisional candidate blocks by multiplying, by a second coefficient, each pel data set of the reference blocks included in the search window, and second selecting means for selecting one from a group of the reference blocks and a group of the provisional candidate blocks and outputting the selected reference blocks as candidate blocks. The reference blocks is selected when the current blocks are selected by the provisional template block obtaining means. The provisional candidate blocks are selected when the provisional template blocks are selected by the provisional template block obtaining means. The apparatus further comprises distortion calculating means for calculating, on the basis of the pel data sets of each of candidate blocks and the pel data sets of the template block, distortion values each indicative of a difference between each of interpolated blocks and the current block. Each of the interpolated blocks is indicative of a mean between the specified reference block of the first reference picture and each of the reference blocks of the search window. The apparatus further comprises distortion selecting means for selecting a minimum distortion value from among the distortion values, and motion vector calculating means for calculating the motion vector by specifying a reference block of the second reference picture bringing the minimum distortion value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a diagram showing a template block;

FIG. 6(a) is a diagram showing pels of the search window multiplied by "½";

FIG. 6(b) is diagram showing one of candidate blocks;

FIG. 25 is a table for explaining the order of distortion values supplied to data input terminals of a selector shown in FIG. 11;

FIG. 28 is a diagram showing a template block obtained by template block obtaining means shown in FIG. 26;

FIG. 48 is a diagram for explaining half-pels interposed between adjoining integer pels;

DESCRIPTION OF THE PREFERRED EMBODIMENTS

Referring now to FIGS. 1 to 25 of the accompanying drawings, a preferred first embodiment of the motion estimation apparatus according to the present invention will be described hereinafter in detail. The motion estimation apparatus is designed to calculate a motion vector to estimate a current picture Pa shown in FIG. 1(a) on the basis of first and second reference pictures Pb and Pc shown in FIGS. 1(b) and 1(c), respectively. The current picture Pa and the first and second reference pictures Pb and Pc partially form a video sequence. The current picture Pa is partially formed by a current block 1 including a plurality of integer pels represented by pel data sets, respectively. The first reference picture Pb is formed by reference blocks including a reference block 2. Each of the reference blocks of the first reference picture Pb is equal in size to the current block 1 and includes a plurality of integer pels represented by pel data sets, respectively. The second reference picture Pc is formed by reference blocks. Each of the reference blocks of the second reference picture Pc is equal in size to the current block Pa and includes a plurality of integer pels represented by pel data sets, respectively. The motion vector is indicative of a displacement between the current block 1 and a selected reference block of the second reference picture Pc. The selected reference block will become apparent as the description proceeds.

Figure 2:
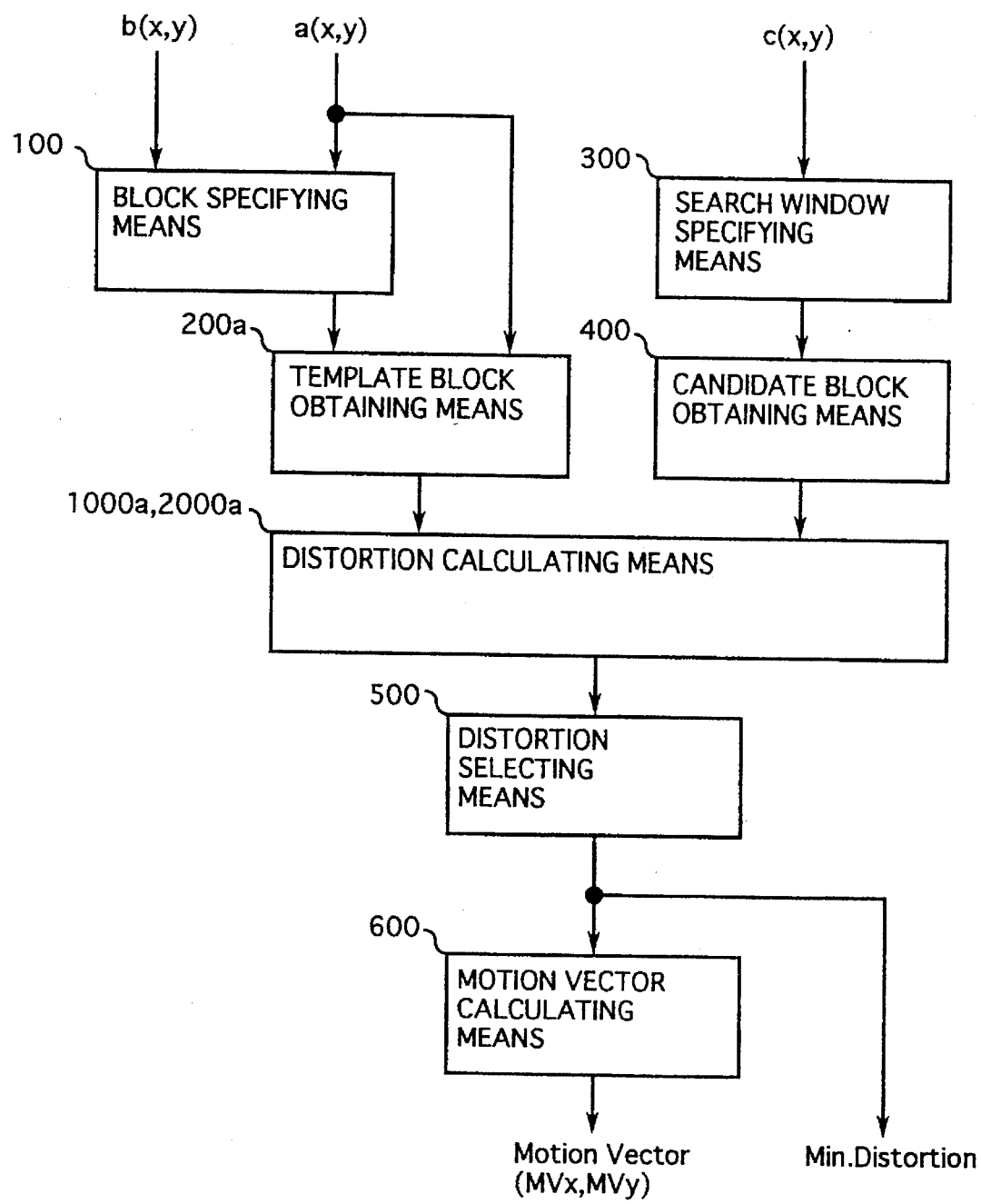
FIG. 2 is a block diagram showing a first embodiment of a motion estimation apparatus according to the present invention.

The motion estimation apparatus is shown in FIG. 2 as comprising block specifying means 100, template block obtaining means 200a, search window specifying means 300, candidate block obtaining means 400, distortion calculating means 1000a, distortion selecting means 500 and motion vector calculating means 600.

Figure 1A:
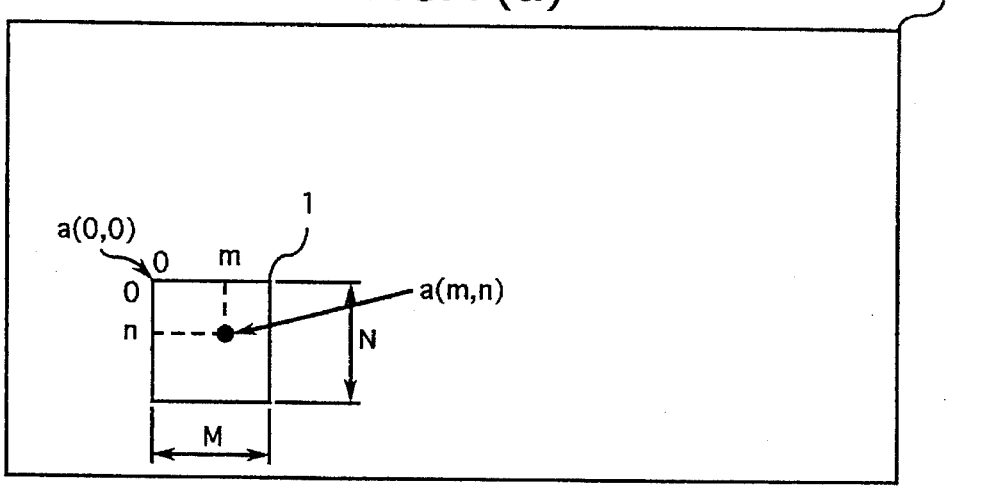
FIG. 1(a) is a diagram showing a current picture including a current block.
Figure 1B:
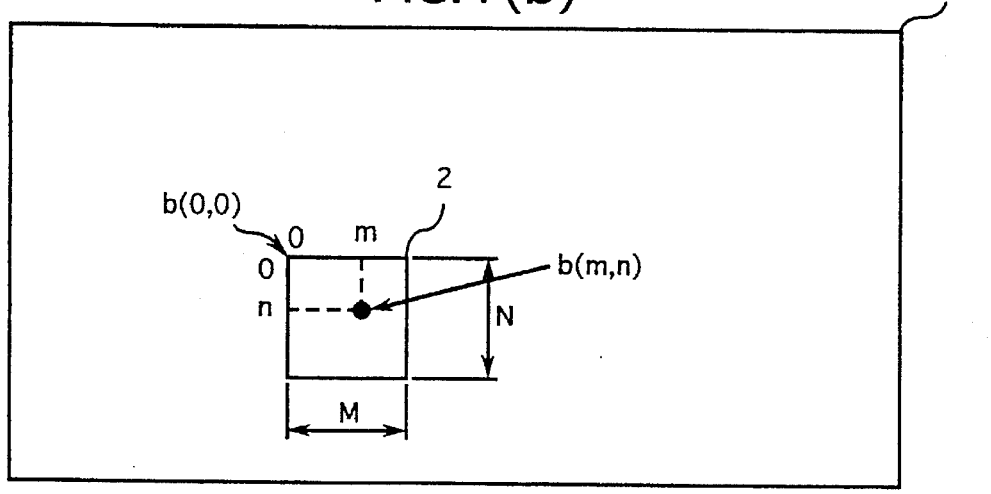
FIG. 1(b) is a diagram showing a first reference picture including a reference block.
Figure 1C:
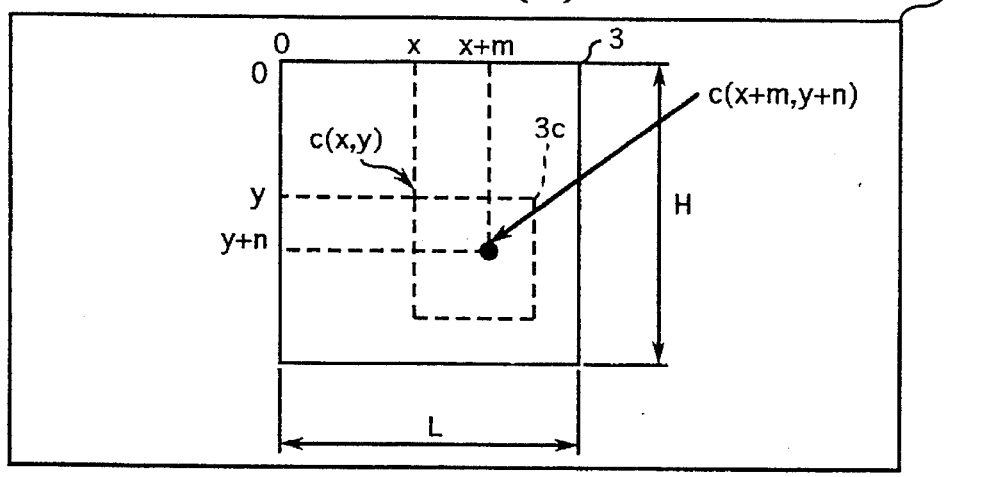
FIG. 1(c) is a diagram showing a second reference picture including a search window.
Figure 45:
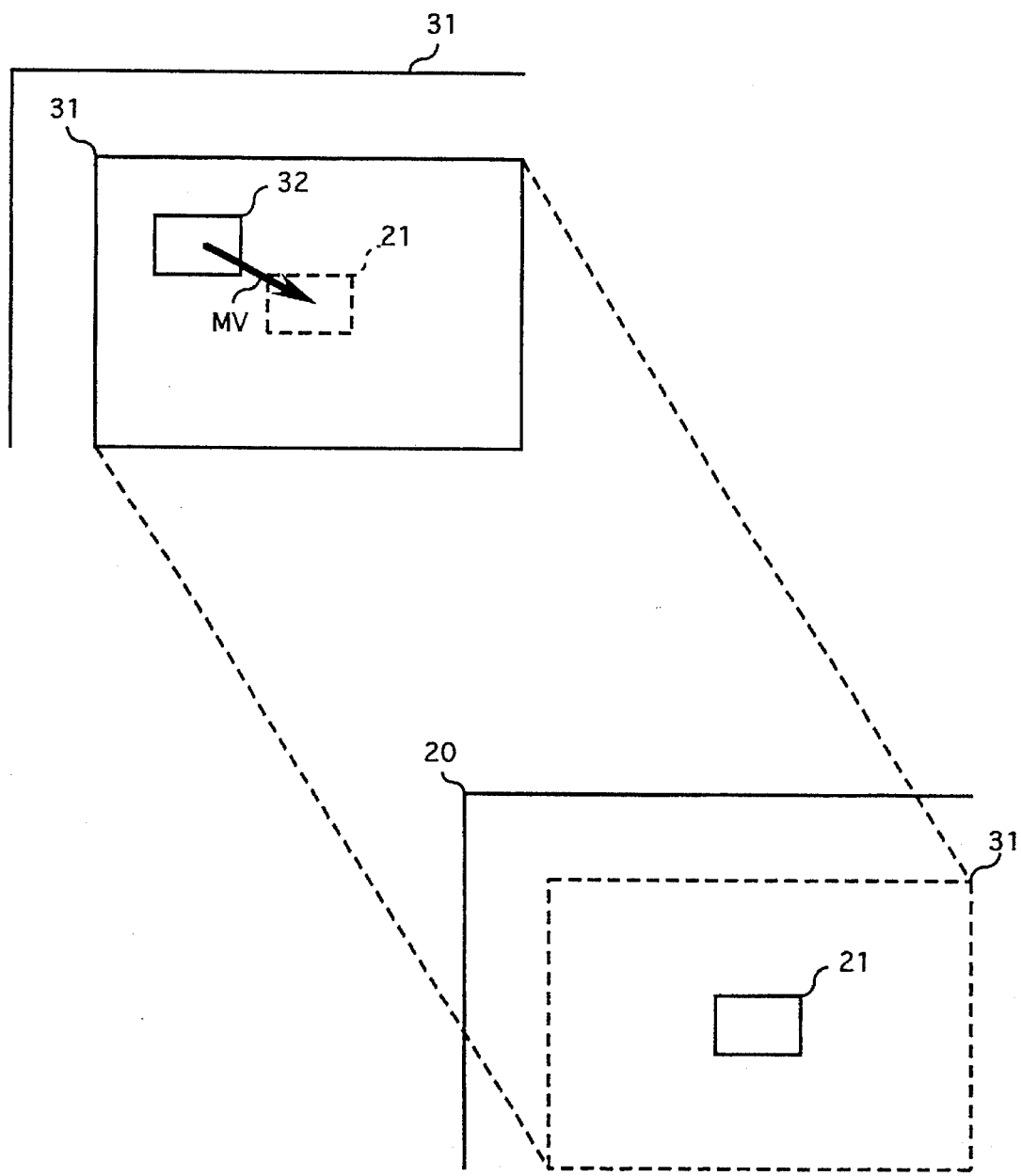
FIG. 45 is a diagram for explaining a motion vector calculated through the conventional motion compensation inter-frame predicting coding method.
Figure 46A:
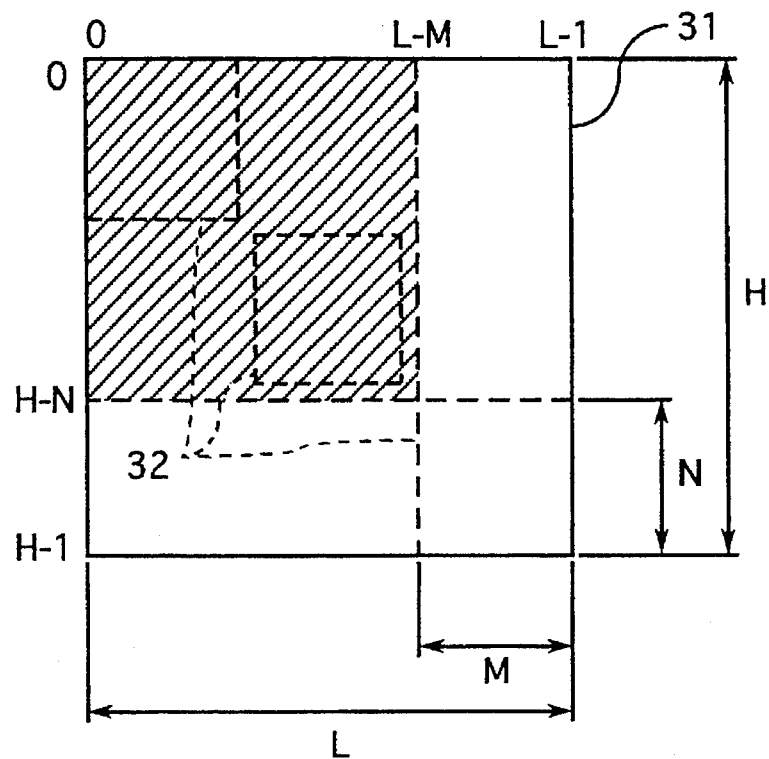
FIGS. 46(a) and 46(b) are diagrams for explaining a search window and a current block.
Figure 46B:
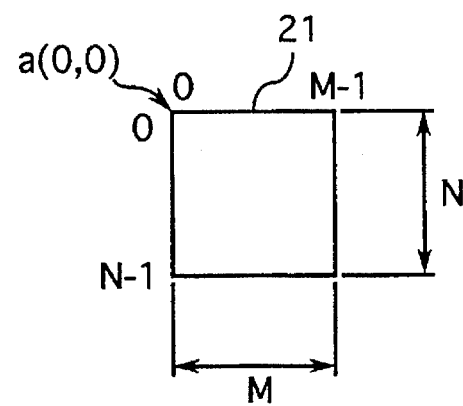
Figure 47A:
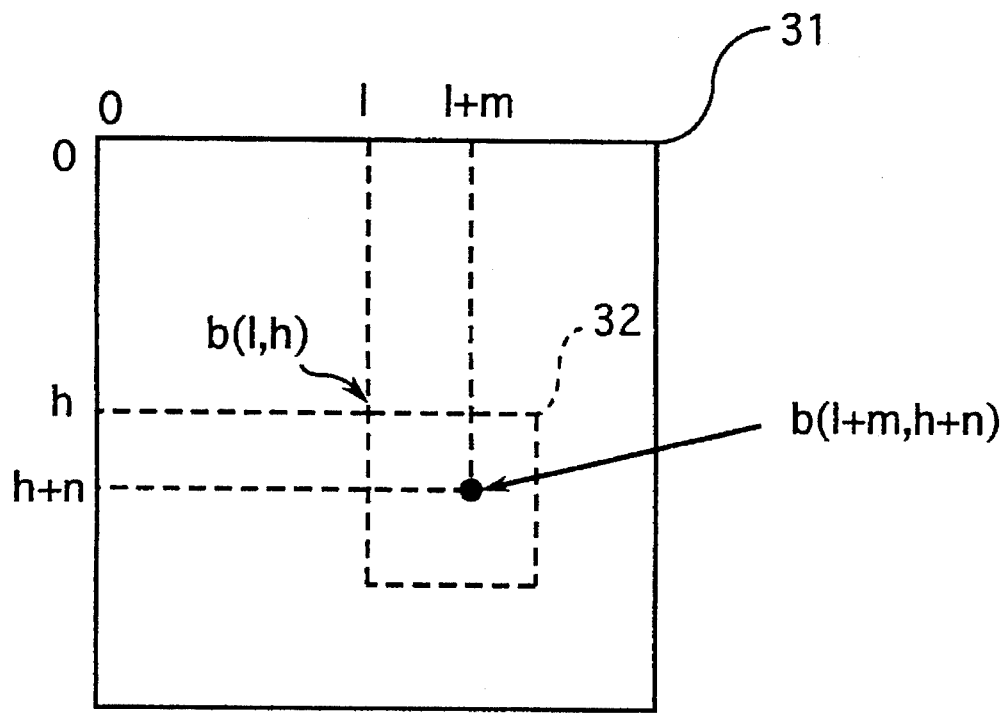
FIGS. 47(a) and 47(b) are diagrams for explaining relations between a pel of a current block and a pel of each of candidate blocks corresponding in position to each other.
Figure 47B:
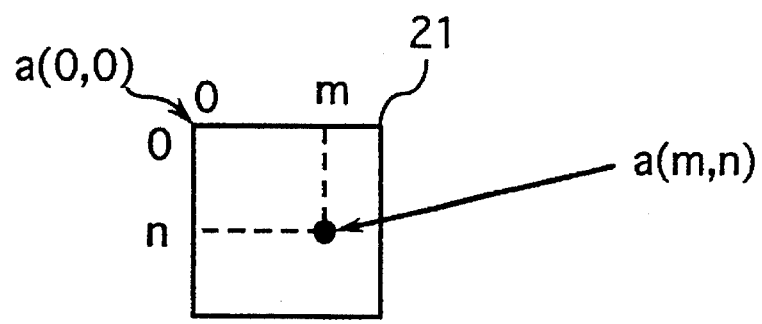
Figure 49:
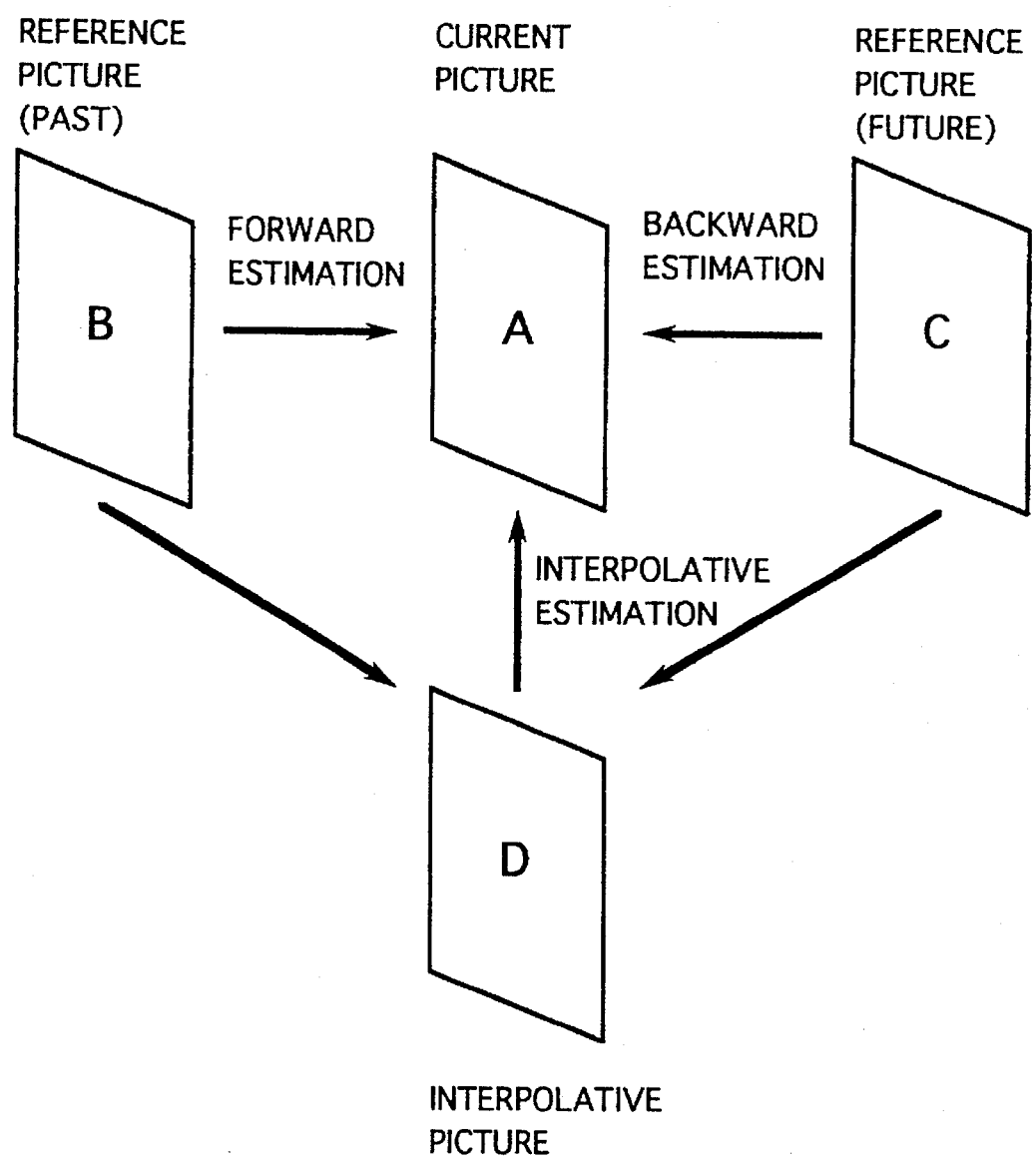
FIG. 49 is a diagram for explaining a conventional bi-directional predicting coding method and a conventional bi-directional interpolation predicting coding method.
Figure 50A:
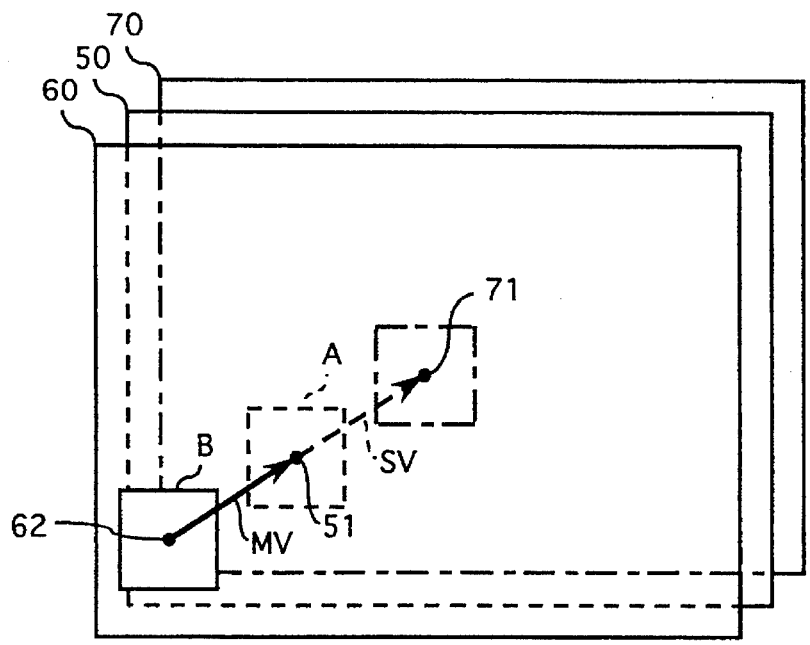
FIGS. 50(a) and 50(b) are diagrams for further explaining bi-directional interpolation predicting coding method.
Figure 50B:
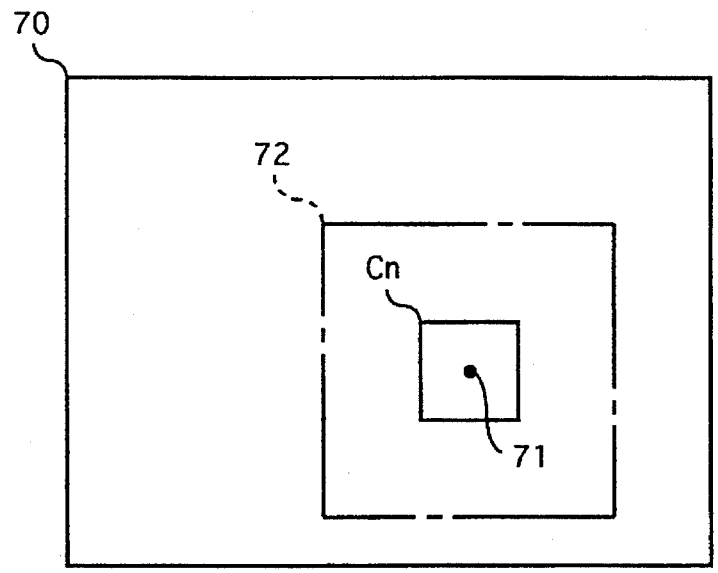
Figure 51:
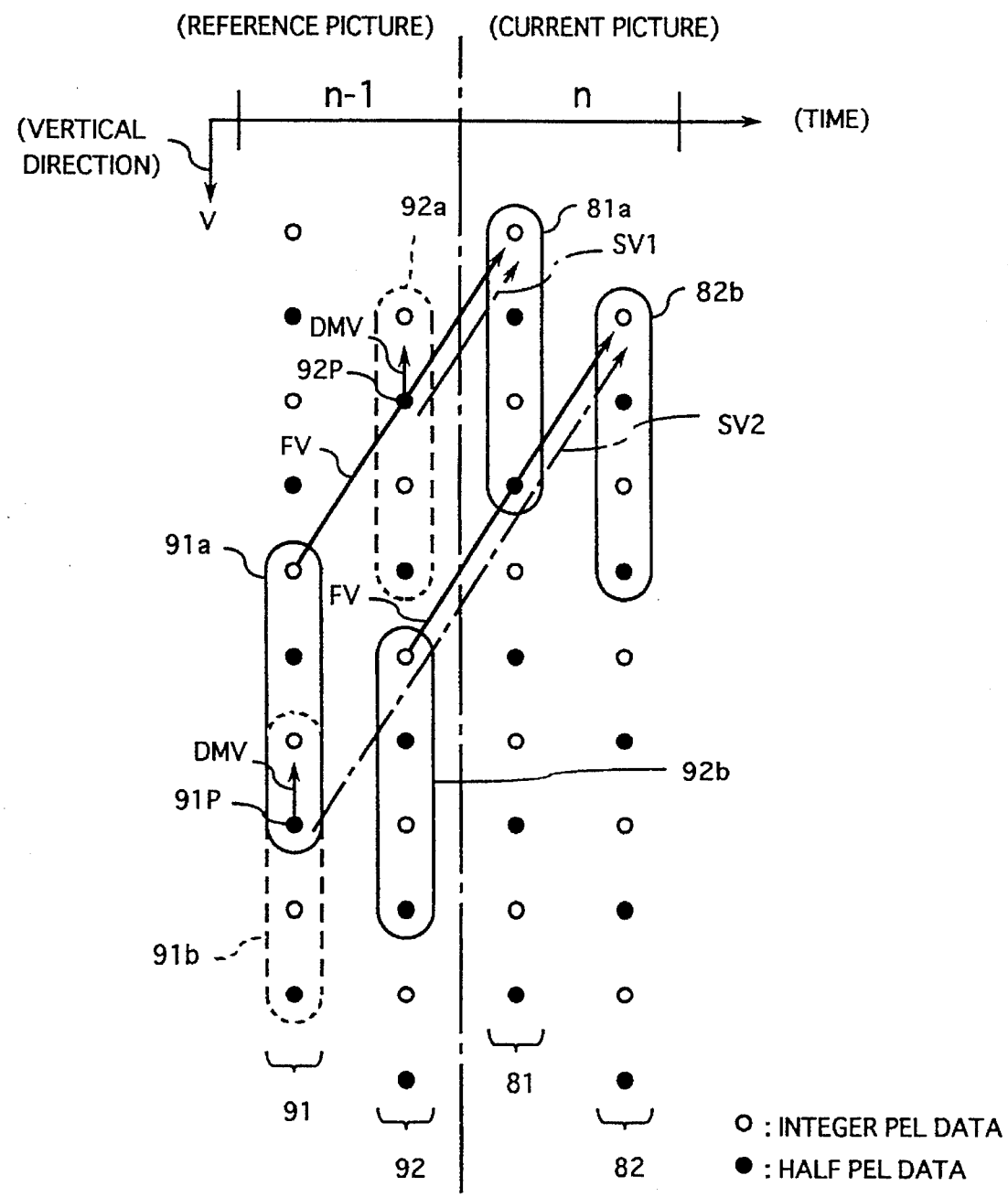
FIG. 51 is a diagram for explaining dual-prime predicting coding method.

The block specifying means 100 is operated to specify one most similar to the current block 1 from among the reference blocks of the first reference picture Pb and to output integer pel data sets of the specified reference block. It is assumed that the specified reference block is the reference block 2 and that the pel data sets of the current block 1 and the reference block 2 are represented by a(m,n)

and b(m,n), respectively, as shown in FIGS. 1(a) and 1(b). The specifying operation may be carried out by using of a motion compensation inter-frame predictive coding algorithm described hereinbefore with reference to FIGS. 45 through 47.

The template block obtaining means 200a is operated to receive the integer pel data sets b(m,n) of the reference block 2 from the block specifying means 100 and subsequently to multiply each of the integer pel data sets b(m,n) by a first coefficient E. The template block obtaining means 200a is further operated to calculate a difference between each of the pel data sets a(m,n) of the current block 1 and each of the multiplied data sets b(m,n)×E corresponding in position to each other by subtracting each of the pel data sets b(m,n)×E from the each of the pel data sets a(m,n). Therefore, the difference is a(m,n)−b(m,n)×E.

The search window specifying means 300 is operated to specify part or the whole of the second reference picture Pc as the search window. It is assumed that the specified search window is a search window denoted by reference numeral 3 in FIG. 3. Preferably, the search window 3 may be specified on the basis of a displacement between the current block 1 and the specified reference block 2. More specifically, the search window specifying means 300 is operated to calculate a motion vector indicative of the displacement between the current block 1 and the specified reference block 2, and scaling the motion vector with respect to the second reference picture Pc to obtain a point on the second reference picture Pc The search window 3 is specified so as to include and extending from the obtained point. The search window 3 includes part of the reference blocks of the second reference picture Pc. Each of the reference blocks included in the search window 3 are designated by reference numeral 3c and is represented by integer pels respectively having pel data sets c(x+m,y+n).

The candidate block obtaining means 400 is operated to receive the pel data sets c(x+m,y+n) of each of the reference blocks 3c from the search window specifying means 300 and to multiply each of the pel data sets c(x+m,y+n) by a second coefficient F, for obtaining candidate blocks. This means that each of the candidate blocks has the pel data sets c(x+m,y+n)×F.

The distortion calculating means 1000a is operated to calculate distortion values each indicative of a difference between the current block 1 and each of interpolated blocks by subtracting each pel data set a(m,n)−b(m,n)×E of the template block from each pel data set c(x+m,y+n)×F of each of the candidate blocks, converting the subtracted data sets to positive data sets, and summing up the positive data sets in one block unit for calculating distortion values each indicative of a difference between each of the interpolated blocks and the current block 1.

The distortion selecting means 500 is operated to select the minimum distortion value from among the distortion values calculated by the distortion calculating means 1000a.

The motion vector calculating means 600 is operated to calculate the motion vector by specifying one of reference blocks 3c included in the search window 3. The specified reference block of the search window 3 defines, in cooperation with the specified reference block 2 of the first reference picture Pb, the interpolated block bringing the minimum distortion value selected by the distortion selecting means 500.

Figure 3:
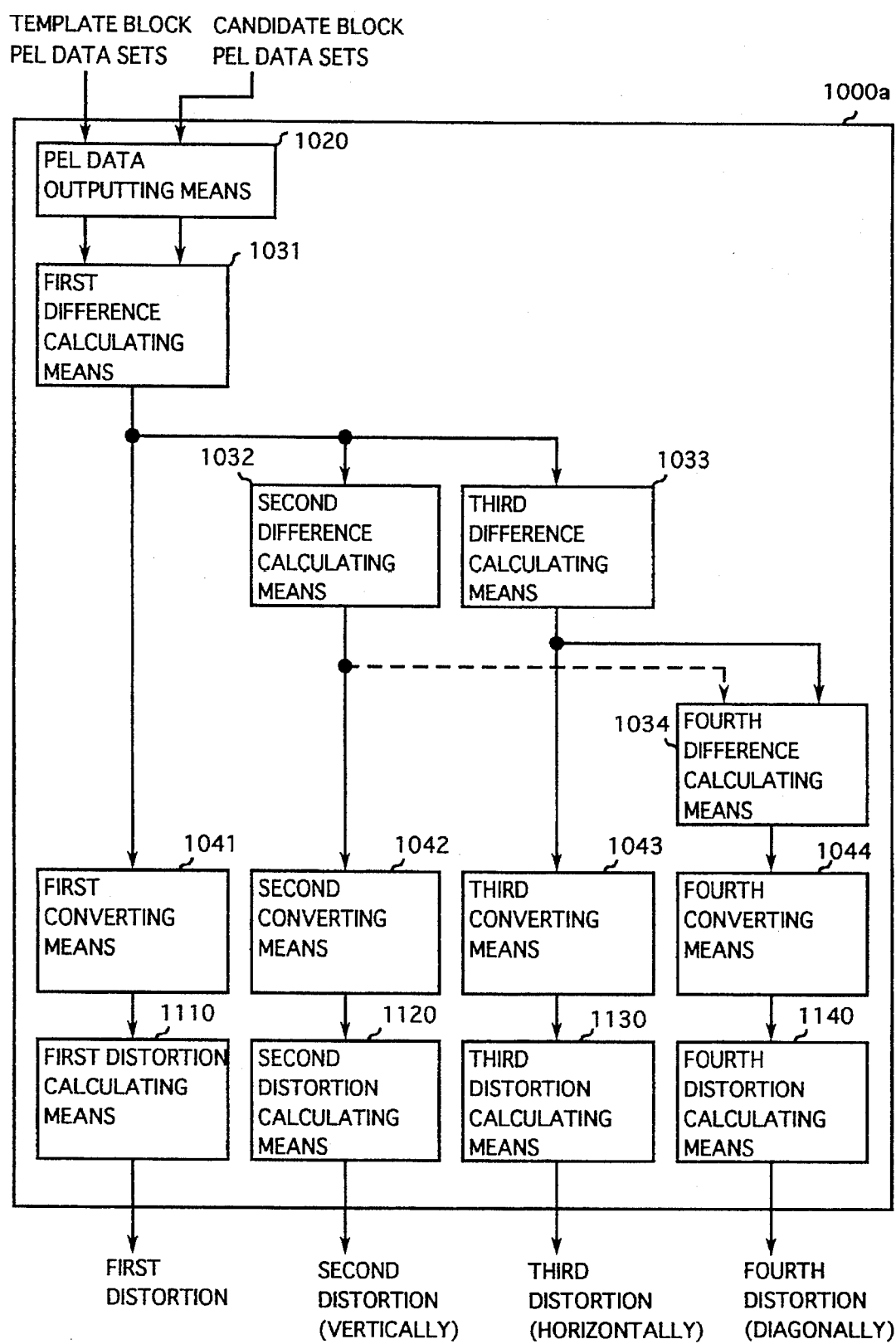
FIG. 3 is a block diagram showing distortion calculating means show in FIG. 2.

AS shown in FIG. 3, the distortion calculating means 1000a comprises pel data outputting means 1020, first difference calculating means 1031, second difference calculating means 1032, third difference calculating means 1033, fourth difference calculating means 1034, first converting means 1041, a second converting means 1042, a third converting means 1043, fourth converting means 1044, first distortion calculating means 1110, second distortion calculating means 1120, third distortion calculating means 1130 and fourth distortion calculating means 1140. Before the functions of the means included in the distortion calculating means 1000a are explained, the candidate blocks will be described hereinafter in detail. In the present embodiment, the candidate blocks consist of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks. The first candidate blocks are formed by integer pels, the second, third and fourth candidate blocks are formed by half-pels interposed between two of integer pels adjacent to each other. The integer pels of the first candidate blocks are represented by integer pel data sets, respectively, the half pels of each of the second, third and fourth candidate blocks are represented by half pel data sets, respectively. Therefore, the distortion values consist of first distortion values based on the first candidate blocks, second distortion values based on the second candidate blocks, respectively, third distortion values based on the third candidate blocks, respectively, and fourth distortion values based on the fourth candidate blocks, respectively.

The pel data outputting means 1020 is operated to receive the integer pel data sets a(m,n)−b(m,n)×E of the template block from the template block data calculating means 200a and the integer pel data sets c(x+m,y+n)×F of the first candidate block from the candidate block data calculating means 400. The pel data outputting means 1020 is further operated to output a pair of the integer pel data sets of the template block and the candidate block corresponding in position to each other to the first difference data calculating means 1031.

The first difference data calculating means 1031 is operated to subtract the pel data sets a(m,n)−b(m,n)×E of the template block from the pel data sets c(x+m,y+n)×F of each candidate block, for calculating first difference data sets {c(x+m,y+n)×F}−{a(m,n)−b(m,n)×E}.

The first converting means 1041 is operated to convert the first difference data sets to positive data sets |{c(x+m,y+n)×F}−{a(m,n)−b(m,n)×E}|. The first distortion calculating means 1110 is operated to calculate the sum of the converted first difference data sets based on each of the candidate blocks to obtain each of the first distortion values.

Since each of the first distortion values is indicative of a difference between each first interpolated block and the current block 1, each of the first distortion values is defined by:

$$D(x,y) = \sum_{m=0}^{M-1} \sum_{n=0}^{N-1} \| [c(x+m,y+n) \times F + b(m,n) \times E] - a(m,n) \| \quad \text{E1}$$

The positive data summed up by the first distortion calculating means 1110 is represented by:

$$\sum_{m=0}^{M-1} \sum_{n=0}^{N-1} \|\{c(x+m,y+n) \times F\} - \{a(m,n) - b(m,n) \times E\}\| \quad \text{(E1')}$$

and transformed into data represented by:

$$\sum_{m=0}^{M-1}\sum_{n=0}^{N-1} \|\{c(x+m,y+n)\times F + b(m,n)\times E\} - a(m,n)\| \quad (E1'')$$

The expression (E1") is identical with the right-hand side of the equation (E1), and as a consequence the first distortion values each indicative of a difference between the current block 1 and each of first interpolated blocks are calculated by the first distortion calculating means 1110.

The second difference data calculating means 1032 is operated to calculate the sum of two of the first difference data sets $\{c(x+m,y+n)\times F\}-\{a(m,n)-b(m,n)\times E\}$ and $\{c(x+m,y+1+n)\times F\}-\{a(m,n)-b(m,n)\times E\}$ vertically deviated by half-pel pitch from each other and multiply the sum by ½ to obtain second difference data sets $[\{c(x+m,y+n)\times F\}-\{a(m,n)-b(m,n)\times E\}+\{c(x+m,y+1+n)\times F\}-\{a(m,n)-b(m,n)\times E\}]/2$. The second converting means 1042 is operated to convert the second difference data sets to positive data sets $|[\{c(x+m,y+n)\times F\}-\{a(m,n)-b(m,n)\times E\}+\{c(x+m,y+1+n)\times F\}-\{a(m,n)-b(m,n)\times E\}]/2|$. The second distortion calculating means 1120 is operated to calculate the sum of the converted second difference data sets based on each of the candidate blocks to obtain each of the second distortion values.

Since each of the second distortion values is indicative of a difference between each second interpolated block and the current block 1, each of the second distortion values is defined by:

$$D(x,y+1/2) = \sum_{m=0}^{M-1}\sum_{n=0}^{N-1} \|[\{c(x+m,y+n)\times F + \quad (E2)$$

$$c(x+m,y+1+n)\times F\}/2 + b(m,n)\times E] - a(m,n)\|$$

The positive data summed up by the second distortion calculating means 1120 is represented by:

$$\sum_{m=0}^{M-1}\sum_{n=0}^{N-1} \|\{c(x+m,y+n)\times F + \quad (E2')$$

$$c(x+m,y+1+n)\times F\}/2 - \{a(m,n) - b(m,n)\times E\}\|$$

and transformed into data represented by:

$$\sum_{nm=0}^{M-1}\sum_{n=0}^{N-1} \|[\{c(x+m,y+n)\times F + \quad (E2'')$$

$$c(x+m,y+1+n)\times F\}/2 + b(m,n)\times E] - a(m,n)\|$$

The expression (E1") is identical with the right-hand side of the equation (E2) and as a consequence the second distortion values each indicative of a difference between the current block 1 and each of second interpolated blocks are calculated by the second distortion calculating means 1120.

The third difference data calculating means 1033 is operated to calculate the sum of two of the first difference data sets $\{c(x+m,y+n)\times F\}-\{a(m,n)-b(m,n)\times E\}$ and $\{c(x+1+m,y+n)\times F\}-\{a(m,n)-b(m,n)\times E\}$ horizontally deviated by half-pel pitch from each other and multiply the sum by ½ to obtain third difference data sets $[\{c(x+m,y+n)\times F\}-\{a(m,n)-b(m,n)\times E\}+\{c(x+1+m,y+n)\times F\}-\{a(m,n)-b(m,n)\times E\}]/2$. The third converting means 1043 is designed to convert the third difference data sets to positive data sets $|[\{c(x+m,y+n)\times F\}-\{a(m,n)-b(m,n)\times E\}+\{c(x+1+m,y+n)\times F\}-\{a(m,n)-b(m,n)\times E\}]/2|$. The third distortion calculating means 1130 is designed to calculate the sum of the converted third difference data sets based on each of the candidate blocks 6 to obtain each of the third distortion values.

Since each of the third distortion values is indicative of a difference between each third interpolated block and the current block 1, each of the third distortion values is defined by:

$$D(x,y+1/2,y) = \sum_{m=0}^{M-1}\sum_{n=0}^{N-1} \|[\{c(x+m,y+n)\times F + \quad (E3)$$

$$c(x+m,y+1+n)\times F\}/2 + b(m,n)\times E] - a(m,n)\|$$

The positive data summed up by the third distortion calculating means 1130 is represented by:

$$\sum_{m=0}^{M-1}\sum_{n=0}^{N-1} \|\{c(x+m,y+n)\times F + \quad (E3')$$

$$c(x+m,y+1+n)\times F\}/2 - \{a(m,n) - b(m,n)\times E\}\|$$

and transformed into data represented by:

$$\sum_{nm=0}^{M-1}\sum_{n=0}^{N-1} \|[\{c(x+m,y+n)\times F + \quad (E3'')$$

$$c(x+m,y+1+n)\times F\}/2 + b(m,n)\times E] - a(m,n)\|$$

The expression (E3") is identical with the right-hand side of the equation (E3) and as a consequence the third distortion values each indicative of a difference between the current block 1 and each of the third interpolated blocks are calculated by the third distortion calculating means 1130.

The fourth difference data calculating means 1034 is operated to calculate the sum of two of the third difference data sets $[\{c(x+m,y+n)\times F\}-\{a(m,n)-b(m,n)\times E\}+\{c(x+1+m,y+n)\times F\}-\{a(m,n)-b(m,n)\times E\}]/2$ and $[\{c(x+m,y+1+n)\times F\}-\{a(m,n)-b(m,n)\times E\}+\{c(x+1+m,y+1+n)\times F\}-\{a(m,n)-b(m,n)\times E\}]/2$ vertically deviated by half-pel pitch from each other and multiply the sum by ½ to obtain fourth difference data sets $[[\{c(x+m,y+n)\times F\}-\{a(m,n)-b(m,n)\times E\}+\{c(x+1+m,y+n)\times F\}-\{a(m,n)-b(m,n)\times E\}]/2+[\{c(x+m,y+1+n)\times F\}-\{a(m,n)-b(m,n)\times E\}+\{c(x+1+m,y+1+n)\times F\}-\{a(m,n)-b(m,n)\times E\}]/2]/2$. The fourth converting means 1044 is operated to convert the fourth difference data sets to positive data sets $|[[\{c(x+m,y+n)\times F\}-\{a(m,n)-b(m,n)\times E\}+\{c(x+1+m,y+n)\times F\}-\{a(m,n)-b(m,n)\times E\}]/2+[\{c(x+m,y+1+n)\times F\}-\{a(m,n)-b(m,n)\times E\}+\{c(x+1+m,y+1+n)\times F\}-\{a(m,n)-b(m,n)\times E\}]/2]/2|$. The fourth distortion calculating means 1140 is designed to calculate the sum of the converted fourth difference data sets based on each of the candidate blocks to obtain each of the fourth distortion values.

Since each of the fourth distortion values is indicative of a difference between each fourth interpolated block and the current block 1, each of the fourth distortion values is defined by:

$$D(x+1/2,y+1/2) = \sum_{m=0}^{M-1}\sum_{n=0}^{N-1} \|[\{c(x+m,y+n)\times \quad (E4)$$

$$F + c(x+m,y+1+n)\times F + c(x+1+m,y+n)\times F +$$

$$c(x+1+m,y+1+n)\times F\}/4 + b(m,n)\times E] - a(m,n)\|$$

The positive data summed up by the fourth distortion calculating means 1130 is represented by:

$$\sum_{m=0}^{M-1}\sum_{n=0}^{N-1} \|\{c(x+m,y+n)\times F + \quad (E4')$$

$$c(x+m,y+1+n)\times F + c(x+1+m,y+n)\times F +$$

$$c(x+1+m,y+1+n)\times F\}/4 - \{a(m,n) - b(m,n)\times E\}\|$$

and transformed into data represented by:

$$\sum_{m=0}^{M-1}\sum_{n=0}^{N-1} \|[\{c(x+m,y+n)\times F + \quad (E4'')$$

$$c(x+m,y+1+n)\times F + c(x+1+m,y+n)\times F +$$

$$c(x+1+m,y+1+n)\times F\}/4 + b(m,n)\times E] - a(m,n)\|$$

The expression (E4") is identical with the right-hand side of the equation (E4) and as a consequence the fourth distortion values each indicative of a difference between the current block 1 and each of the fourth interpolated blocks are calculated by the fourth distortion calculating means 1140.

Figure 4A:
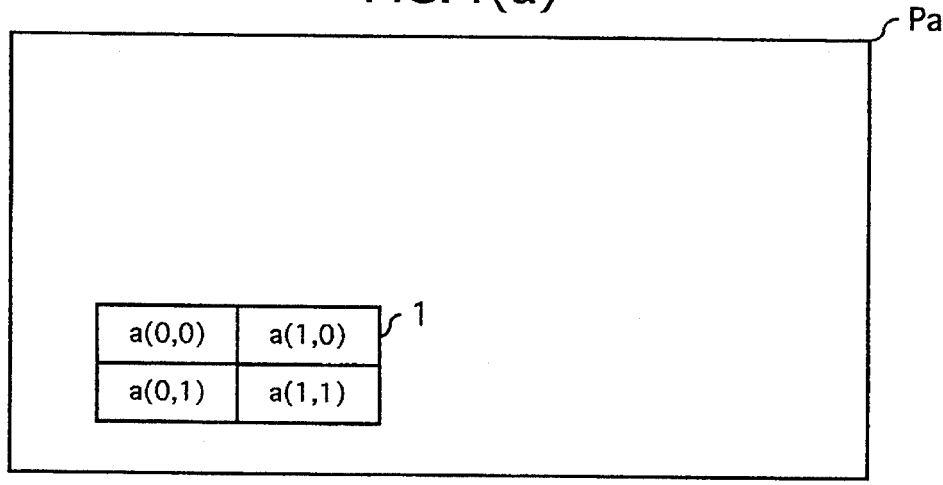
FIG. 4(a) is a diagram concretely showing the current block shown in FIG. 1(a)
Figure 4B:
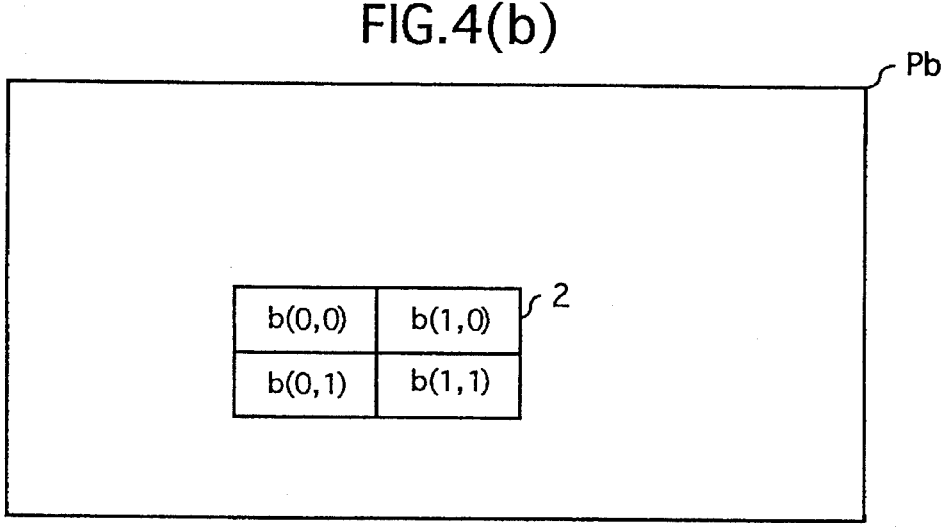
FIG. 4(b) is a diagram concretely showing the reference block of the first reference picture shown in FIG. 1(b)
Figure 4C:
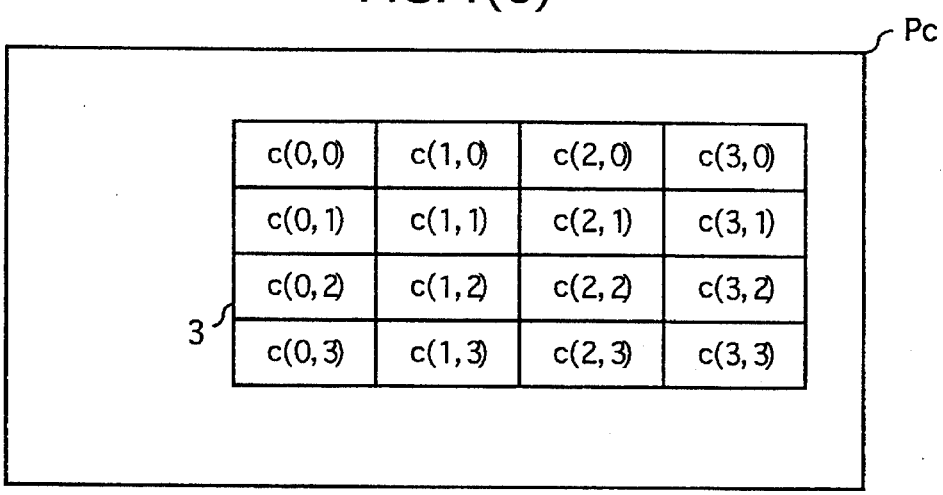
FIG. 4(c) is a diagram concretely showing the search window of the second reference picture shown in FIG. 1(c)

The aforementioned motion estimation apparatus will be described hereinafter in the concrete. The current picture Pa, the first reference picture Pb and the second reference picture Pc are shown in FIGS. 4(a), 4(b) and 4(c) as including the current block 1, the specified reference block 2 and the search window 3, respectively, shown in the concrete. It is assumed in the present embodiment that both M and N are set to "2" and that both L and H are set to "4". In addition, it is assumed in the present embodiment that the first and second coefficient are set to "½". The integer pels of the current block i are represented by integer pel data sets indicated by a(0,0), a(0,1), a(1,0) and a(1,1), respectively, as shown in FIG. 4(a). The integer pels of the reference block 2 are represented by integer pel data sets indicated by b(0,0), b(0,1), b(1,0) and b(1,1), respectively, as shown in FIG. 4(b). In this instance, the template block 4a is shown in FIG. 5. The integer pels of the search window 3 are represented by integer pel data sets indicated by c(0,0), c(0,1), c(0,2), c(0,3), c(1,0), c(1,1), c(1,2), c(1,3), c(2,0), c(2,1), c(2,2), c(2,3), c(3,0), c(3,1), c(3,2) and c(3,3), respectively, as shown in FIG. 4(c). In this case, the data sets of the search window 3 multiplied by the second coefficient F(=½) are shown within a window denoted by "3" in FIG. 6(a) and thus each of the candidate blocks is designated by "6" in FIG. 6(b).

Figure 7:
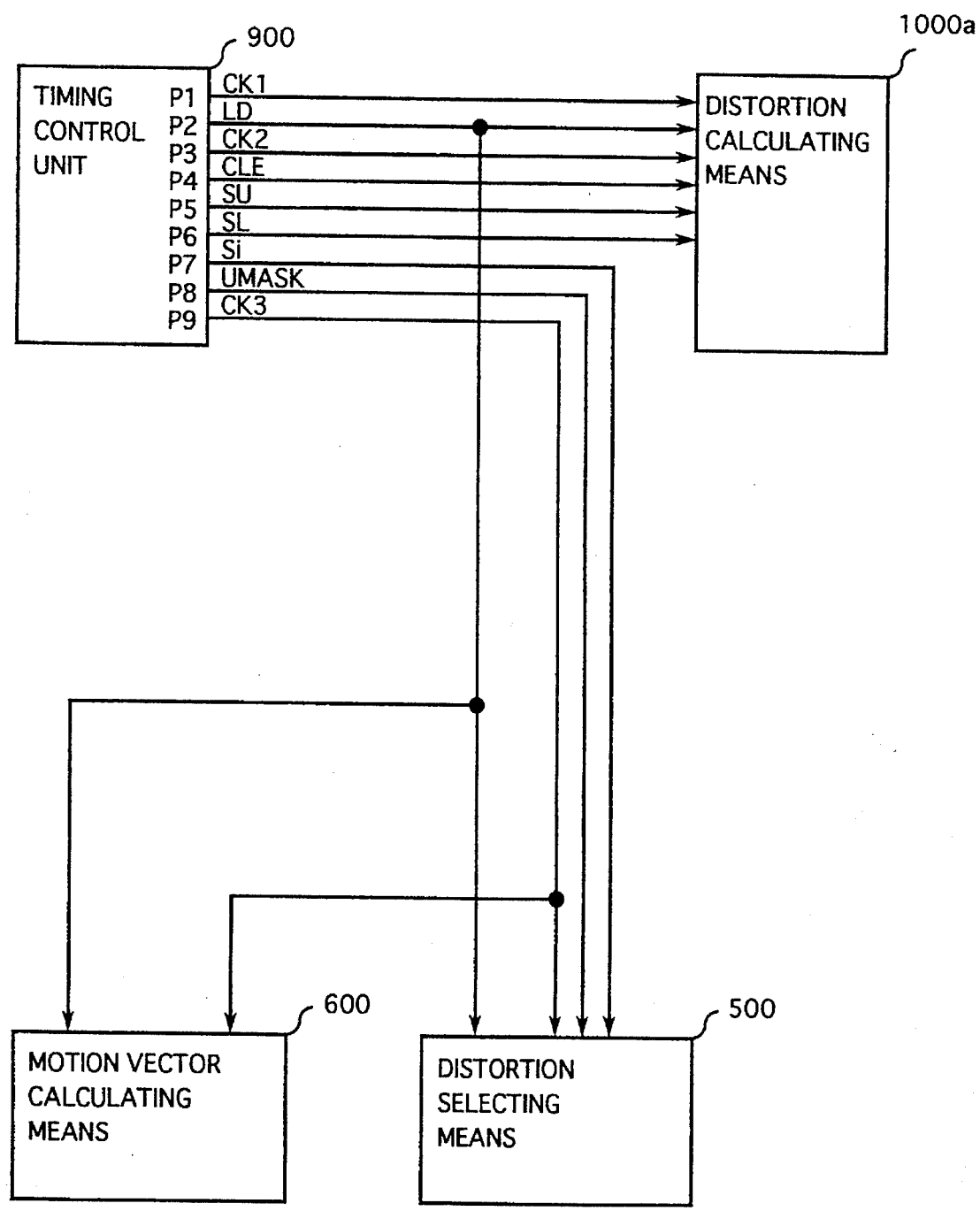
FIG. 7 is a block diagram showing a timing control unit and showing signals supplied from the timing control unit to the distortion calculating means, distortion selecting means and the motion vector calculating means.

The motion estimation apparatus is shown in FIG. 7 as further comprising a timing control unit 900 provided with signal output terminals P1 to P9 through which a clock signal CK1 and control signals LD, CK2, CLE, SU, SL, Si, UMASK and CK3 are outputted, respectively. The clock signal CK1 and the control signals CK2, CLE, SU and SL are transmitted to the distortion calculating means 1000a. The control signal LD is transmitted to the distortion calculating means 1000a, the distortion selecting means 500 and the motion vector calculating means 600. The control signals Si and UMASK are transmitted to the distortion selecting means 500. The control signal CK3 is transmitted to the distortion selecting means 500 and the motion vector calculating means 600.

Figure 13:
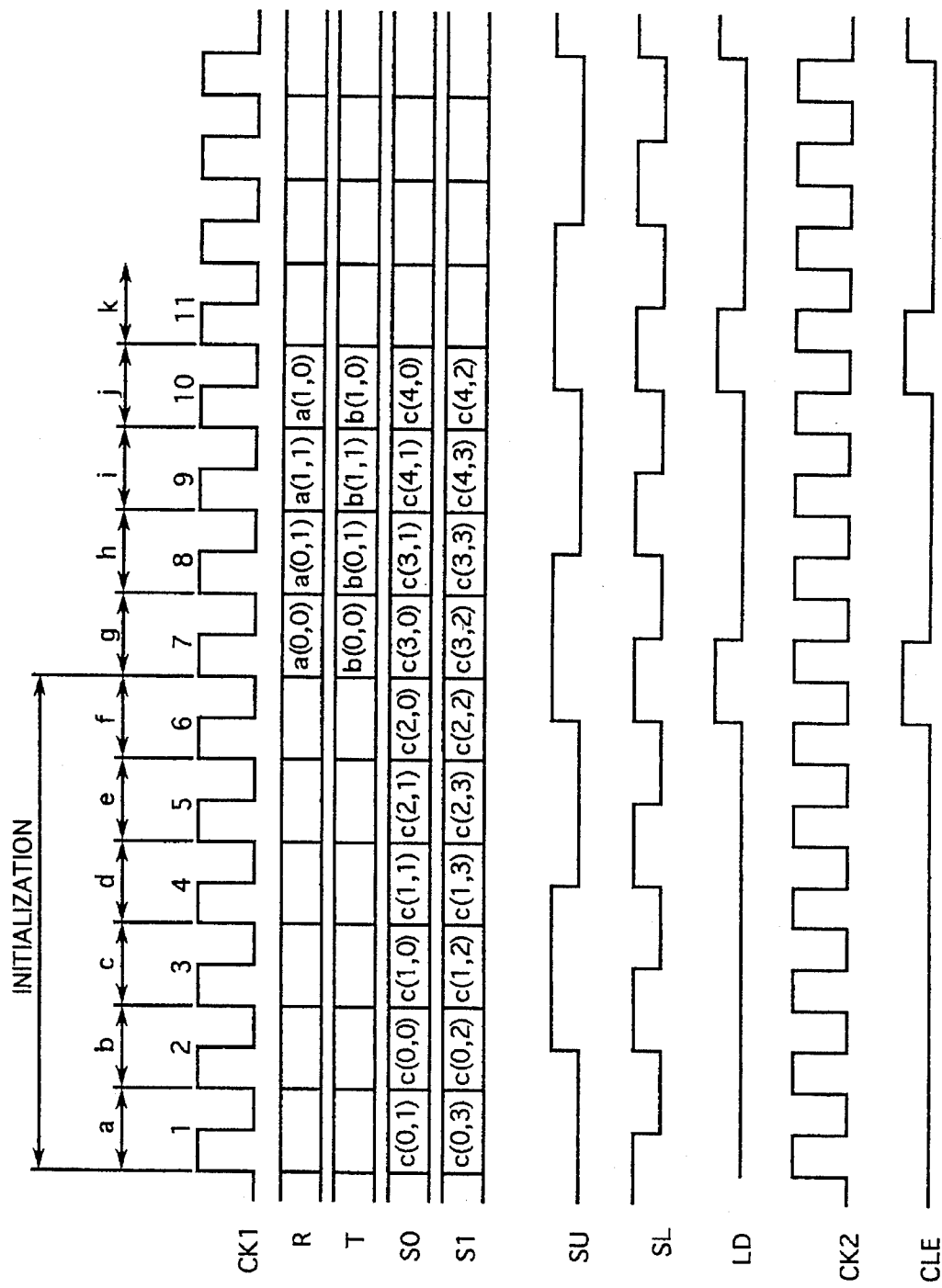
FIG. 13 is a timing chart showing the signals generated by the timing control unit shown in FIG. 7 and pel data supplied to the template block obtaining means and the candidate block obtaining means shown in FIG. 2.
Figure 24:
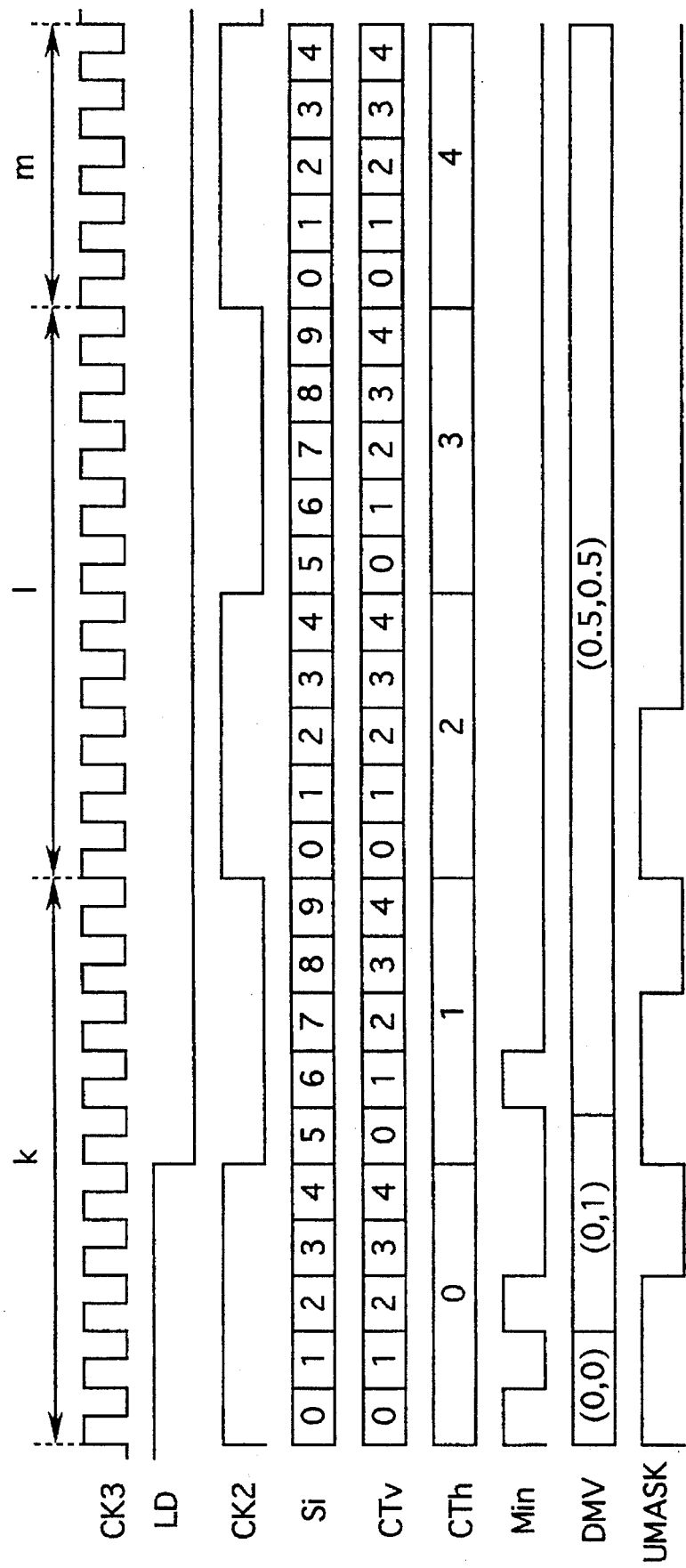
FIG. 24 is a timing chart showing signals inputted into and outputted from the distortion selecting means shown in FIG. 11 and the motion vector calculating means shown in FIG. 12.

The signals CK1, LD, CK2, CLE, SU, SL, Si, UMASK and CK3 are illustrated in FIGS. 13 and 24. The clock signal CK1 comprises clock pulses which not only serve as criteria of the control signals LD, CK2, CLE, SU, Si, UMASK and CK3 but also is used for regulation of the operations of the distortion calculating means 1000a, the distortion selecting means 500 and the motion vector calculating means 600. The control signal LD comprises a first pulse outputted in step with the sixth clock pulse of the clock signal CK1, and subsequent pulses outputted at a rate of one pulse per the four clock pulses of the clock signal CK1. Each of the pluses of the control signal LD is twice the width of that of the clock signal CK1. The control signal CK2 is formed similarly to the clock signal CK1.

The control signal CLE comprises a first pulse outputted in step with the sixth clock pulse of the clock signal CK1, and subsequent pulses outputted at a rate of one pulse per the four clock pulses of the clock signal CK1. Each of the pluses of the control signal CLE is twice the width of that of the clock signal CK1. The control signal SU comprises a first pulse outputted in step with the second clock pulse of the clock signal CK1, and subsequent pulses outputted at a rate of one pulse per the four clock pulses of the clock signal CK1. Each of the pluses of the control signal SU is four times the width of that of the clock signal CK1. The control signal SL comprises a first pulse outputted in step with the first clock pulse of the clock signal CK1, and subsequent pulses outputted at a rate of one pulse per the two clock pulses of the clock signal CK1. Each of the pluses of the control signal SL is twice the width of that of the clock signal CK1.

The control signal Si comprises count signals represented by "0" to "9". The count signals consist of a first count signal outputted in step with the eleventh clock pulse of the clock signal CK1, and subsequent count signals outputted in step with the pulse of the control signal CK3. The control signal UMASK comprises pulses outputted in accordance with a predetermined internal pattern to restrict the candidate blocks 6 to be compared with one another.

The control signal CK3 comprises a first pulse outputted in step with the first clock pulse of the clock signal CK1, and subsequent pulses outputted at a rate of ten pulses per the one clock pulse of the clock signal CK1. Each of the pluses of the control signal CK3 is 1/10 times the width of that of the clock signal CK1.

Figure 8:
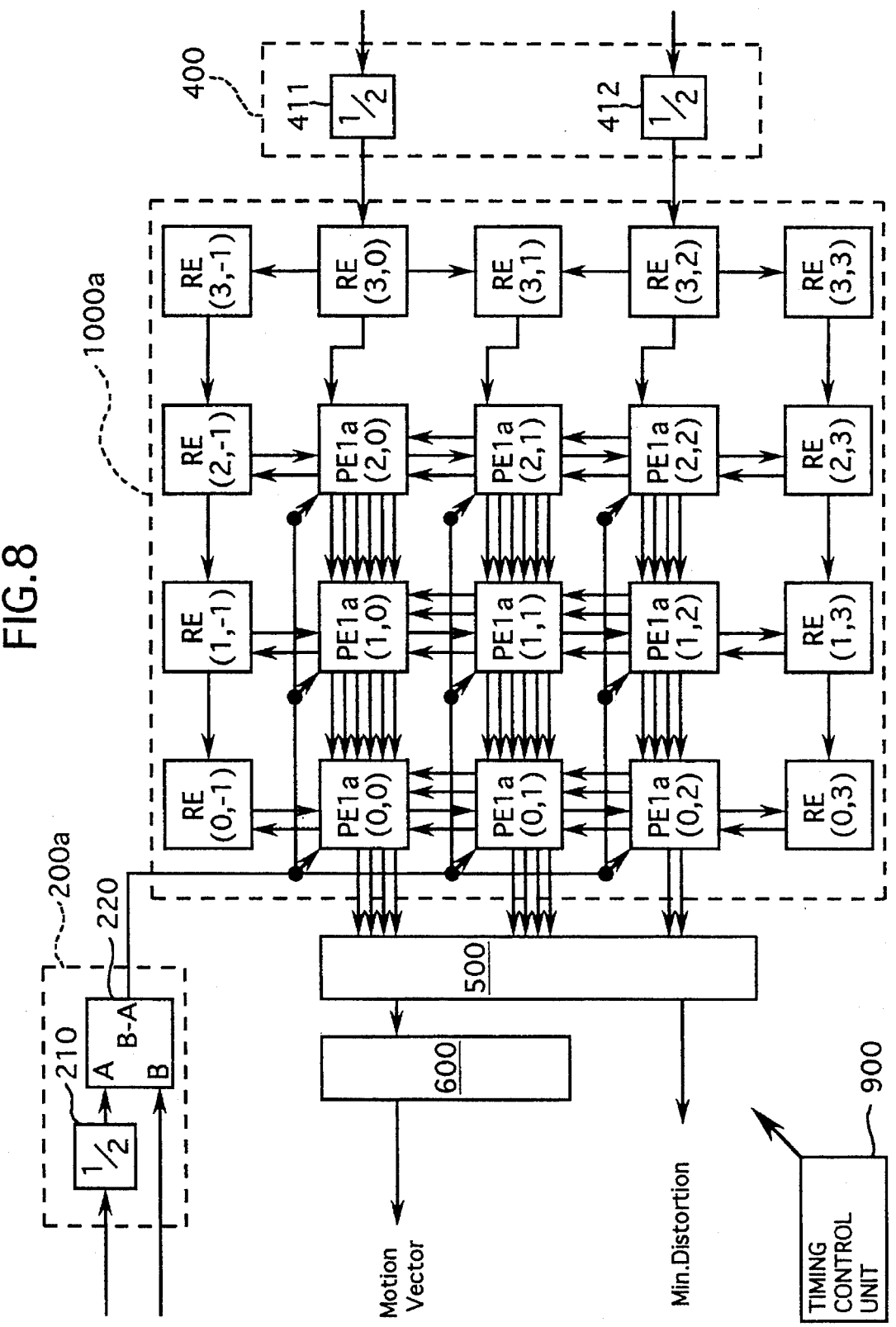
FIG. 8 is a block diagram concretely showing template block obtaining means, candidate block obtaining means and distortion calculating means.

The template block obtaining means 200a is shown in FIG. 8 as comprising a multiplier 210 and a subtracter 220. The multiplier 210 has a data input terminal and a data output terminal. The multiplier 210 is designed to multiply data on the data input terminal by the first coefficient "½" and output the multiplied data through the data output terminal. The subtracter 220 has a first data input terminal A, a second data input terminal B and a data output terminal. The subtracter 220 is adapted to subtract data on the first data input terminal A from data on the second data input terminal B and output the subtracted data through the data output terminal. The data input terminal of the multiplier 210 is electrically connected to the data output terminal of the block data outputting means 100. The first data input terminal A of the subtracter 220 is electrically connected to the data output terminal of the multiplier 210, while the second data input terminal B of the subtracter 220 is electrically connected to a data output terminal (not shown) of the current block data outputting means.

The pel data sets b(0,0), b(0,1), b(1,1) and b(1,0) are received in described order by the data input terminal of the multiplier 210 from the block specifying means 100. The multiplied data sets b(0,0)/2, b(0,1)/2, b(1,1)/2 and b(1,0)/2 are received in described order by the first data input terminal A of the subtracter 220 from the multiplier 210, while the pel data sets a(0,0), a(0,1), a(1,1) and a(1,0) are received in described order by the second data input terminal B of the subtracter 220 from the current block data outputting means.

In step with the pulses of the clock signal CK1 in the periods (g) to (j) as shown in FIG. 13, the subtracted data sets a(0,0)–b(0,0)/2, a(0,1)–b(0,1)/2, a(1,1)–b(1,1)/2 and a(1,0)–b(1,0)/2 are outputted in described order through the data output terminal of the subtracter 220.

The candidate block obtaining means 400 is shown in FIG. 8 as comprising a pair of multipliers 411 and 412. Each of the multipliers 411 and 412 has a data input terminal and a data output terminal. Each of the multipliers 411 and 412 is designed to multiply data on the data input terminal by the second coefficient "½" and outputs the multiplied data through the data output terminal. The data input terminals of the multipliers 411 and 412 are electrically connected to data output terminals (not shown), respectively, of the search window specifying means 300.

The pel data sets c(0,1), c(0,0), c(1,0), c(1,1), c(2,1), c(2,0), c(3,0) and c(3,1) are received in described order by the data input terminal of the multiplier 411 from the search window specifying means 300. In step with the pulse of the clock signal CK1 in the periods (a) to (h) shown in FIG. 13, the pel data sets $c(0,1)/2$, $c(0,0)/2$, $c(1,0)/2$, $c(1,1)/2$, $c(2,1)/2$, $c(2,0)/2$, $c(3,0)/2$ and $c(3,1)/2$ are outputted in described order through the data output terminal of the multiplier 411.

The pel data sets $c(0,3)$, $c(0,2)$, $c(1,2)$, $c(1,3)$, $c(2,3)$, $c(2,2)$, $c(3,2)$ and $c(3,3)$ are received in described order by the data input terminal of the multiplier 412 from the search window specifying means 300.

In step with the pulses of the clock signal CK1 in the periods (a) to (h) as shown in FIG. 13, the pel data sets $c(0,3)/2$, $c(0,2)/2$, $c(1,2)/2$, $c(1,3)/2$, $c(2,3)/2$, $c(2,2)/2$, $c(3,2)/2$ and $c(3,3)/2$ are outputted in described order through the data output terminal of the multiplier 412.

Figure 9:
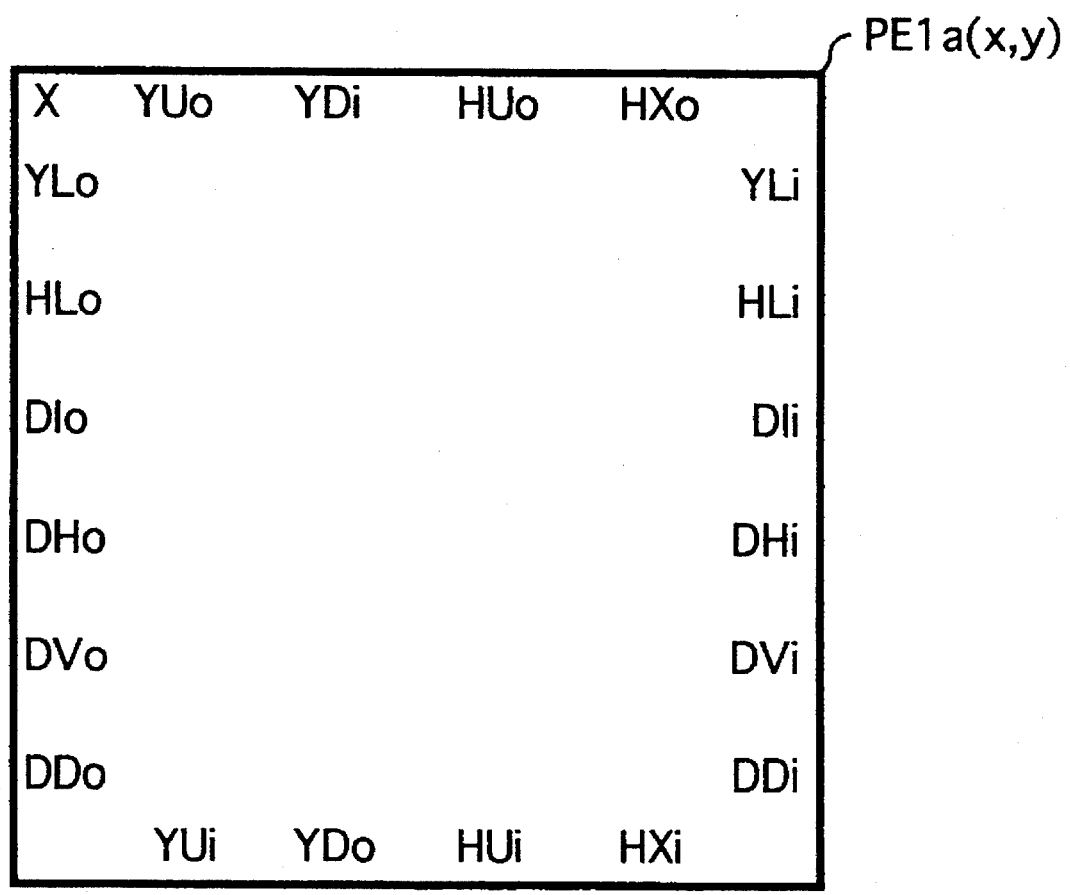
FIG. 9 is a plan view showing each of processor elements shown in FIG. 8.

Returning back to FIG. 8, the distortion calculating means 1000$a$ comprises nine processor elements PE1$a$(0,0), PE1$a$(0,1), PE1$a$(0,2), PE1$a$(1,0), PE1$a$(1,1), PE1$a$(1,2), PE1$a$(2,0), PE1$a$(2,1), PE1$a$(2,2) and eleven shift registers RE(0,−1), RE(1,−1), RE(2,−1), RE(3,−1), RE(3,0), RE(3,1), RE(3,2), RE(0,3), RE(1,3), RE(2,3), RE(3,3). Each of the processor elements PE is indicated by PE1$a$(x, y) and each of the shift register RE is indicated by RE(x,y), where x is represented by "0", "1", "2", "3" and y is represented by "−1", "0", "1", "2", "3". FIG. 9 is a plan view of each of the processor element PE1$a$(x,y). In FIG. 9, each of the processor elements PE1$a$(x,y) has data input terminals X, YDi, YLi, HLi, DIi, DHi, DVi, DDi, HXi, HUi and YUi, data output terminals YUo, HUo, HXo, YDo, DDo, DVo, DHo, DIo, HLo and YLo, signal input terminals (not shown) and signal output terminals (not shown).

Figure 10:
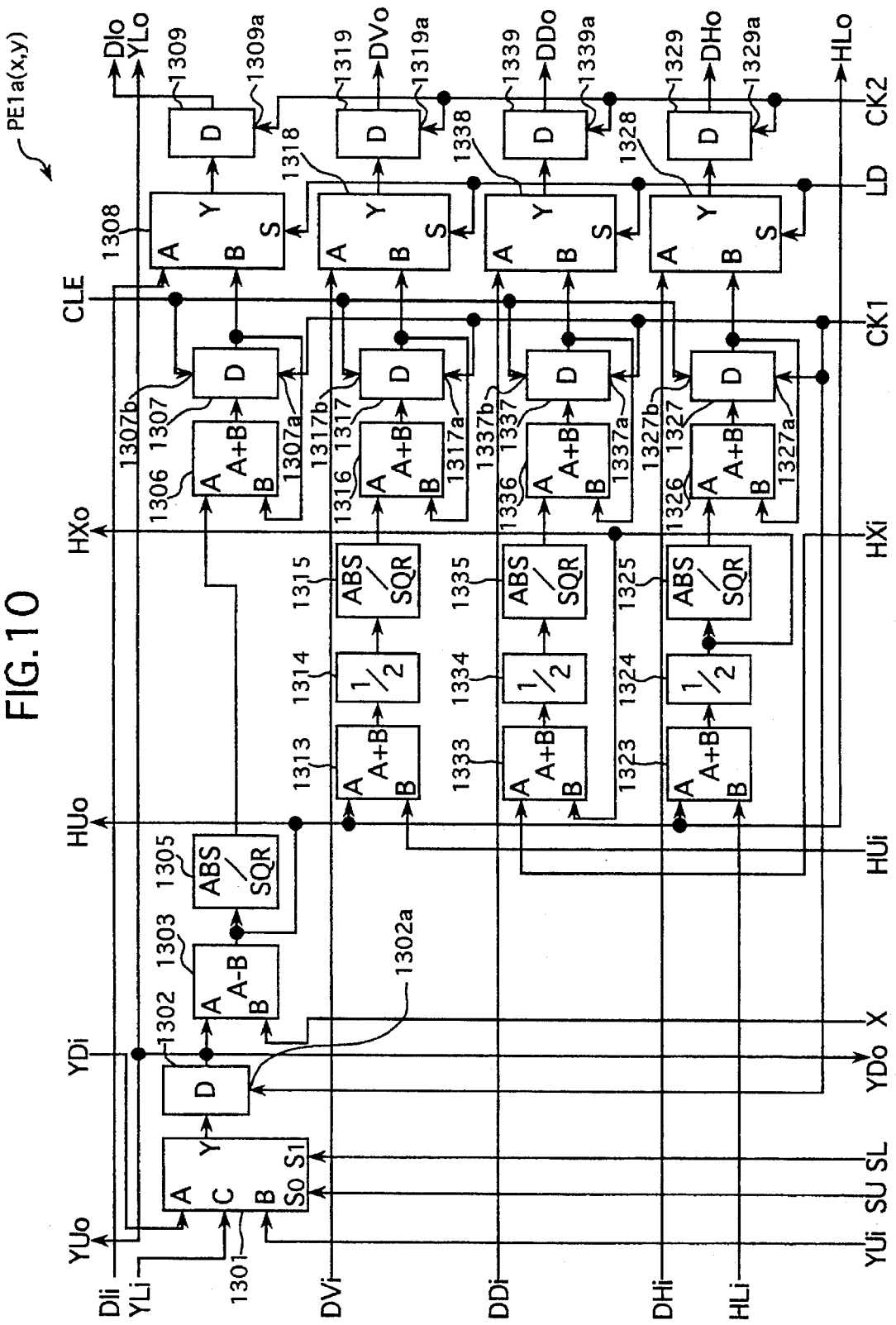
FIG. 10 is a block diagram showing the processor element shown in FIG. 9.

Each of the processor elements PE1$a$(x,y) is shown in FIG. 10 as comprising a selector 1301, a D flip-flop 1302, a subtracter 1303, a positive value transducer 1305, an adder 1306, a D flip-flop 1307, a selector 1308 and a D flip-flop 1309.

The selector 1301 has a first data input terminal A, a second data input terminal B, a third data input terminal C, first and second signal input terminals S0 and S1, and a data output terminal Y. When the first and second signal input terminals S0 and S1 of the selector 1301 receive signals representative of "0" and "0", respectively, data on the first data input terminal A of the selector 1301 are selected and outputted through the data output terminal Y of the selector 1301. When the first and second signal input terminals S0 and S1 of the selector 1301 receive signals representative of "1" and "0", respectively, data on the second data input terminal B of the selector 1301 are selected and outputted through the data output terminal Y of the selector 1301. When the first and second signal input terminals S0 and S1 of the selector 1301 receive signals representative of "0" and "1" or "1" and "1", respectively, data on the third data input terminal C of the selector 1301 are selected and outputted through the data output terminal Y of the selector 1301.

The D flip-flop 1302 has data input terminal, a signal input terminal 1302$a$ and a data output terminal. When the D flip-flop 1302 detects a rising edge of a pulse received by the signal input terminal 1302$a$, i.e., when a signal received by the signal input terminal 1302$a$ of the D flip-flop 1302 is changed "0" to "1", the D flip-flop 1302 latches, on the data output terminal, data received at that time by the data input terminal. The subtracter 1303 has a first data input terminal A, a second data input terminal B and a data output terminal. The subtracter 1303 is adapted to subtract data received by the second data input terminal B from data received by the first data input terminal A and output the subtracted data through the data output terminal.

The positive value transducer 1305 has a data input terminal and a data output terminal. The positive value transducer 1305 is an absolute value transducer or a square multiplier. If the positive value transducer 1305 is the absolute value transducer, the positive value transducer 1305 converts data on the data input terminal to positive value data by means of absolute value arithmetic and outputs the converted data through the data output terminal. If the positive value transducer 1305 is the square multiplier, the positive value transducer 1305 converts data on the data input terminal to positive value data by means of square arithmetic and outputs the converted data through the data output terminal. The adder 1306 has a first data input terminal A, a second data input terminal B and a data output terminal. The adder 1306 is designed to add data on the second data input terminal B to data on the first data input terminal A and output the added data through the data output terminal.

The D flip-flop 1307 has a data input terminal, a first signal input terminal 1307$a$, a second signal input terminal 1307$b$ and a data output terminal. When the D flip-flop 1307 detects a low-to-high transition of a signal received by the first signal input terminal 1307$a$, the D flip-flop latches, on the data output terminal, data received at that time by the data input terminal. When the D flip-flop 1307 detects a low-to-high transition of a signal received by the second signal input terminal 1307$b$, the D flip-flop 1307 resets data on the data output terminal to "0".

The selector 1308 has a first data input terminal A, a second data input terminal B, a signal input terminal S and a data output terminal Y. When the signal input terminal S of the selector 1308 receives a signal representative of "0", data on the first data input terminal A of the selector 1308 are selected and outputted through the data output terminal Y of the selector 1308. When the signal input terminal S of the selector 1308 receives a signal representative of "1", data on the second data input terminal B of the selector 1308 are selected and outputted through the data output terminal Y of the selector 1308. The D flip-flop 1309 has a data input terminal, a signal input terminal 1309$a$ and a data output terminal. When the D flip-flop 1309 detects a rising edge of a pulse received by the signal input terminal 1309$a$, the D flip-flop 1309 latches, on the data output terminal, data received at that time by the data input terminal.

The first data input terminal A of the selector 1301 of the present processor element PE1$a$(x,y) is electrically connected to the data output terminal of the D flip-flop 1302 of the upper side processor element PE(x,y−1) through the data input terminal YDi of the present processor element PE1$a$(x, y) and the data output terminal YDo of the upper side processor element PE1$a$(x,y−1). If there is no upper side processor element PE1$a$(x,y−1), the first data input terminal A of the selector 1301 of the present processor element PE1$a$(x,y) is electrically connected to a data output terminal of the upper side shift register RE(x,y−1) through the data input terminal YDi of the present processor element PE1$a$(x, y). The second data input terminal B of the selector 1301 of the present processor element PE1$a$(x,y) is electrically connected to the data output terminal of the lower side processor element PE1$a$(x,y+1) through the data input terminal YUi of the present processor element PE1$a$(x,y) and the data output terminal YUo of the lower side processor element PE1$a$(x, y+1). If there is no lower side processor element PE1$a$(x, y+1), the second data input terminal B of the selector 1301 of the present processor element PE1$a$(x,y) is electrically connected to the data output terminal of the lower side shift register RE(x,y+1) through the data input terminal YUi of the present processor element PE1$a$(x,y). The third data input terminal C of the selector 1301 of the present processor element PE1a(x,y) is electrically connected to the data output terminal of the right side processor element PE1a(x+1,y) through the data input terminal YLi of the present processor element PE1a(x,y) and the data output terminal YLo of the right side processor element PE1a(x+1,y). If there is no right side processor element PE1a(x+1,y), the third data input terminal C of the selector 1301 of the present processor element PE1a(x,y) is electrically connected to a data output terminal of the right side shift register RE(x+1,y) through the data input terminal YLi of the present processor element PE1a(x,y).

The first signal input terminal S0 of the selector 1301 of the present processor element PE1a(x,y) is electrically connected to the signal output terminal of the timing control unit 900 to receive the control signal SU, while the second signal input terminal S1 of the selector 1301 of the present processor element PE1a(x,y) is electrically connected to the signal output terminal of the timing control unit 900 to receive the control signal SL.

The data input terminal of the D flip-flop 1302 of the present processor element PE1a(x,y) is electrically connected to the data output terminal Y of the selector 1301 of the present processor element PE1a(x,y). The signal input terminal 1302a of the D flip-flop 1302 of the present processor element PE1a(x,y) is electrically connected to the signal output terminal of the timing control unit 900 to receive the clock signal CK1.

The first data input terminal A of the subtracter 1303 of the present processor element PE1a(x,y) is electrically connected to the data output terminal of the D flip-flop 1302 of the present processor element PE1a(x,y), while the second data input terminal B of the subtracter 1303 of the present processor element PE1a(x, y) is electrically connected to the data output terminal of the template block obtaining means 200 through the data input terminal X of the present processor element PE1a(x,y).

The data input terminal of the positive value transducer 1305 of the present processor element PE1a(x,y) is electrically connected to the data output terminal of the subtracter 1303 of the present processor element PE1a(x,y). The first input terminal A of the adder 1306 of the present processor element PE1a(x,y) is electrically connected to the data output terminal of the positive value transducer 1305 of the present processor element PE1a(x,y), while the second input terminal B of the adder 1306 of the present processor element PE1a(x, y) is electrically connected to the data output terminal of the D flip-flop 1307 of the present processor element PE1a(x,y). The data input terminal of the D flip-flop 1307 of the present processor element PE1a(x,y) is electrically connected to the data output terminal of the adder 1306 of the present processor element PE1a(x,y). The first signal input terminal 1307a of the D flip-flop 1307 is electrically connected to the signal output terminal of the timing control unit 900 to receive the clock signal CK1, while the second signal input terminal 1307b of the D flip-flop 1307 is electrically connected to the signal output terminal of the timing control unit 900 to receive the control signal CLE.

The first data input terminal A of the selector 1308 of the present processor element PE1a(x,y) is electrically connected to the data output terminal of the D flip-flop 1309 of the right side processor element PE1a(x+1,y) through the data input terminal DIi of the present processor element PE1a(x,y) and the data output terminal DIo of the right side processor element PE1a(x+1,y), while the second data input terminal B of the selector 1308 of the present processor element PE1a(x,y) is electrically connected to the data output terminal of the D flip-flop 1307 of the present processor element PE1a(x,y). The signal input terminal S of the selector 1308 of the present processor element PE1a(x,y) is electrically connected to the signal output terminal of the timing control unit 900 to receive the control signal LD. The data input terminal of the D flip-flop 1309 is electrically connected to the data output terminal Y of the selector 1308. The signal input terminal 1309a of the D flip-flop 1309 is electrically connected to the signal output terminal of the timing control unit 900 to receive the control signal CK2.

Each of the processor elements PE1a(x,y) further comprises an adder 1313, a multiplier 1314, a positive value transducer 1315, an adder 1316, a D flip-flop 1317, a selector 1318 and a D flip-flop 1319. The adder 1313 has a first data input terminal A, a second data input terminal B and a data output terminal. The adder 1313 is designed to add data on the second data input terminal B to data on the first data input terminal A and output the added data through the data output terminal.

The multiplier 1314 has a data input terminal and a data output terminal. The multiplier 1314 is designed to multiply data on the data input terminal by "½" and outputs the multiplied data through the data output terminal. Similarly to the positive value transducer 1305, the positive value transducer 1315 has a data input terminal and a data output terminal. The positive value transducer 1315 is an absolute value transducer or a square multiplier. If the positive value transducer 1315 is the absolute value transducer, the positive value transducer 1315 converts data on the data input terminal to positive value data by means of absolute value arithmetic and outputs the converted data through the data output terminal. If the positive value transducer 1315 is the square multiplier, the positive value transducer 1315 converts data on the data input terminal to positive value data by means of square arithmetic and outputs the converted data through the data output terminal.

Similarly to the adder 1306, the adder 1316 has a first data input terminal A, a second input terminal B and a data output terminal. The adder 1316 is designed to add data on the second data input terminal B to data on the first data input terminal A and output the added data through the data output terminal.

Similarly to the D flip-flop 1307, the D flip-flop 1317 has a data input terminal, a first signal input terminal 1317a, a second signal input terminal 1317b and a data output terminal. When the D flip-flop 1317 detects a low-to-high transition of a signal received by the first signal input terminal 1317a, the D flip-flop 1317 latches, on the data output terminal, data received at that time by the data input terminal. When the D flip-flop 1317 detects a low-to-high transition of a signal received by the second signal input terminal 1317b, the D flip-flop 1317 resets data on the data output terminal to "0".

Similarly to the selector 1308, the selector 1318 has a first data input terminal A, a second data input terminal B, a signal input terminal S and a data output terminal Y. When the signal input terminal S of the selector 1318 receives a signal representative of "0", data on the first data input terminal A of the selector 1318 are selected and outputted through the data output terminal Y of the selector 1318. When the signal input terminal S of the selector 1318 receives a signal representative of "1", data on the second data input terminal B of the selector 1318 are selected and outputted through the data output terminal Y of the selector 1318. Similarly to the D flip-flop 1309, the D flip-flop 1319 has data input terminal, a signal input terminal 1319a and a data output terminal. When the D flip-flop 1319 detects a rising edge of a pulse received by the signal input terminal 1319a, the D flip-flop 1319 latches, on the data output terminal, data received at that time by the data input terminal.

The first data input terminal A of the adder 1313 of the present processor element PE1a(x,y) is electrically connected to the data output terminal of the subtracter 1303 of the present processor element PE1a(x,y). The second data input terminal B of the adder 1313 of the present processor element PE1a(x,y) is electrically connected to the data output terminal of the subtracter 1303 of the lower side processor element PE1a(x,y+1) through the data input terminal HUi of the present processor element PE1a(x,y) and the data output terminal HUo of the lower side processor element PE1a(x,y+1). If there is no lower side processor element PE1a(x,y+1), the second data input terminal B of the subtract 1313 of the present processor element PE1a(x, y) is electrically connected to the data output terminal of the lower side shift register RE(x,y+1) through the data input terminal HUi of the present processor element PE1a(x,y).

The data input terminal of the multiplier 1314 of the present processor element PE1a(x,y) is electrically connected to the data output terminal of the adder 1313 of the present processor element PE1a(x,y). The data input terminal of the positive value transducer 1315 of the present processor element PE1a(x,y) is electrically connected to the data output terminal of the multiplier 1314 of the present processor element PE1a(x,y).

The first data input terminal A of the adder 1316 of the present processor element PE1a(x,y) is electrically connected to the data output terminal of the positive value transducer 1315 of the present processor element PE1a(x,y), while the second data input terminal B of the adder 1316 of the present processor element PE1a(x,y) is electrically connected to the data output terminal of the D flip-flop 1317 of the present processor element PE1a(x,y).

The data input terminal of the D flip-flop 1317 of the present processor element PE1a(x,y) is electrically connected to the data output terminal of the adder 1316 of the present processor element PE1a(x,y). The first signal input terminal 1317a of the D flip-flop 1317 of the present processor element PE1a(x,y) is electrically connected to the signal output terminal of the timing control unit 900 to receive the clock signal CK1, while the second signal input terminal 1317b of the D flip-flop 1317 of the present processor element PE1a(x,y) is electrically connected to timing control unit 900 to receive the control signal CLE.

The first data input terminal A of the selector 1318 of the present processor element PE1a(x,y) is electrically connected to the data output terminal of the D flip-flop 1319 of the right side processor element PE1a(x+1,y) through the data input terminal DVi of the present processor element PE1a(x,y) and the data output terminal DVo of the right side processor element PE1a(x+1,y), while the second data input terminal B of the selector 1318 of the present processor element PE1a(x,y) is electrically connected to the data output terminal of the D flip-flop 1317 of the present processor element PE1a(x,y). The signal input terminal S of the selector 1318 of the present processor element PE1a(x,y) is electrically connected to the signal output terminal of the timing control unit 900 to receive the control signal LD.

The data input terminal of the D flip-flop 1319 of the present processor element PE1a(x,y) is electrically connected to the data output terminal Y of the selector 1318 of the present processor element PE1a(x,y). The signal input terminal 1319a of the D flip-flop 1319 of the present processor element PE1a(x,y) is electrically connected to the signal output terminal of the timing control unit 900 to receive the control signal CK2.

Each of the processor elements PE1a(x,y) further comprises an adder 1323, a multiplier 1324, a positive value transducer 1325, an adder 1326, a D flip-flop 1327, a selector 1328 and a D flip-flop 1329.

Similarly to the adder 1313, the adder 1323 has a first data input terminal A, a second data input terminal B and a data output terminal. The adder 1323 is designed to add data on the second data input terminal B to data on the first data input terminal A and output the added data through the data output terminal.

Similarly to the multiplier 1314, the multiplier 1324 has a data input terminal and a data output terminal. The multiplier 1324 is designed to multiply data on the data input terminal by "½" and outputs the multiplied data through the data output terminal. Similarly to the positive value transducer 1315, the positive value transducer 1325 has a data input terminal and a data output terminal. The positive value transducer 1325 is an absolute value transducer or a square multiplier.

If the positive value transducer 1325 is the absolute value transducer, the positive value transducer 1325 converts data on the data input terminal to positive value data by means of absolute value arithmetic and outputs the converted data through the data output terminal. If the positive value transducer 1325 is the square multiplier, the positive value transducer 1325 converts data on the data input terminal to positive value data by means of square arithmetic and outputs the converted data through the data output terminal.

Similarly to the adder 1316, the adder 1326 has a first data input terminal A, a second input terminal B and a data output terminal. The adder 1326 is designed to add data on the second data input terminal B to data on the first data input terminal A and output the added data through the data output terminal.

Similarly to the D flip-flop 1317, the D flip-flop 1327 has a data input terminal, a first signal input terminal 1327a, a second signal input terminal 1327b and a data output terminal. When the D flip-flop 1327 detects a low-to-high transition of a signal received by the first signal input terminal 1327a, the D flip-flop 1327 latches, on the data output terminal, data received at that time by the data input terminal. When the D flip-flop 1327 detects a low-to-high transition of a signal received by the second signal input terminal 1327b, the D flip-flop 1327 resets data on the data output terminal to "0".

Similarly to the selector 1318, the selector 1328 has a first data input terminal A, a second data input terminal B, a signal input terminal S and a data output terminal Y. When the signal input terminal S of the selector 1328 receives a signal representative of "0", data on the first data input terminal A of the selector 1328 are selected and outputted through the data output terminal Y of the selector 1328. When the signal input terminal S of the selector 1328 receives a signal representative of "1", data on the second data input terminal B of the selector 1328 are selected and outputted through the data output terminal Y of the selector 1328. Similarly to the D flip-flop 1319, the D flip-flop 1329 has data input terminal, a signal input terminal 1329a and a data output terminal. When the D flip-flop 1329 detects a rising edge of a pulse received by the signal input terminal 1329a, the D flip-flop 1329 latches, on the data output terminal, data received at that time by the data input terminal.

The first data input terminal A of the adder 1323 of the present processor element PE1a(x,y) is electrically connected to the data output terminal of the subtracter 1303 of the present processor element PE1a(x,y), while the second data input terminal B of the adder 1323 of the present processor element PE1a(x,y) is electrically connected to the data output terminal of the subtracter 1303 of the right side processor element PE1a(x+1,y) through the data input terminal HLi of the present processor element PE1a(x,y) and the data output terminal HLo of the right side processor element PE(x+1, y). If there is no right side processor element PE1a(x+1,y), the second data input terminal B of the adder 1323 is electrically connected to the data output terminal of the right side shift register RE(x+1,y) through the data input terminal HLi of the present processor element PE1a(x,y).

The data input terminal of the multiplier 1324 of the present processor element PE1a(x,y) is electrically connected to the data output terminal of the adder 1323 of the present processor element PE1a(x, y). The data input terminal of the positive value transducer 1325 of the present processor element PE1a(x, y) is electrically connected to the data output terminal of the multiplier 1324 of the present processor element PE1a(x, y).

The first data input terminal A of the adder 1326 of the present processor element PE1a(x,y) is electrically connected to the data output terminal of the positive value transducer 1325 of the present processor element PE1a(x,y), while the second data input terminal B of the adder 1326 of the present processor element PE1a(x,y) is electrically connected to the data output terminal of the D flip-flop 1327 of the present processor element PE1a(x,y).

The data input terminal of the D flip-flop 1327 of the present processor element PE1a(x,y) is electrically connected to the data output terminal of the adder 1326 of the present processor element PE1a(x,y). The first signal input terminal 1327a of the D flip-flop 1327 of the present processor element PE1a(x,y) is electrically connected to the signal output terminal of the timing control unit 900 to receive the clock signal CK1, while the second signal input terminal 1327b of the D flip-flop 1327 of the present processor element PE1a(x,y) is electrically connected to the signal output terminal of the timing control unit 900 to receive the control signal CLE.

The first data input terminal A of the selector 1328 of the present processor element PE1a(x,y) is electrically connected to the data output terminal of the D flip-flop 1329 of the right side processor element PE1a(x+1,y) through the data input terminal DHi of the present processor element PE1a(x,y) and the data output terminal DHo of the right side processor element PE1a(x+1,y), while the second data input terminal B of the selector 1328 of the present processor element PE1a(x,y) is electrically connected to the data output terminal of the D flip-flop 1327 of the present processor element PE1a(x,y). The signal input terminal S of the selector 1328 of the present processor element PE1a(x,y) is electrically connected to the signal output terminal of the timing control unit 900 to receive the control signal LD.

The data input terminal of the D flip-flop 1329 of the present processor element PE1a(x,y) is electrically connected to the data output terminal Y of the selector 1328 of the present processor element PE1a(x,y). The signal input terminal 1329a of the D flip-flop 1329 of the present processor element PE1a(x,y) is electrically connected to the signal output terminal of the timing control unit 900 to receive the control signal CK2.

Each of the processor elements PE1a(x,y) further comprises an adder 1333, a multiplier 1334, a positive value transducer 1335, an adder 1336, a D flip-flop 1337, a selector 1338 and a D flip-flop 1339.

Similarly to the adder 1313, the adder 1333 has a first data input terminal A, a second data input terminal B and a data output terminal. The adder 1333 is designed to add data on the second data input terminal B to data on the first data input terminal A and output the added data through the data output terminal.

Similarly to the multiplier 1314, the multiplier 1334 has a data input terminal and a data output terminal. The multiplier 1334 is designed to multiply data on the data input terminal by "½" and outputs the multiplied data through the data output terminal. Similarly to the positive value transducer 1315, the positive value transducer 1335 has a data input terminal and a data output terminal. The positive value transducer 1335 is an absolute value transducer or a square multiplier. If the positive value transducer 1335 is the absolute value transducer, the positive value transducer 1335 converts data on the data input terminal to positive value data by means of absolute value arithmetic and outputs the converted data through the data output terminal. If the positive value transducer 1335 is the square multiplier, the positive value transducer 1335 converts data on the data input terminal to positive value data by means of square arithmetic and outputs the converted data through the data output terminal.

Similarly to the adder 1316, the adder 1336 has a first data input terminal A, a second input terminal B and a data output terminal. The adder 1336 is designed to add data on the second data input terminal B to data on the first data input terminal A and output the added data through the data output terminal.

Similarly to the D flip-flop 1317, the D flip-flop 1337 has a data input terminal, a first signal input terminal 1337a, a second signal input terminal 1337b and a data output terminal. When the D flip-flop 1337 detects a low-to-high transition of a signal received by the first signal input terminal 1337a, the D flip-flop 1337 latches, on the data output terminal, data received at that time by the data input terminal. When the D flip-flop 1337 detects a low-to-high transition of a signal received by the second signal input terminal 1337b, the D flip-flop 1337 resets data on the data output terminal to "0".

Similarly to the selector 1318, the selector 1338 has a first data input terminal A, a second data input terminal B, a signal input terminal S and a data output terminal Y. When the signal input terminal S of the selector 1338 receives a signal representative of "0", data on the first data input terminal A of the selector 1338 are selected and outputted through the data output terminal Y of the selector 1338. When the signal input terminal S of the selector 1338 receives a signal representative of "1", data on the second data input terminal B of the selector 1338 are selected and outputted through the data output terminal Y of the selector 1338.

Similarly to the D flip-flop 1319, the D flip-flop 1339 has data input terminal, a signal input terminal 1339a and a data output terminal. When the D flip-flop 1339 detects a rising edge of a pulse received by the signal input terminal 1339a, the D flip-flop 1339 latches, on the data output terminal, data received at that time by the data input terminal.

The first data input terminal A of the adder 1333 of the present processor element PE1a(x,y) is electrically connected to the data output terminal of the multiplier 1324 of the lower side processor element PE1a(x,y+1) through the data input terminal HXi of the present processor element PE1a(x,y) and the data output terminal HXo of the lower side processor element PE1a(x,y+1). If there is no lower side processor element PE1a(x,y+1), the first data input terminal A of the adder 1333 of the present processor element PE1*a*(x,y) is electrically connected to the data output terminal of the lower side shift register RE(x, y+1) through the data input terminal HXi of the present processor element PE1*a*(x,y). The second data input terminal B of the adder 1333 of the present processor element PE1*a*(x,y) is electrically connected to the data output terminal of the multiplier 1324 of the present processor element PE1*a*(x,y).

The data input terminal of the multiplier 1334 of the present processor element PE1*a*(x,y) is electrically connected to the data output terminal of the adder 1333 of the present processor element PE1*a*(x,y). The data input terminal of the positive value transducer 1335 of the present processor element PE1*a*(x,y) is electrically connected to the data output terminal of the multiplier 1334 of the present processor element PE1*a*(x,y).

The first data input terminal A of the adder 1336 of the present processor element PE1*a*(x,y) is electrically connected to the data output terminal of the positive value transducer 1335 of the present processor element PE1*a*(x,y), while the second data input terminal B of the adder 1336 of the present processor element PE1*a*(x,y) is electrically connected to the data output terminal of the D flip-flop 1337 of the present processor element PE1*a*(x,y).

The data input terminal of the D flip-flop 1337 of the present processor element PE1*a*(x,y) is electrically connected to the data output terminal of the adder 1336 of the present processor element PE1*a*(x,y). The first signal input terminal 1337*a* of the D flip-flop 1337 of the present processor element PE1*a*(x,y) is electrically connected to the signal output terminal of the timing control unit 900 to receive the clock signal CK1, while the second signal input terminal 1337*b* of the D flip-flop 1337 of the present processor element PE1*a*(x,y) is electrically connected to the signal output terminal of the timing control unit 900 to receive the control signal CLE.

The first data input terminal A of the selector 1338 of the present processor element PE1*a*(x,y) is electrically connected to the data output terminal of the D flip-flop 1339 of the right side processor element PE1*a*(x+1,y) through the data input terminal DHi of the present processor element PE1*a*(x,y) and the data output terminal DHo of the right side processor element PE1*a*(x+1,y), while the second data input terminal B of the selector 1338 of the present processor element PE1*a*(x,y) is electrically connected to the data output terminal of the D flip-flop 1337 of the present processor element PE1*a*(x,y). The signal input terminal S of the selector 1338 of the present processor element PE1*a*(x,y) is electrically connected to the signal output terminal of the timing control unit 900 to receive the control signal LD.

The data input terminal of the D flip-flop 1339 of the present processor element PE1*a*(x,y) is electrically connected to the data output terminal Y of the selector 1338 of the present processor element PE1*a*(x,y). The signal input terminal 1339*a* of the D flip-flop 1339 of the present processor element PE1*a*(x,y) is electrically connected to the signal output terminal of the timing control unit 900 to receive the control signal CK2.

Referring to FIG. 8, when the pulses of the clock signal CK1 are received, the shift registers RE(3,0) and RE(3,2) receive the pel data from the candidate block obtaining means 400. When the (4n−2)th pulses of the clock signal CK1 are received, the shift register RE(3,1) receives the pel data from the shift register RE(3,0) while the shift register RE(3,3) receives the pel data from the shift register RE(3,2). When the 4nth pulses of the clock signal CK1 are received, the shift register RE(3,−1) receives the pel data from the shift register RE(3,0) while the shift register RE(3,1) receives the pel data from the shift register RE(3,2).

When the 4nth pulses of the clock signal CK1 are received, the shift register RE(2,−1) receives the pel data from the shift register RE(2,0). In step with the (4n±1)th pulses of the clock signal CK1 are received, the shift register RE(2, −1) receives the pel data from the shift register RE(3, −1).

When the (4n±1)th pulses of the clock signal CK1 are received, the shift register RE(2, 3) receives the pel data from the shift register RE(3, 3). When the (4n+2)th pulses of the clock signal CK1 are received, the shift register RE(2, 3) receives the pel data from the processor element PE1*a*(2, 2).

When the (4n±1)th pulses of the clock signal CK1 are received, the shift register RE(1,−1) receives the pel data from the shift register RE(2,−1). When the 4nth pulses of the clock signal CK1 are received, the shift register RE(1,−1) receives the pel data from the processor element PE1*a*(1,0). When the (4n+2)th pulses of the clock signal CK1 are received, the shift register RE(1,3) receives the pel data from the processor element PE1*a*(1,2). When the (4n±1)th pulses of the clock signal CK1 are received, the shift register RE(1,3) receives the pel data from the shift register RE(2,3).

When the 4nth pulses of the clock signal CK1 are received, the shift register RE(0,−1) receives the pel data from the processor element PE1*a*(0,0). When the (4n±1)th pulses of the clock signal CK1 are received, the shift register RE(0,−1) receives the pel data from the shift register RE(1, −1).

When the (4n±1)th pulses of the clock signal CK1 are received, the shift register RE(0,3) receives the pel data from the shift register RE(1,3). When the (4n+2)th pulses of the clock signal CK1 are received, the shift register RE(0, 3) receives the pel data from the processor element PE1*a*(0, 2).

Figure 11:
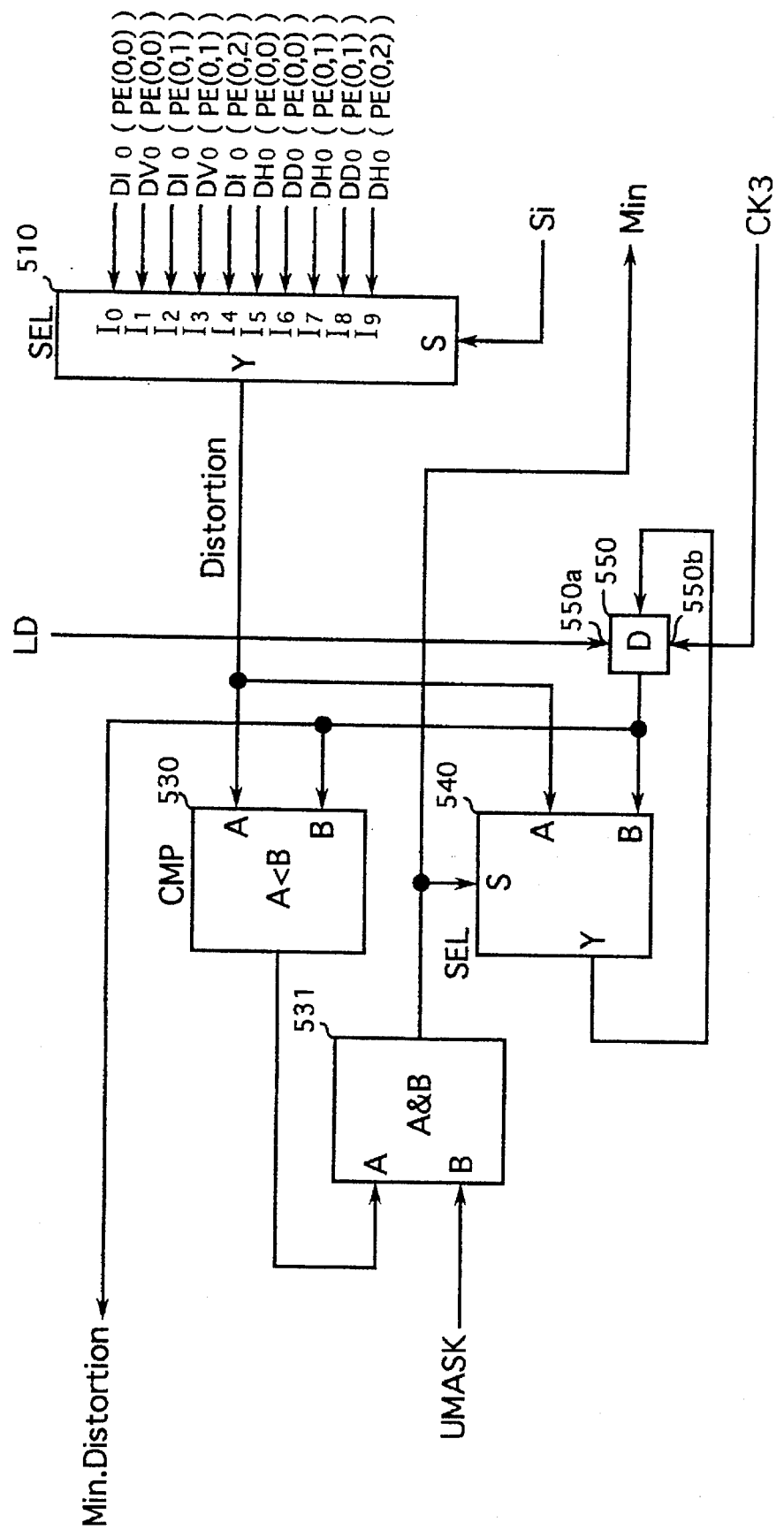
FIG. 11 is a block diagram showing the distortion selecting means.

The distortion specifying means 500 is shown in FIG. 11 as comprising a selector 510, a comparator 530, a logical product element 531, a selector 540 and a flip-flop 550. The selector 510 has data input terminals I0–I9, a signal input terminal S, and a data output terminal Y. The data input terminal I0 is electrically connected to the data output terminal of the flip-flop 1309 of the processor element PE1*a*(0,0) through the output terminal DIo of the processor element PE1*a*(0,0). The signal input terminal S of the selector 510 is electrically connected to the output terminal P7 of the timing control unit 900.

The data input terminal I1 is electrically connected to the data output terminal of the flip-flop 1319 of the processor element PE1*a*(0,0) through the output terminal DVo of the processor element PE1*a*(0,0).

The data input terminal I2 is electrically connected to the data output terminal of the flip-flop 1309 of the processor element PE1*a*(0,1) through the output terminal DIo of the processor element PE1*a*(0,1). The data input terminal I3 is electrically connected to the data output terminal of the flip-flop 1319 of the processor element PE1*a*(0,1) through the output terminal DVo of the processor element PE1*a*(0,1).

The data input terminal I4 is electrically connected to the data output terminal of the flip-flop 1309 of the processor element PE1*a*(0,2) through the output terminal DIo of the processor element PE1*a*(0,2). The data input terminal I5 is electrically connected to the data output terminal of the flip-flop 1329 of the processor element PE1*a*(0,0) through the output terminal DHo of the processor element PE1*a*(0, 0).

The data input terminal I6 is electrically connected to the data output terminal of the flip-flop 1339 of the processor element PE1*a*(0,0) through the output terminal DDo of the processor element PE1a(0,0). The data input terminal I7 is electrically connected to the data output terminal of the flip-flop 1329 of the processor element PE1a(0,1) through the output terminal DHo of the processor element PE1a(0,1).

The data input terminal I8 is electrically connected to the data output terminal of the flip-flop 1339 of the processor element PE1a(0,1) through the output terminal DDo of the processor element PE1a(0,1). The data input terminal I9 is electrically connected to the data output terminal of the flip-flop 1329 of the processor element PE1a(0,2) through the output terminal DHo of the processor element PE1a(0,2).

The selector 510 of the distortion specifying means 500 is adapted to output a data received in the data input terminal I0 through the data output terminal Y when the signal input terminal S receives an input signal represented by "0", while outputting a data received in the data input terminal I1 through the data output terminal Y when the signal input terminal S receives an input signal represented by "1". The selector 510 is adapted to output a data received in the data input terminal I2 through the data output terminal Y when the signal input terminal S receives an input signal represented by "2", while outputting a data received in the data input terminal I3 through the data output terminal Y when the signal input terminal S receives an input signal represented by "3".

The selector 510 is adapted to output a data received in the data input terminal I4 through the data output terminal Y when the signal input terminal S receives an input signal represented by "4", while outputting a data received in the data input terminal I5 through the data output terminal Y when the signal input terminal S receives an input signal represented by "5".

The selector 510 is adapted to output a data received in the data input terminal I6 through the data output terminal Y when the signal input terminal S receives an input signal represented by "6", while outputting a data received in the data input terminal I7 through the data output terminal Y when the signal input terminal S receives an input signal represented by "7".

The selector 510 is adapted to output a data received in the data input terminal I8 through the data output terminal Y when the signal input terminal S receives an input signal represented by "8", while outputting a data received in the data input terminal I9 through the data output terminal Y when the signal input terminal S receives an input signal represented by "9".

The comparator 530 has a first data input terminal A, a second data input terminal B and a signal output terminal, and is designed to produce an output signal indicated by "0" through the signal output terminal when the first data input terminal A has an input data equal to and larger than that of the second data input terminal B, while producing an output signal indicated by "1" through the signal output terminal when the first data input terminal A has an input data smaller than that of the second data input terminal B.

The logical product calculator 531 has a first signal input terminal A, a second signal input terminal B and a signal output terminal. When both the first and second signal input terminals A and B receive input signal represented by "1", the logical product calculator 531 outputs an output signal represented by "1" through the signal output terminal. When, on the other hand, either the first and second input terminals A or B receives an input signal represented by "0", the logical product calculator 531 outputs an output signal represented by "0" through the signal output terminal.

The selector 540 has a first data input terminal A, a second data input terminal B, a signal input terminal S and a data output terminal Y. The selector 540 is adapted to output a data received in the second data input terminal B through the data output terminal Y when the signal input terminal S receives an input signal represented by "0", while outputting a data received in the first data input terminal A through the data output terminal Y when the signal input terminal S receives an input signal represented by "1".

The flip-flop 550 is constituted by D flip-flop and thus has a data input terminal, a first signal input terminal 550a, second signal input terminal 550b and a data output terminal. The flip-flop 550 is designed to set "1" in simultaneous timing with the pulses of the signals received through the first signal input terminal 550a. The flip-flop 550 is designed to latch data received through the data input terminal A in simultaneous timing with the pulses of the signals received through the second signal input terminal 550b.

The data input terminal A of the comparator 530 is electrically connected to the data output terminal Y of the selector 510. The data input terminal B of the comparator 530 is electrically connected to the data output terminal of the flip-flop 550. The first signal input terminal A of the logical product element 531 is electrically connected to the signal output terminal of the comparator 530. The second signal input terminal B of the logical product element 531 is electrically connected to the signal output terminal of the timing control unit to receive the control signal UMASK. The first data input terminal A of the selector 540 is electrically connected to the data output terminal of the selector 510. The second data input terminal B of the selector 540 is electrically connected to the data output terminal of the flip-flop 550. The signal input terminal S of the selector 540 is electrically connected to the signal output terminal of the logical product element 531.

The data input terminal of the flip-flop 550 is electrically connected to the data output terminal Y of the selector 540. The first signal input terminal 550a of the flip-flop 550 is electrically connected to the signal output terminal of the timing control unit 900 to receive the control signal LD. The second signal input terminal 550b of the flip-flop 550 is electrically connected to the signal output terminal of the timing control unit 900 to receive the control signal CK3.

Figure 12:
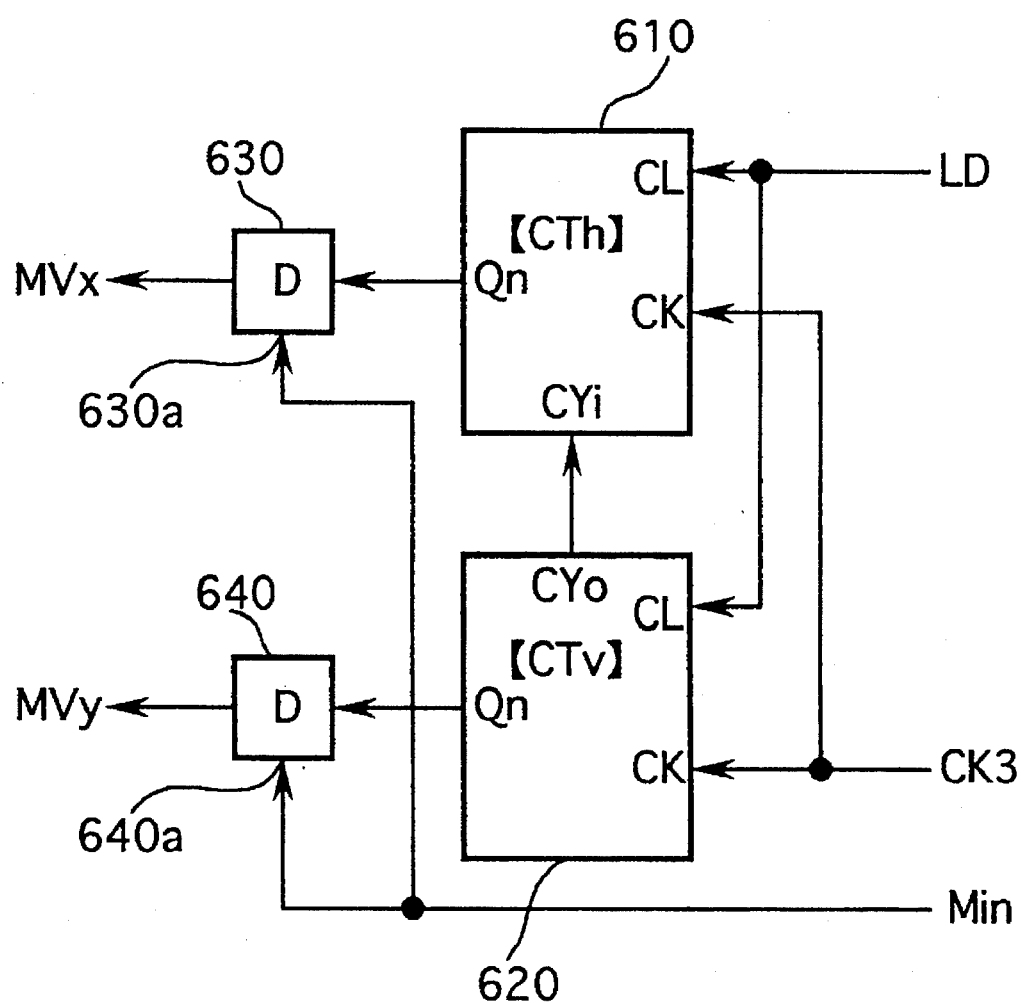
FIG. 12 is a block diagram showing the motion vector calculating means.

The motion vector calculating means 600 is shown in FIG. 12 as comprising quinary counters 610 and 620, and flip-flops 630 and 640. The quinary counter 610 has signal input terminals CK and CL, a carry input terminal CYi and a count output terminal Qn. The quinary counter 610 causes all outputs of the count output terminal Qn thereof to be set to "0" when the signal input terminal CL thereof receives a signal representative of "1". After all output of the count output terminal Qn of the quinary counter 610 are set to "0", the quinary counter 610 counts up from "0" in step with the carry signal received by the carry input terminal CYi to output, through the count output terminal Qn, the count number that reverts to "0" in the sequence of counting after reaching a maximum value of "4". The outputs of the count number are in simultaneous timing with the pulses of the signals received through the signal input terminal CK.

The quinary counter 620 has signal input terminals CK and CL, a carry output terminal CYo and a count output terminal Qn. The quinary counter 620 causes all output of the count output terminal Qn thereof to be set to "0" when the signal input terminal CL thereof receives a signal representative of "1". After all output of the count output terminal Qn of the quinary counter 620 are set to "0", the quinary counter 620 counts up from "0" in step with the clock signal CK3 received by the signal input terminal CK to output, through the count output terminal Qn, the count number that reverts to "0" in the sequence of counting after reaching a maximum value of "4". The quinary counter 620 outputs the carry signal through the carry output terminal CYo when the count number is reverted to "0".

The flip-flop 630 is constituted by D flip-flop and thus has a count input terminal, a signal input terminal 630*a* and a count output terminal. The flip-flop 630 is designed to latch data received through the count input terminal in simultaneous timing with the pulses of the signals received through the signal input terminal 630*a*.

The flip-flop 640 is constituted by D flip-flop and thus has a count input terminal, a signal input terminal 640*a* and a count output terminal. The flip-flop 640 is designed to latch data received through the count input terminal in simultaneous timing with the pulses of the signals received through the signal input terminal 640*a*.

The signal input terminal CL of the quinary counter 610 is electrically connected to the signal output terminal of the timing control unit 900 to receive the control signal LD, while the signal input terminal CK the quinary counter 610 is electrically connected to the signal output terminal of the timing control unit 900 to receive the control signal CK3. The signal input terminal CL of the quinary counter 620 is electrically connected to the signal output terminal of the timing control unit 900 to receive the control signal LD, while the signal input terminal CK of the quinary counter 620 is electrically connected to the signal output terminal of the timing control unit 900 to receive the control signal CK3. The carry output terminal CYo of the quinary counter 620 is electrically connected to the carry input terminal CYi of the quinary counter 610.

The count input terminal of the flip-flop 630 is electrically connected to the count output terminal Qn of the quinary counter 610 and the signal input terminal 630*a* of the flip-flop 630 is electrically connected to the signal output terminal of the logical product element 531 of the distortion specifying means 500 to receive the signal Min.

The count input terminal of the flip-flop 640 is electrically connected to the count output terminal Qn of the quinary counter 620 and the signal input terminal 640*a* of the flip-flop 640 is electrically connected to the signal output terminal of the logical product element 531 of the distortion specifying means 500 to receive the signal Min.

The operation of the motion estimation apparatus thus constructed will be described hereinafter with reference to FIGS. 13 to 24. A matrix array of squares shown in each of FIGS. 14–23 corresponds to a matrix array of shift registers RE(0,–1), RE(1,–1), RE(2,–1), RE(3,–1), RE(3,0), RE(3,1), RE(3,2), RE(3,3),RE(2,3), RE(1,3), RE(0,3) and the processor elements PE1*a*(0,0), PE1*a*(0,1), PE1*a*(0,2), PE1*a*(1,0), PE1*a*(1,1), PE1*a*(1,2), PE1*a*(2,0), PE1*a*(2,1), PE1*a*(2,2) shown in FIG. 8.

As will be understood from the clock signal CK1 and the control signals SU and SL shown in FIG. 13, before each of the clock pulses of the clock signal CK1 is outputted, the combination of the signal levels of the control signals SU and SL is changed. More specifically, before the first, second third and fourth clock pulses of the clock signal CK1 are outputted, the selector 1301 is operated to select the third data input terminal C, the first data input terminal A, the third data input terminal C and the second input terminal B of the selector 1301, respectively. The selection operation by the selector 1301 is repeated after the fifth clock pulse of the clock signal CK1.

When the D flip-flop 1302 detects a rising edge of a pulse of the clock signal CK1, each of the pel data currently selected by the data input terminal of the selector 1301 is latched by the D flip-flop 1302 of the processor element, and accordingly outputted to the other processor elements and shift registers through the data output terminals YUo, YDo, YLo of the present processor element.

Each of the processor elements and each of the registers is operated to receive data from the right side processor element or register, the upper side processor element or register, the right side processor element or register and the lower side processor element or register in FIG. 8 in step with the first, second third and fourth clock pulses of the clock pulse signal CK1, respectively. The receiving operation is repeated after the fifth clock pulse of the clock signal CK1.

Figure 14:
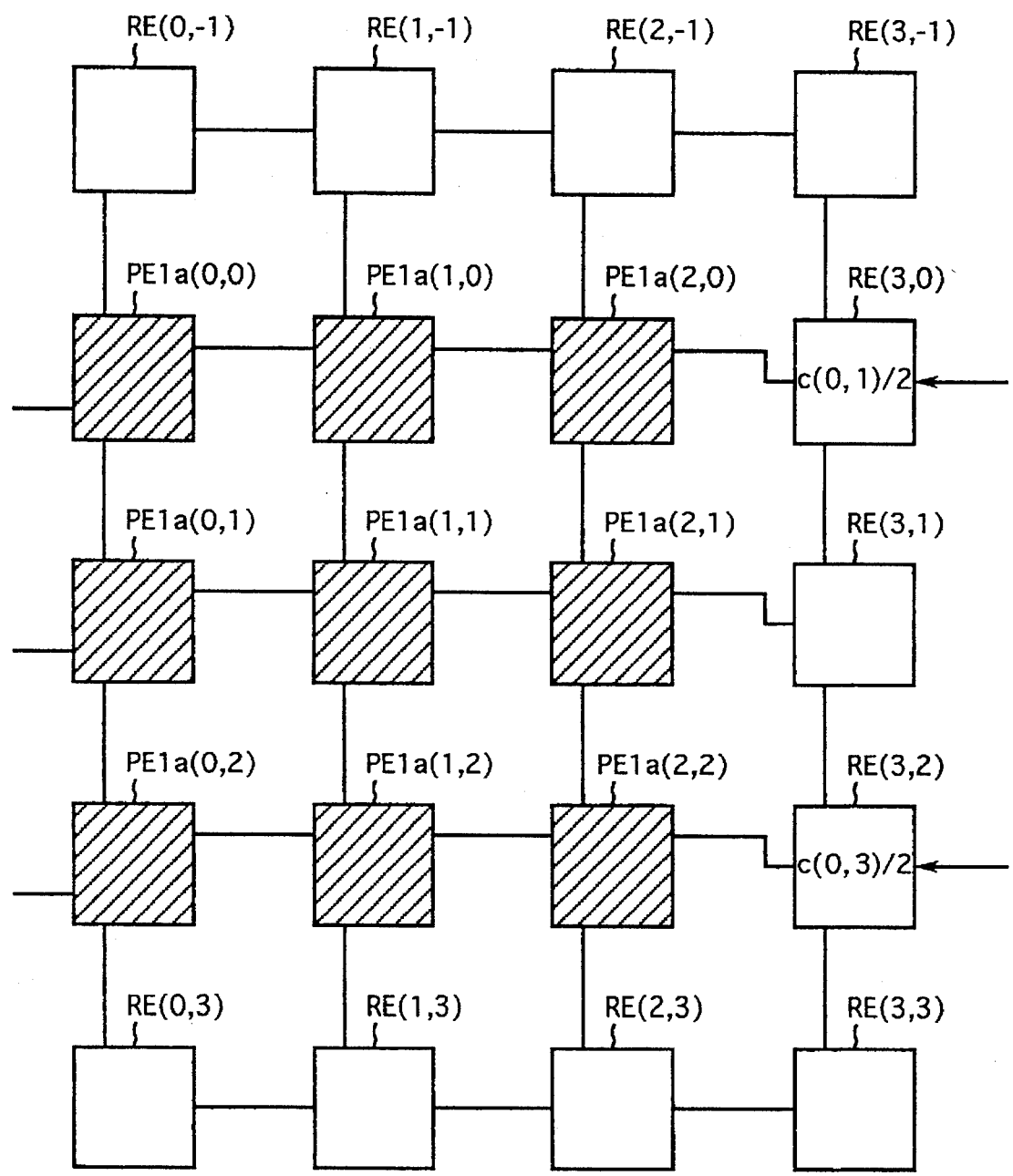
FIGS. 14 through 19 are diagrams showing flow of the candidate block data during initialization operation of the motion estimation apparatus shown in FIG. 8.

Firstly, the motion estimation apparatus is initialized between the first pulse and the sixth pulse of the clock signal CK1 shown in FIG. 13. When the first pulse of the clock signal CK1 is outputted from the timing control unit 900, the pel data c(0,1)/2 and c(0,3)/2 are supplied from the multipliers 411 and 412 of the candidate block obtaining means 400 to the shift registers RE(3,0) and RE(3,2), respectively, as shown in FIG. 14.

Figure 15:
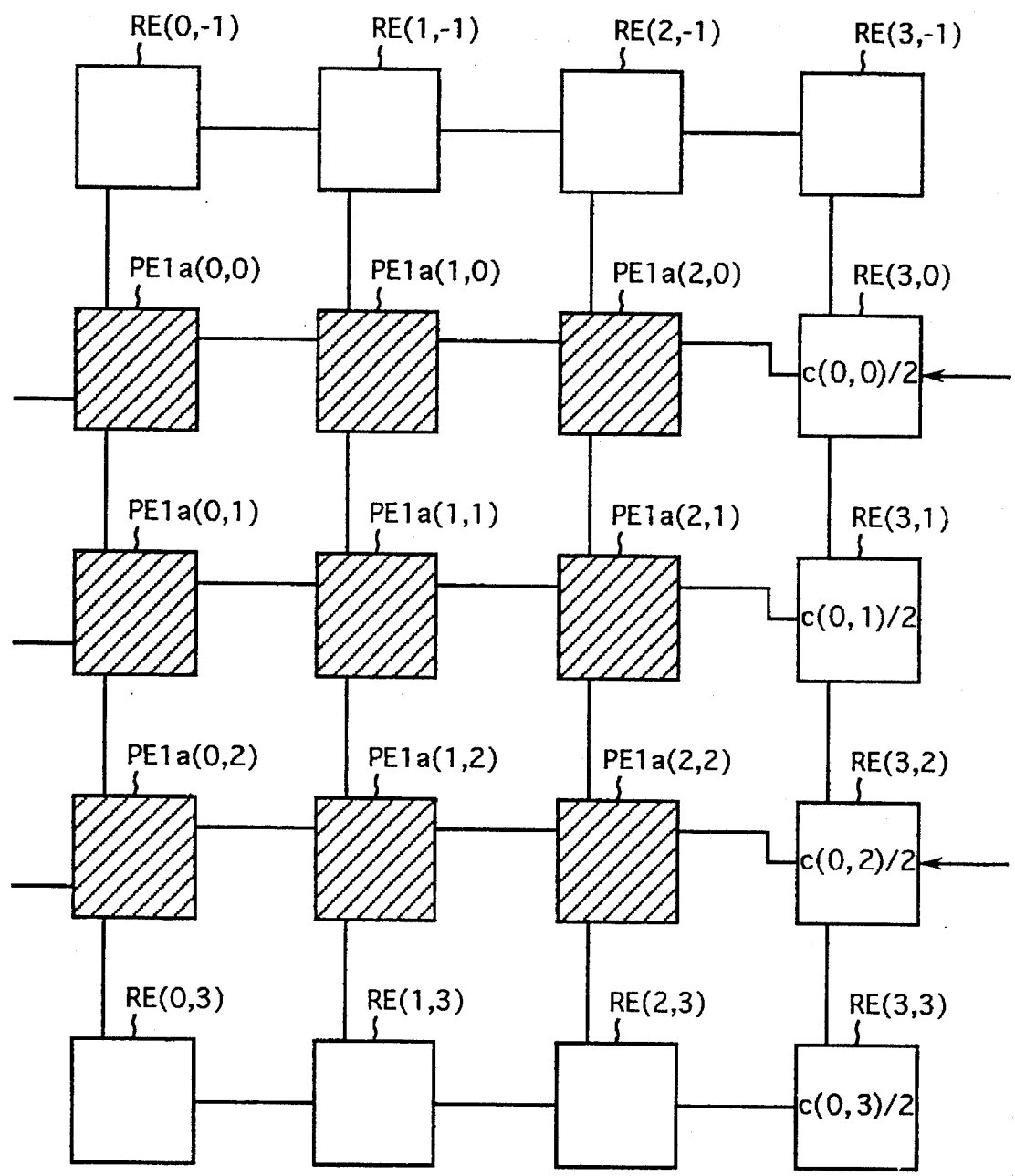

When the second pulse of the clock signal CK1 is outputted from the timing control unit 900, the pel data c(0,1)/2 and c(0,3)/2 are shifted from the shift registers RE(3,0) and RE(3,2) to the shift registers RE(3,1) and RE(3,3), respectively, as shown in FIG. 15. At the same time, the pel data c(0,0)/2 and c(0,2)/2 are supplied from the multipliers 411 and 412 of the candidate block obtaining means 400 to the shift registers RE(3,0) and RE(3,2), respectively.

Figure 16:
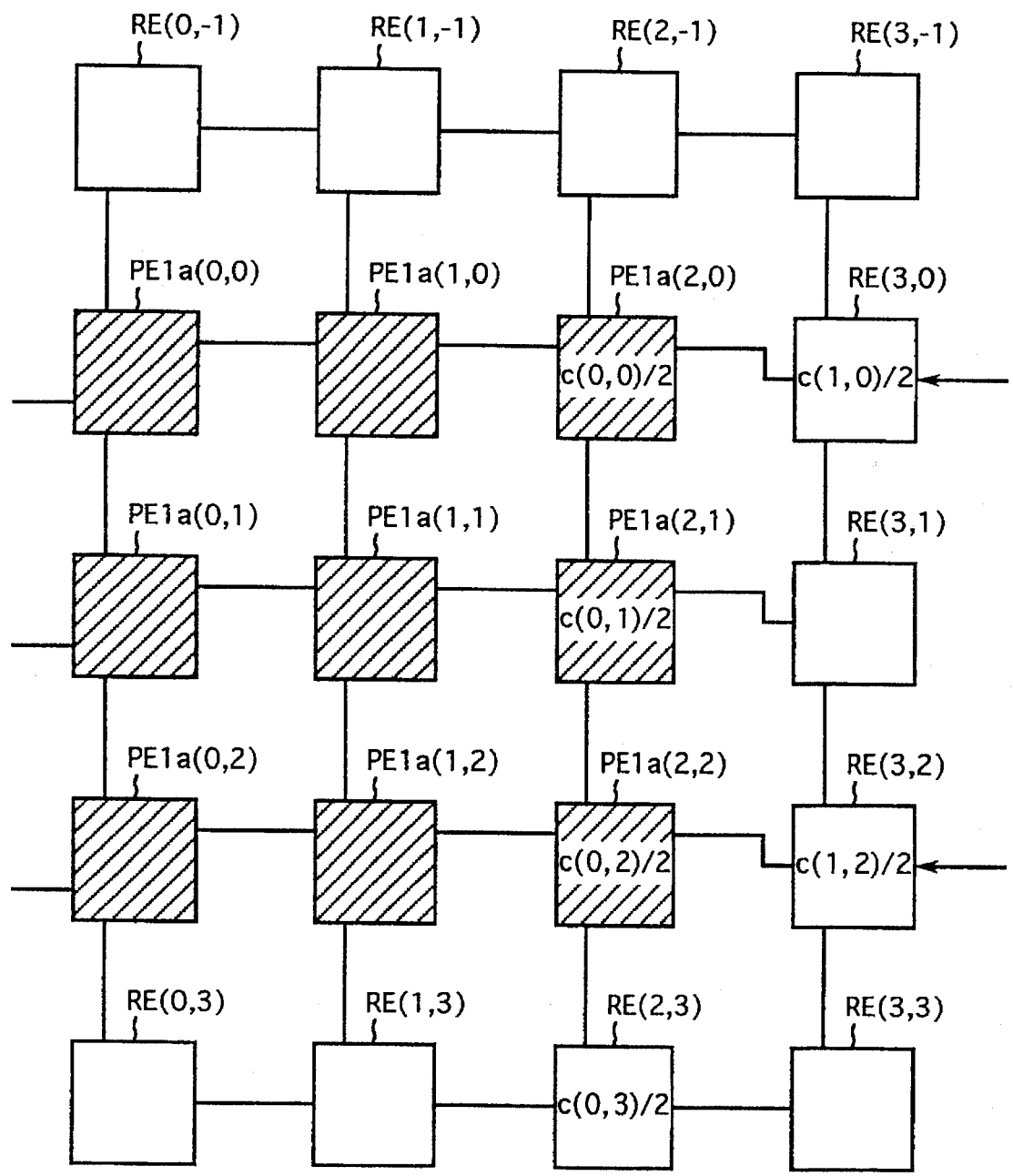

When the third pulse of the clock signal CK1 is outputted from the timing control unit 900, the pel data c(0,0)/2, c(0,1)/2, c(0,2)/2 and c(0,3)/2 are shifted from the shift registers RE(3,0), RE(3,1), RE(3,2) and RE(3,3) to the processor elements PE1*a*(2,0), PE1*a*(2,1) and PE1*a*(2,2), and the shirt registers RE(2,3), respectively, as shown in FIG. 16. At the same time, the pel data c(1,0)/2 and c(1,2)/2 are supplied from the multipliers 411 and 412 of the candidate block obtaining means 400 to the shift registers RE(3,0) and RE(3,2), respectively.

Figure 17:
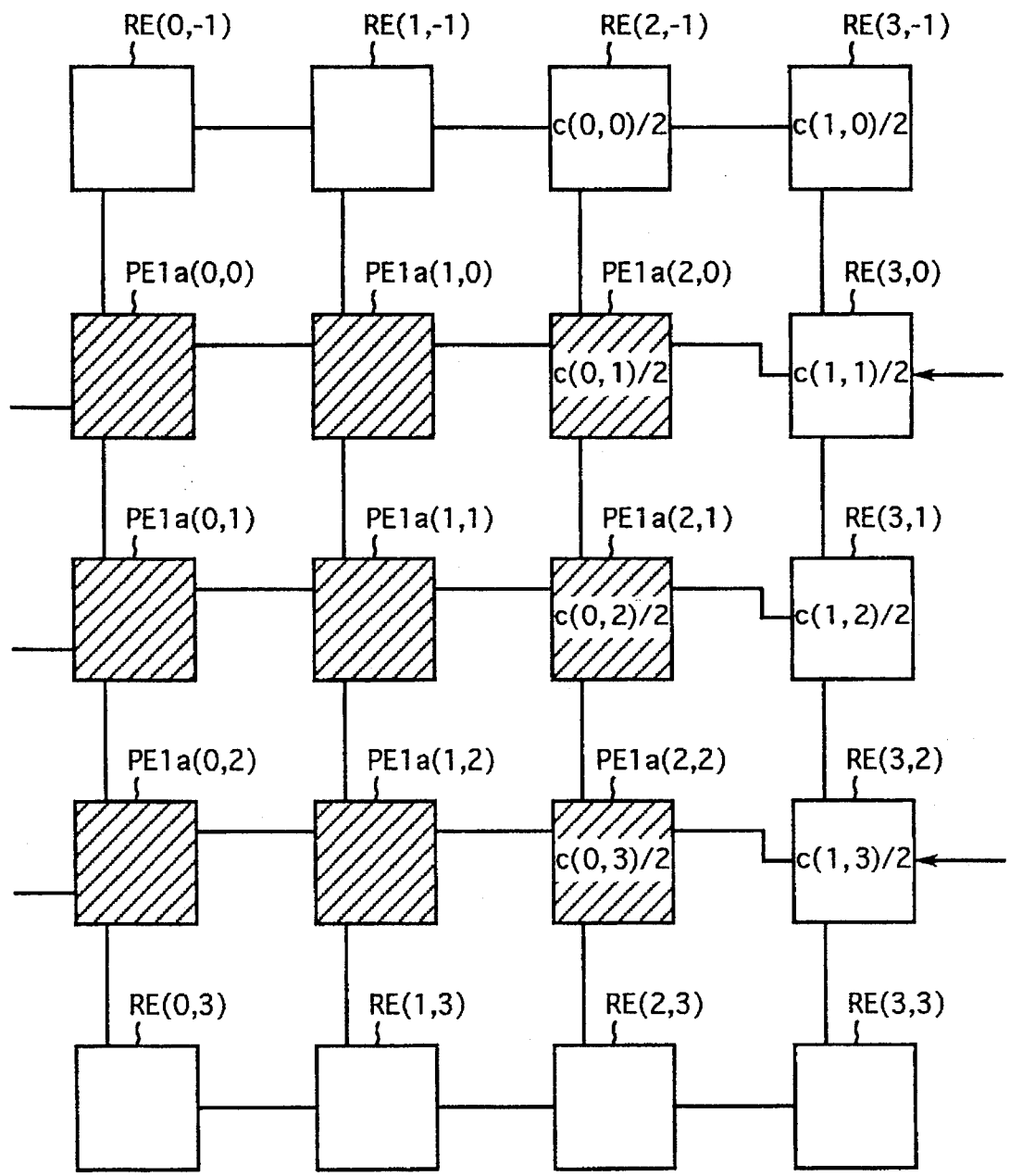

When the fourth pulse of the clock signal CK1 is outputted from the timing control unit 900, the pel data c(0,0)/2, c(0,1)/2, c(0,2)/2, c(0,3)/2, c(1,0)/2 and c(1,2)/2 are shifted from the processor elements PE1*a*(2,0), PE1*a*(2,1) and PE1*a*(2,2), and the shift registers RE(2,3), RE(3,0), RE(3,2) to the shift register RE(2,–1), the processor elements PE1*a*(2,0), PE1*a*(2, 1) and PE1*a*(2,2), shift registers RE(3, –1) and RE(3,1), respectively, as shown in FIG. 17. At the same time, the pel data c(1,1)/2 and c(1, 3)/2 are supplied from the multipliers 411 and 412 of the candidate block obtaining means 400 to the shift registers RE(3,0) and RE(3,2), respectively.

Figure 18:
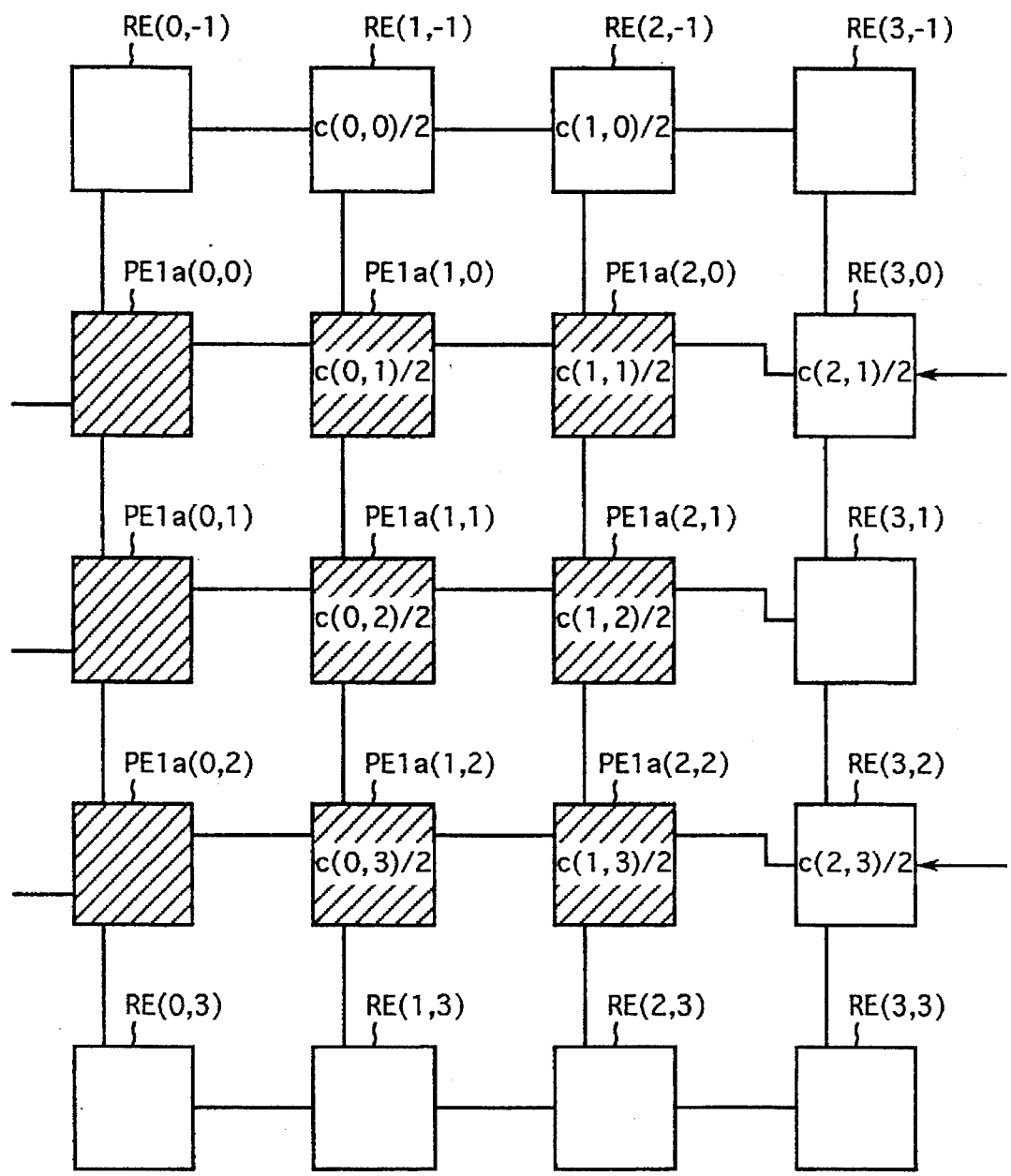

When the fifth pulse of the clock signal CK1 is outputted from the timing control unit 900, the pel data c(0,0)/2, c(0,1)/2, c(0,2)/2, c(0,3)/2, c(1,0)/2, c(1,1)/2, c(1,2)/2 and c(1,3)/2 are shifted from the shift register RE(2, –1), processor elements PE1*a*(2,0), PE(2,1) and PE1*a*(2,2), shift registers RE(3,–1), RE(3,0), RE(3,1), RE(3,2) to the shift register RE(1,–1), processor elements PE1*a*(1,0), PE1*a*(1,1) and PE1*a*(1,2), shift register RE(2,–1), processor elements PE1*a*(2,0), PE1*a*(2,1) and PE1*a*(2,2), respectively, as shown in FIG. 18. At the same time, the pel data c(2,1)/2 and c(2,3)/2 are supplied from the multipliers 411 and 412 of the candidate block obtaining means 400 to the shift registers RE(3,0) and RE(3,2), respectively.

Figure 19:
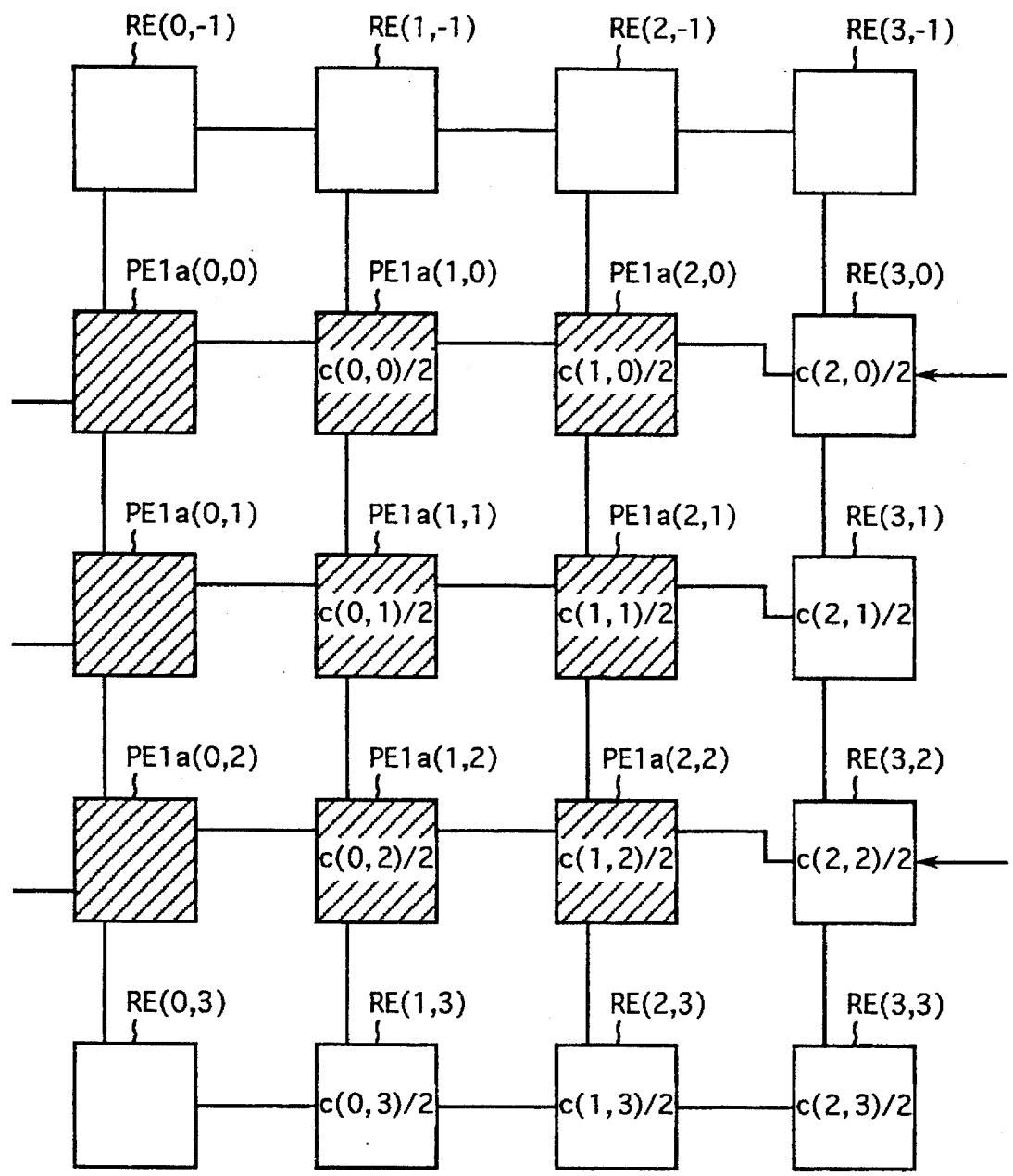

When the sixth pulse of the clock signal CK1 is outputted from the timing control unit 900, the pel data c(0,0)/2, c(0,1)/2, c(0,2)/2, c(0,3)/2, c(1,0)/2, c(1,1)/2, c(1,2)/2, c(1, 3)/2, c(2,1)/2 and c(2,3)/2 are shifted from the shift register RE(1,−1), processor elements PE1a(1,0), PE1a(1,1) and PE1a(1,2), shift register RE(2,−1), processor elements PE1a(2,0), PE1a(2,1) and PE1a(2,2), shift registers RE(3,0) and RE(3,2) to the processor elements PE1a(1,0), PE1a(1,1) and PE1a(1,2), shift register RE(1,3), processor elements PE1a(2,0), PE1a(2,1) and PE1a(2,2), shift registers RE(2,3), RE(3,1) and RE(3,3), respectively, as shown in FIG. 19. At the same time, the pel data c(2,0)/2 and c(2,2)/2 are supplied from the multipliers 411 and 412 of the candidate block obtaining means 400 to the shift registers RE(3,0) and RE(3,2), respectively.

Figure 20:
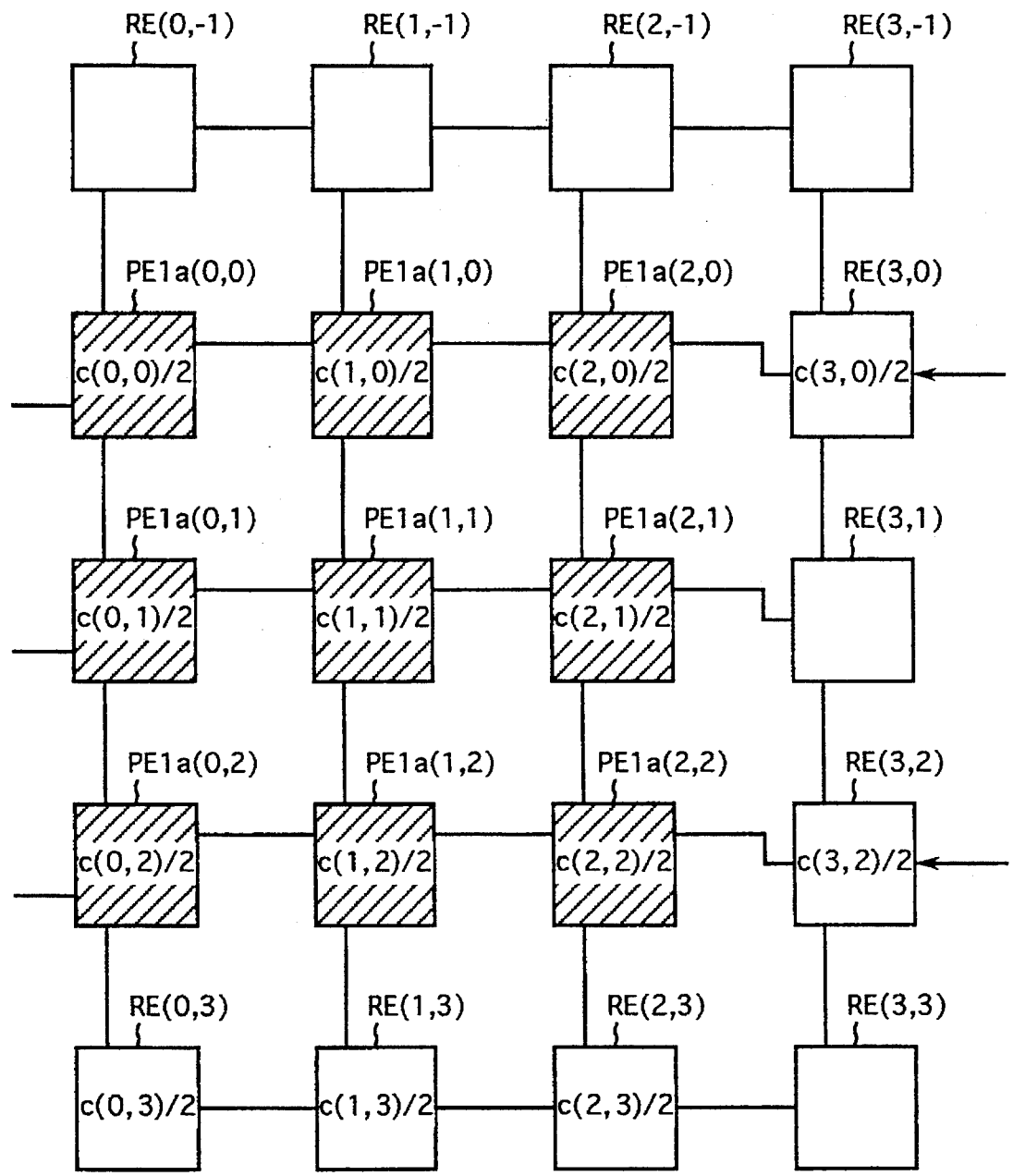
FIGS. 20 through 23 are diagrams showing flow of the candidate block data in periods (a) to (d), respectively, and local distortion values calculated in each of periods (a) to (d) by the central processor element shown in FIG. 8.

When the seventh pulse of the CK1 is outputted from the timing control unit 900, the pel data c(0,0)/2, c(0,1)/2, c(0,2)/2, c(0,3)/2, c(1,0)/2, c(1,1)/2, c(1,2)/2, c(1,3)/2, c(2,0)/2, c(2,1)/2, c(2,2)/2, c(2,3)/2 are shifted from the processor elements PE1a(1,0), PE(1,1) and PE(1,2), shift register RE(1,3), processor elements PE1a(2,0), PE1a(2,1) and PE1a(2,2), shift registers RE (2,3) and RE (3,0), RE(3,1), RE(3,2) and RE(3,3) to the processor elements PE1a(0,0), PE1a(0,1) and PE1a(0,2), shift register RE(0,3), processor elements PE1a(1,0), PE1a(1,1) and PE1a(1,2), shift register RE(1,3), processor elements PE1a(2,0), PE1a(2,1) and PE1a(2,2), and shift register RE(2,3), respectively, as shown in FIG. 20. At the same time, the pel data c(3,0)/2 and c(3,2)/2 are supplied from the multipliers 411 and 412 of the candidate block obtaining means 400 to the shift registers RE(3,0) and RE(3,2), respectively.

Figure 21:
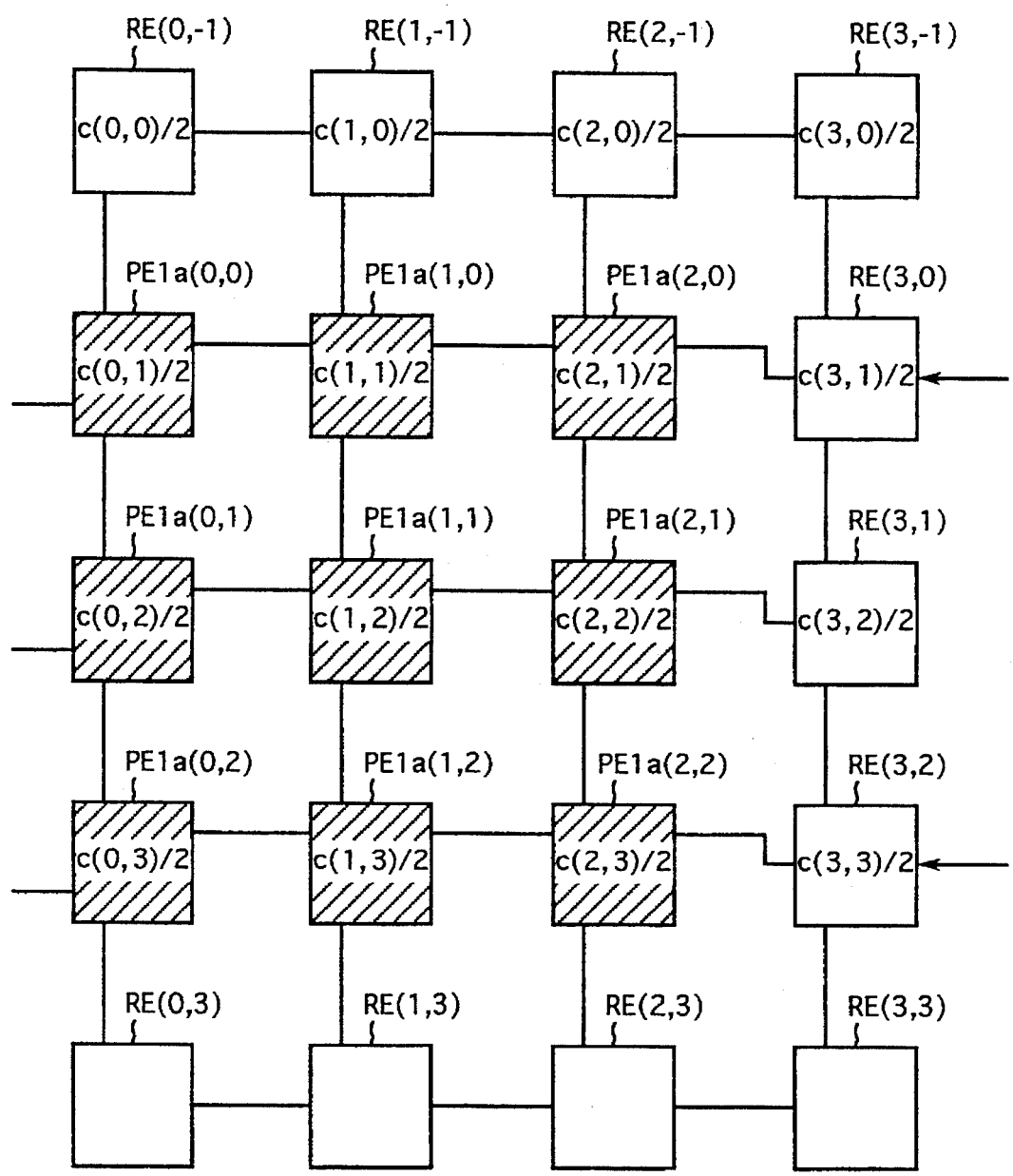

When the eighth pulse of the CK1 is outputted from the timing control unit 900, the integer pel data c(0,0)/2, c(0,1)/2, c(0,2)/2, c(0,3)/2, c(1,0)/2, c(1,1)/2, c(1,2)/2, c(1,3)/2, c(2,0)/2, c(2,1)/2, c(2,2)/2, c(2,3)/2, c(3,0)/2 and c(3,2)/2 are shifted from the processor elements PE1a(0,0), PE1a(0,1) and PE1a(0,2), shift register RE(0,3), processor elements PE1a(1,0), PE1a(1,1) and PE1a(1,2), shift register RE(1,3), processor elements PE1a(2,0), PE1a(2,1) and PE1a(2,2), and shift registers RE(2,3), RE(3,0) and RE(3,2) to the shift register RE(0,−1), processor elements PE1a(0,0), PE1a(0,1) and PE1a(0,2), shift register RE(1,−1), processor elements PE1a(1,0), PE1a(1,1) and PE1a(1,2), shift register RE(2,−1), processor elements PE1a(2,0), PE1a(2,1) and PE1a(2,2), and shift registers RE(3,−1) and RE(3,1), respectively, as shown in FIG. 21. At the same time, the integer pel data c(3,1)/2 and c(3,3)/2 are supplied from the candidate block obtaining means 400 to the shift registers RE(3,0) and RE(3,2), respectively.

Figure 22:
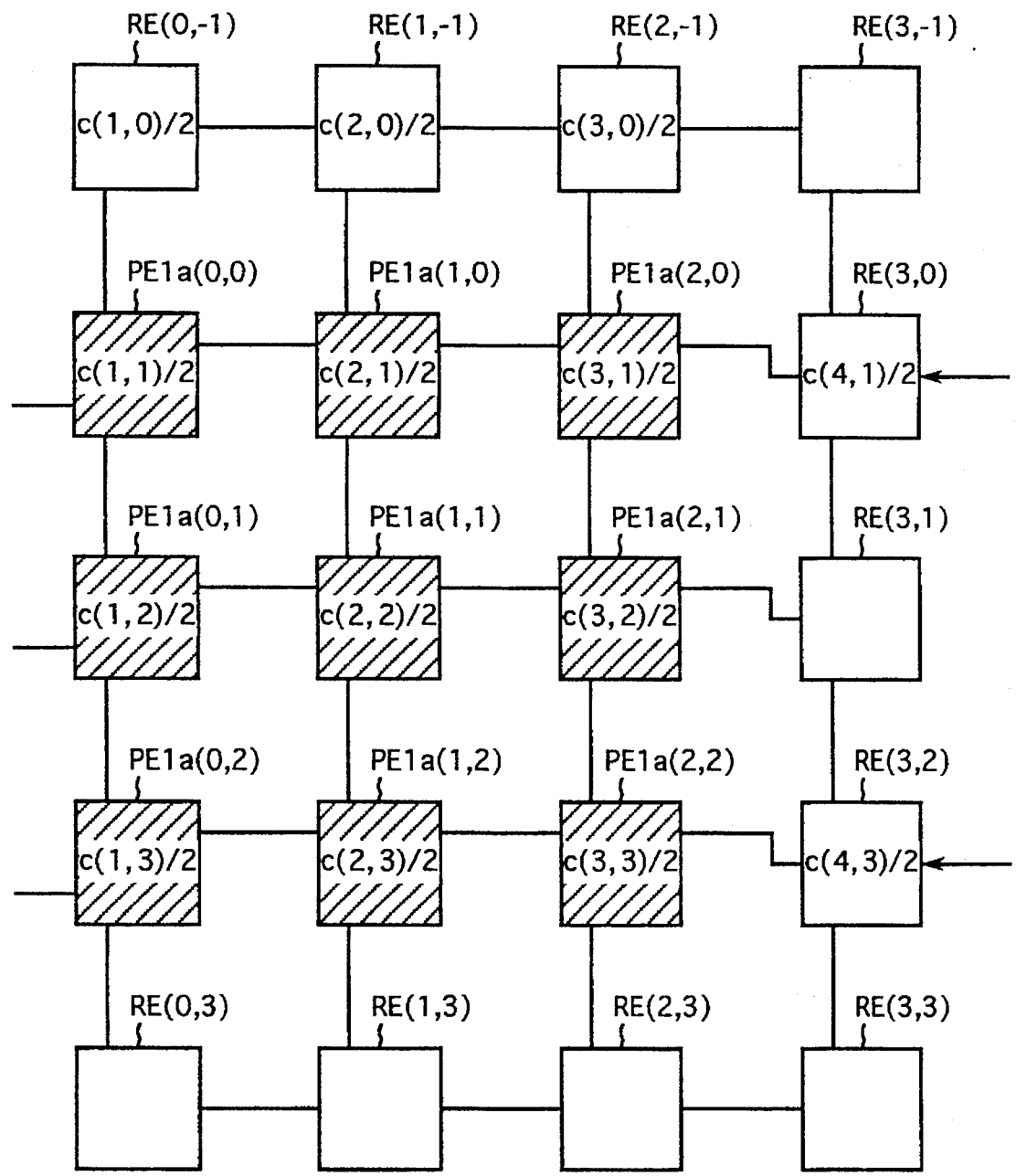

When the ninth pulse of the CK1 is outputted from the timing control unit 900, the integer pel data c(1,0)/2, c(1,1)/2, c(1,2)/2, c(1,3)/2, c(2,0)/2, c(2,1)/2, c(2,2)/2, c(2,3)/2, c(3,0)/2, (3,1)/2, c(3,2)/2 and c(3,3)/2 are shifted from the shift register RE(1,−1), processor elements PE1a(1,0), PE1a(1,1) and PE1a(1,2), shift register RE(2,−1), processor elements PE1a(2,0), PE1a(2,1) and PE1a(2,2), and shift registers RE(3,−1), RE(3,0), RE(3,1) and RE(3,2) to the shift register RE(0,−1), processor elements PE1a(0,0), PE1a(0,1) and PE1a(0,2), shift register RE(1,−1), processor elements PE1a(1,0), PE1a(1,1) and PE1a(1,2), shift register RE(2,−1), processor elements PE1a(2,0), PE1a(2,1) and PE1a(2,2), respectively, as shown in FIG. 22. At the same time, the integer pel data c(4,1)/2 and c(4,3)/2 are supplied from the candidate block obtaining means 400 to the shift registers RE(3, 0) and RE(3, 2), respectively.

Figure 23:
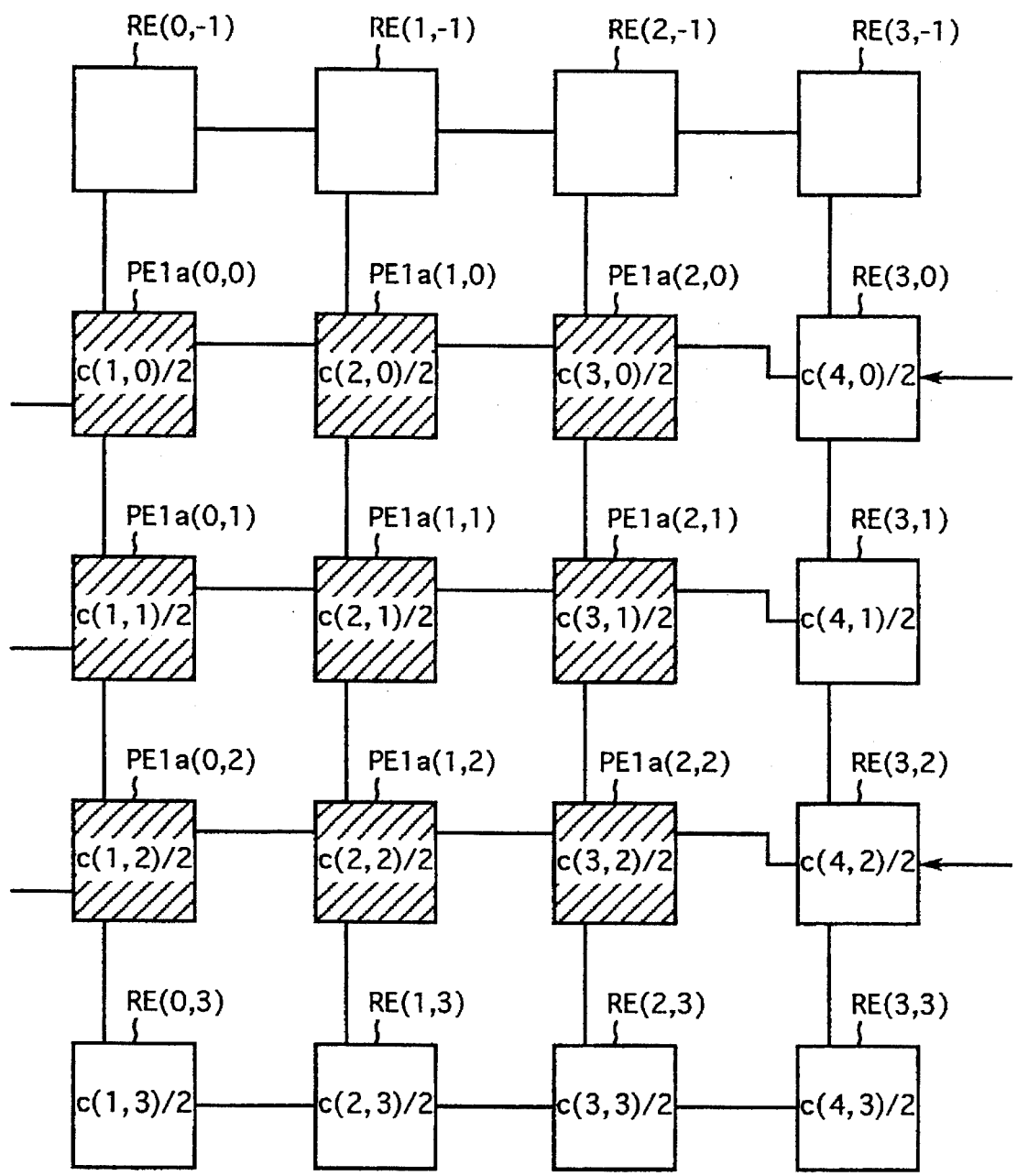

When the tenth pulse of the CK1 is outputted from the timing control unit 900, the integer pel data c(1,0)/2, c(1,1)/2, c(1,2)/2, c(1,3)/2, c(2,0)/2, c(2,1)/2, c(2,2)/2, c(2,3)/2, c(3,0)/2, c(3,1)/2, c(3,2)/2, c(3,3)/2, c(4,1)/2 and c(4,3)/2 are shifted from the shift register RE(0,−1), processor elements PE1a(0,0), PE1a(0,1) and PE1a(0,2), shift register RE(1,−1), processor elements PE1a(1,0), PE1a(1,1), and PE1a(1,2), shift register RE(2,−1), processor elements PE1a(2,0), PE1a(2,1) and PE1a(2,2), and shift registers RE(3,0) and RE(3,2) to the processor elements PE1a(0,0), PE1a(0,1) and PE1a(0,2), shift register RE(0,3), processor elements PE1a(1,0), PE1a(1,1) and PE1a(1,2), shift register RE(1,3), processor elements PE1a(2,0), PE1a(2,1) and PE1a(2,2), and shift registers RE(2,3), RE(3,1) and RE(3,3), respectively, as shown in FIG. 23. At the same time, the integer pel data c(4,0)/2 and c(4,2)/2 are supplied from the candidate block obtaining means 400 to the shift registers RE(3,0) and RE(3,2), respectively.

Next, each of the processor elements PE1a(x,y) of the motion estimation apparatus calculates local distortion values during the period (g) to (j).

Before the beginning of the period (g), the second signal input terminal 1307b of the D flip-flop 1307 of each of the processor elements PE(x,y) is supplied the control signal CLE from the timing control unit 900. Accordingly, the D flip-flop 1307 detects a low-to-high transition of the signal received by the second signal input terminal 1307b and resets data on the data output terminal to "0".

During the period (g) shown in FIG. 13, the pel data sets c(0,0)/2, c(0,1)/2, c(0,2)/2, c(1,0)/2, c(1,1)/2, c(1,2)/2, c(2,0)/2, c(2,1)/2, c(2,2)/2, are received in described order by the first data input terminal A of the subtracter 1303 of the processor elements PE1a(0,0), PE1a(0,1), PE1a(0,2), PE1a(1,0), PE1a(1,1), PE1a(1,2), PE1a(2,0), PE1a(2,1) and PE1a(2,2), respectively, from the D flip-flop 1302 of each of the processor elements PE1a(x,y). The pel data sets c(0,3)/2, c(1,3)/2, c(2,3)/2, c(3,0)/2, c(3,2)/2 are also received in described order by the shift registers RE(0,3), RE(1,3), RE(2,3), RE(3,0) and RE(3,2). At the same time, the pel data a(0,0)−b(0,0)/2 of the template block 4a is supplied from the template block obtaining means 200 to each of the processor elements PE1a(x,y) through the data input terminal X of the present processor element PE(x, y) and the second data input terminal B of the subtracter 1303 of each of the processor elements PE1a(x,y), respectively.

The pel data a(0,0)−b(0,0)/2 and the pel data c(x,y)/2 are received by the subtracter 1303 of each of the processor elements PE1a(x,y) and accordingly data indicated by {c(x,y)/2}−{a(0,0)−b(0,0)/2} are calculated by the subtracter 1303. The data calculated by the subtracter 1303 is transmitted to the positive value transducer 1305 and converted to data recited as follows:

|{c(x,y)/2}−{a(0,0)−b(0,0)/2}|

The converted data is transmitted from the positive value transducer 1305 to the adder 1306 through the data input terminal A and data output terminal B of the adder 1306 and the D flip-flop 1307.

During the period (h) in FIG. 13, the pel data sets c(x,y+1)/2 are received by the first data input terminal A of the subtracter 1303 of each of the processor elements PE1a(x,y) from the D flip-flop 1302 through the data output terminal of the D flip-flop 1302 of the lower side processor element PE1a(x,y+1) or the data output terminal of the lower side shift registers RE(x,y+1) in FIG. 8. At the same time, the pel data a(0,1)−b(0,1)/2 of the template block 4a is supplied from the template block obtaining means 200 to each of the processor elements PE1a(x,y) through the data input terminal X of the present processor element PE1a(x,y) and the second data input terminal B of the subtracter 1303 of each of the processor elements PE1a(x, y).

The pel data sets a(0,1)−b(0,1)/2 and c(x,y+1)/2 are received by the subtracter 1303 of each of the processor elements PE1$a$(x,y), and accordingly data indicative of $\{c(x,y+1)/2\}-\{a(0,1)-b(0,1)/2\}$ are calculated by the subtracter 1303 and transmitted from the subtracter 1303 to the positive value transducer 1305. The data calculated by the subtracter 1303 is converted to data indicative of $|\{c(x,y+1)/2\}-\{a(0,1)-b(0,1)/2\}|$ and transmitted to the first data input terminal A of the adder 1306 in which data indicative of the following expression is calculated by the adder 1306.

$|\{c(x,y)/2\}-\{a(0,0)-b(0,0)/2\}|$ $+|\{c(x,y+1)/2\}-\{a(0,1)/2\}|$

The data calculated by the adder 1306 is transmitted to the second data input terminal B of the adder 1306.

During the period (i) shown in FIG. 13, the pel data sets $c(x+1,y+1)/2$ are received by the first data input terminal A of the subtracter 1303 of each of the processor elements PE1$a$(x,y) from the D flip-flop 1302 through the data output terminal of the D flip-flop 1302 of the right side processor element PE1$a$(x+1,y) or the data output terminal of the right side shift registers RE(x+1,y) in FIG. 8. At the same time, the pel data $a(1,1)-b(1,1)/2$ of the template block 4$a$ is supplied from the template block obtaining means 200 to each of the processor elements PE1$a$(x,y) through the data input terminal X of the present processor element PE1$a$(x,y) and the second data input terminal B of the subtracter 1303 of each of the processor elements PE1$a$(x,y).

The pel data $a(1,1)-b(1,1)/2$ and $c(x+1,y+1)/2$ are received by the subtracter 1303 of each of the processor elements PE1$a$(x,y) and accordingly data indicative of $\{c(x+1,y+1)/2\}-\{a(1,1)-b(1,1)/2\}$ are calculated by the subtracter 1303 and transmitted from the subtracter 1303 to the positive value transducer 1305. The data calculated by the subtracter 1303 is converted to data indicative of $|\{c(x+1,y+1)/2\}-\{a(1,1)-b(1,1)/2\}|$ and transmitted to the first data input terminal A of the adder 1306 in which data indicative of the following expression is calculated by the adder 1306.

$|\{c(x,y)/2\} - \{a(0,0) - b(0,0)/2\}| + |\{c(x,y+1)/2\} - \{a(0,1) - b(0,1)/2\}| + |\{c(1x+1,y+1)/2\} - \{a(1,1) - b(1,1)/2\}|$

The data calculated by the adder 1306 is transmitted to the second data input terminal B of the adder 1306.

During the period (j) shown in FIG. 13, the pel data sets $c(x+1,y)/2$ are received by the first data input terminal A of the subtracter 1303 of each of the processor elements PE1$a$(x,y) from the D flip-flop 1302 through the data output terminal of the D flip-flop 1302 of the upper side processor element PE1$a$(x,y−1) or the data output terminal of the upper side shift registers RE(x,y−1) in FIG. 8. At the same time, the pel data $a(1,0)-b(1,0)/2$ of the template block 4$a$ is supplied from the template block obtaining means 200 to each of the processor elements PE1$a$(x,y) through the data input terminal X of the present processor element PE1$a$(x,y) and the second data input terminal B of the subtracter 1303 of each of the processor elements PE1$a$(x,y).

The pel data $a(1,0)-b(1,0)/2$ and $c(x+1,y)/2$ are received by the subtracter 1303 of each of the processor elements PE1$a$(x,y) and accordingly data indicative of $\{c(x+1,y)/2\}-\{a(1,0)-b(1,0)/2\}$ are calculated by the subtracter 1303 and transmitted from the subtracter 1303 to the positive value transducer 1305. The data calculated by the subtracter 1303 is converted to data indicative of $|\{c(x+1,y)/2\}-\{a(1,0)-b(1,0)/2\}|$ and transmitted to the first data input terminal A of the adder 1306 in which data indicative of the following expression is calculated by the adder 1306.

$|\{c(x,y)/2\} - \{a(0,0) - b(0,0)/2\}| +$ (Q1)
$|\{c(x,y+1)/2\} - \{a(0,1) - b(0,1)/2\}| + |\{c(x+1,y+1)/2\} -$ $\{a(1,1) - b(1,1)/2\}| + |\{c(x+1,y)/2\} - \{a(1,0) - b(1,0)/2\}|$

In step with the pulse of the control signal LD in the period (j), the second data input terminal B of the selector 1308 is selected so as to connect with the data output terminal thereof. The data indicative of (Q1) calculated by the adder 1306 is outputted from the data output terminal DIo of each of the processor element PE1$a$(x,y) through the D flip-flop 1307, the selector 1308 and the D flip-flop 1309 in step with the eleventh pulse of the clock pulse CK1, i.e., the first pulse of the control signal CK2 in FIG. 13. In the case of the processor element PE1$a$(1,1), data indicative of the following expression is outputted through the data output terminal DIo of the processor element PE1$a$(1,1).

$|\{c(1,1)/2\} - \{a(0,0) - b(0,0)/2\}| +$
$\quad |\{c(1,2)/2\} - \{a(0,1) - b(0,1)/2\}| +$
$\quad |\{c(2,2)/2\} - \{a(1,1) - b(1,1)/2\}| +$
$\quad\quad |\{c(2,1)/2\} - \{a(1,0) - b(1,0)/2\}|$ During the period (g), the data $\{c(x,y)/2\}-\{a(0,0)-b(0,0)/2\}$ are received by the first data input terminal A of the adder 1313 of each of the processor elements PE1$a$(x,y) from the subtracter 1303 of the present processor elements PE1$a$(x,y) through the data output terminal of the subtracter 1303. At the same time, the data $\{c(x,y+1)/2\}-\{a(0,0)-b(0,0)/2\}$ are received by the second data input terminal B of the adder 1313 of each of the processor elements PE1$a$(x,y) from the data output terminal of the subtracter 1303 of the lower side processor elements PE1$a$(x,y+1) in FIG. 8.

In each of the processor elements PE1$a$(x,y), data indicative of $\{c(x,y)/2(a(0,0)-b(0,0)/2)\}+\{c(x,y+1)/2-(a(0,0)-(0,0)/2)\}$ is calculated by the adder 1313 and transmitted from the subtracter 1313 to ½ multiplier 1314, and are multiplied ½ by multiplier 1314. The multiplied data is converted by the positive value transducer 1315 to data recited as follows:

$|[\{c(x,y)/2-(a(0,0)-b(0,0)/2)\}+\{c(x,y+1)/2-(a(0,0)-b(0,0)/2)\}]/2|$

The converted data is transmitted to the second data input terminal B of the adder 1316 through the first data input terminal A and the data output terminal of the adder 1316 and the D flip-flop 1317.

During the period (h), an arithmetic operation similar to that in the period (g) is carried out, and as a consequence data indicative of $|[\{c(x,y+1)/2-(a(0,1)-b(0,1)/2)\}+\{c(x,y+2)/2-(a(0,1)-b(0,1)/2)\}]/2|$ is calculated by the positive value transducer 1315 and transmitted to the adder 1316 in which data indicative of the following expression is calculated.

$|[\{c(x, y)/2-(a(0,0)-b(0,0)/2)\}+\{c(x,y+1)/2-(a(0,0)-b(0,0)/2)\}]/2|$ $+|[\{c(x,y+1)/2-(a(0,1)-b(0,1)/2)\}+\{c(x,y+2)/2-(a(0,1)-b(0,1)/2)\}]/2|$

The data calculated by the adder 1316 is transmitted to the second data input terminal B of the adder 1316 by way of the D flip-flop 1317.

During the period (i), an arithmetic operation similar to that in the period (g) is carried out, data indicative of $|[\{c(x+1,y+1)/2-(a(1,1)-b(1,1)/2)\}+\{c(x+1,y+2)/2-(a(1,1)-b(1,1)/2)\}]/2|$ are calculated by the positive value transducer 1315 and transmitted to the adder 1316 in which data indicative of the following expression is calculated.

$|[\{x(x,y)/2 - (a(0,0) - b(0,0)/2\} +$
$\quad \{c(x,y + 1)/2 - (a(0,0) - b(0,0)/2)\}]/2| +$
$\quad |[\{c(x,y + 1)/2 - (a(0,1) - b(0,1)/2)\} +$
$\quad c\{(x,y + 2)/2 - (a(0,1) - b(0,1)/2)\}]/2| +$
$\quad |[\{c(x + 1,y + 1)/2 - (a(1,1) - b(1,1)/2)\} +$
$\quad\quad \{c(x + 1,y + 2)/2 - (a(1,1) - b(1,1)/2)\}]/2|$ The data calculated by the adder 1316 is transmitted to the second data input terminal B of the adder 1316 by way of the D flip-flop 1317.

During the period (j), an arithmetic operation similar to that in the period (g) is carried out, data indicative of $|\{c(x+1,y)/2-(a(1,0)-b(1,0)/2)\}+\{c(x+1,y+1)/2-(a(1,0)-b(1,0)/2)\}|/2|$ are calculated by the positive value transducer 1315 and transmitted to the adder 1316 in which data indicative of the following expression is calculated.

$$\begin{aligned}
&|\{x(x,y)/2 - (a(0,0) - b(0,0)/2) + \\
&\quad \{c(x,y+1)/2 - (a(0,0) - b(0,0)/2)\}|/2| + \\
&|\{c(x,y+1)/2 - (a(0,1) - b(0,1)/2)\} + \\
&\quad \{c(x,y+2)/2 - (a(0,1) - b(0,1)/2)\}|/2| + \\
&|\{c(x+1,y+1)/2 - (a(1,1) - b(1,1)/2)\} + \\
&\quad \{c(x+1,y+2)/2 - (a(1,1) - b(1,1)/2)\}|/2| \\
&|\{c(x+1,y)/2 - (a(1,0) - b(1,0)/2)\} + \\
&\quad \{c(x+1,y+1)/2 - (a(1,0) - b(1,0)/2)\}|/2|
\end{aligned} \quad (Q2)$$

In step with the pulse of the control signal LD in the period (j), the second data input terminal B of the selector 1318 is selected so as to connect with the data output terminal thereof. The data indicative of (Q2) calculated by the adder 1316 is outputted from the data output terminal DIo of each of the processor element PE1$a$(x,y) through the D flip-flop 1317, the selector 1318 and the D flip-flop 1319 in step with the eleventh pulse of the clock pulse CK1, i.e., the first pulse of the control signal CK2 in FIG. 13. In the case of the processor element PE1$a$(1,1), data indicative of the following expression is outputted through the data output terminal Do of the processor element PE1$a$(1,1).

$$\begin{aligned}
&|\{c(1,1)/2 - (a(0,0) - b(0,0)/2)\} + \\
&\quad \{c(1,2)/2 - (a(0,0) - b(0,0)/2)\}|/2| + \\
&|\{c(1,2)/2 - (a(0,1) - b(0,1)/2)\} + \\
&\quad \{c(1,3)/2 - (a(0,1) - b(0,1)/2)\}|/2| + \\
&|\{c(2,2)/2 - (a(1,1) - b(1,1)/2)\} + \\
&\quad \{c(2,3)/2 - (a(1,1) - b(1,1)/2)\}|/2| + \\
&|\{c(2,1)/2 - (a(1,0) - b(1,0)/2)\} + \\
&\quad \{c(2,2)/2 - (a(1,0) - b(1,0)/2)\}|/2|
\end{aligned}$$

During the period (g), the data $\{c(x,y)/2\}-\{a(0,0)-b(0,0)/2\}$ are received by the first data input terminal A of the adder 1323 of each of the processor elements PE1$a$(x,y) from the subtracter 1303 of the present processor elements PE1$a$(x,y) through the data output terminal of the subtracter 1303. At the same time, the data $\{c(x+1,y)/2\}-\{a(0,0)-b(0,0)/2\}$ are received by the second data input terminal B of the adder 1323 of each of the processor elements PE1$a$(x,y) from the data output terminal of the subtracter 1303 of the right side processor elements PE1$a$(x+1,y) or the right side shift register RE (x+1,y) in FIG. 8.

In each processor element PE1$a$(x,y), data indicative of $\{c(x,y)/2-(a(0,0)-b(0,0)/2)\}+\{c(x+1,y)/2-(a(0,0)-(0,0)/2)\}$ is calculated by the adder 1323 and multiplied ½ by multiplier 1324. The multiplied data is converted by the positive value transducer 1325 to data recited as follows:

$|\{c(x,y)/2-(a(0,0)-b(0,0)/2)\}+\{c(x+1,y)/2-(a(0,0)-b(0,0)/2)\}|/2|$

The converted data is transmitted to the second data input terminal B of the adder 1326 through the first data input terminal A and the data output terminal of the adder 1326 and the D flip-flop 1327.

During the period (h), an arithmetic operation similar to that in the period (g) is carried out, data indicative of $|\{c(x,y+1)/2-(a(0,1)-b(0,1)/2)\}+\{c(x+1,y+1)/2-(a(0,1)-b(0,1)/2)\}|/2|$ are calculated by the positive value transducer 1325 and transmitted to the adder 1326 in which data indicative of the following expression is calculated.

$|\{c(x,y)/2-(a(0,0)-b(0,0)/2)\}+\{c(x+1,y)/2-(a(0,0)-b(0,0)/2)\}|/2|$ $+|\{c(x,y+1)/2-(a(0,1)-b(0,1)/2)\}+\{c(x+1,y+1)/2-(a(0,1)-b(0,1)/2)\}|/2|$

The data calculated by the adder 1326 is transmitted to the second data input terminal B of the adder 1326 by way of the D flip-flop 1327.

During the period (i), an arithmetic operation similar to that in the period (g) is carried out, data indicative of $|\{c(x+1,y+1)/2-(a(1,1)-b(1,1)/2)\}+\{c(x+2,y+1)/2-(a(1,1)-b(1,1)/2)\}|/2|$ are calculated by the positive value transducer 1315 and transmitted to the adder 1326 in which data indicative of the following expression is calculated.

$$\begin{aligned}
&|\{c(x,y)/2 - (a(0,0) - b(0,0)/2)\} + \\
&\quad \{c(1x+1,y)/2 - (a(0,0) - b(0,0)/2)\}|/2| + \\
&|\{c(x,y+1)/2 - (a(0,1) - b(0,1)/2)\} + \\
&\quad \{c(x+1,y+1)/2 - (a(0,1) - b(0,1)/2)\}|/2| + \\
&|\{c(x+1,y+1)/2 - (a(1,1) - b(1,1)/2)\} + \\
&\quad \{c(x+2,y+1)/2 - (a(1,1) - b(1,1)/2)\}|/2|
\end{aligned}$$

The data calculated by the adder 1326 is transmitted to the second data input terminal B of the adder 1326 by way of the D flip-flop 1327.

During the period (j), an arithmetic operation similar to that in the period (g) is carried out, data indicative of $|\{c(x+1,y)/2-(a(1,0)-b(1,0)/2)\}+\{c(x+2,y)/2-(a(1,0)-b(1,0)/2)\}|/2|$ are calculated by the positive value transducer 1325 and transmitted to the adder 1326 in which data indicative of the following expression is calculated.

$$\begin{aligned}
&|\{c(x,y)/2 - (a(0,0) - b(0,0)/2)\} + \\
&\quad \{c(x+1,y)/2 - (a(0,0) - b(0,0)/2)\}|/2| + \\
&|\{c(x,y+1)/2 - (a(0,1) - b(0,1)/2)\} + \\
&\quad \{c(x+1,y+1)/2 - (a(0,1) - b(0,1)/2)\}|/2| + \\
&|\{c(x+1,y+1)/2 - (a(1,1) - b(1,1)/2)\} + \\
&\quad \{c(x+2,y+1)/2 - (a(1,1) - b(1,1)/2)\}|/2| \\
&|\{c(x+1,y)/2 - (a(1,0) - b(1,0)/2)\} + \\
&\quad \{c(x+2,y)/2 - (a(1,0) - b(1,0)/2)\}|/2|
\end{aligned} \quad (Q3)$$

In step with the pulse of the control signal LD in the period (j), the second data input terminal B of the selector 1328 is selected so as to connect with the data output terminal thereof. The data indicative of (Q3) calculated by the adder 1326 is outputted from the data output terminal DHo of each of the processor element PE1$a$(x,y) through the D flip-flop 1327, the selector 1328 and the D flip-flop 1329 in step with the eleventh pulse of the clock pulse CK1, i.e., the first pulse of the control signal CK2 in FIG. 13. In the case of the processor element PE1$a$(1,1), data indicative of the following expression is outputted through the data output terminal DHo of the processor element PE1$a$(1,1).

$$\begin{aligned}
&|\{c(1,1)/2 - (a(0,0) - b(0,0)/2)\} + \\
&\quad \{c(2,1)/2 - (a(0,0) - b(0,0)/2)\}|/2| + \\
&|\{c(1,2)/2 - (a(0,1) - b(0,1)/2)\} + \\
&\quad \{c(2,2)/2 - (a(0,1) - b(0,1)/2)\}|/2| + \\
&|\{c(2,2)/2 - (a(1,1) - b(1,1)/2)\} + \\
&\quad \{c(3,2)/2 - (a(1,1) - b(1,1)/2)\}|/2| + \\
&|\{c(2,1)/2 - (a(1,0) - b(1,0)/2)\} + \\
&\quad \{c(3,1)/2 - (a(1,0) - b(1,0)/2)\}|/2|
\end{aligned}$$

During the period (g), data indicative of $[\{c(x,y+1)/2-(a(0,0)-b(0,0)/2)\}+\{c(x+1,y+1)/2-(a(0,0)-b(0,0)/2\}]/2$ is received by the first data input terminal A of the adder 1333 of each of the processor elements PE1$a$(x,y) from the multiplier 1324 of the lower side processor elements PE1$a$(x,y+1) in FIG. 8 through the data output terminal of the multiplier 1324. At the same time, data indicative of $[\{c(x,y)/2-(a(0,0)-b(0,0)/2)\}+\{c(x+1,y)/2-(a(0,0)-b(0,0)/2)\}]/2$ is received by the second data input terminal B of the adder 1333 of each of the processor elements PE1$a$(x,y) from the multiplier 1324 of the same processor elements PE1$a$(x,y) through the data output terminal of the multiplier 1324.

In each processor element PE(x,y), data indicative of [{c(x,y)/2−(a(0,0)−b(0,0)/2)}+{c(x+1,y)/2−(a(0,0)−b(0,0)/2)}]/2+[{c(x,y+1)/2−(a(0,0)−b(0,0)/2)}+{c(x+1,y+1)/2−(a(0,0)−b(0,0)/2)}]/2 are calculated by the adder 1333 and multiplied ½ by multiplier 1334. The multiplied data is converted by the positive value transducer 1335 to data indicative of an expression recited as follows:

| [[{c(x,y)/2 − (a(0,0) − b(0,0)/2)} +
    {c(x + 1,y)/2 − (a(0,0) − b(0,0)/2)}]/2 +
    [{c(x,y + 1)/2 − (a(0,0) − b(0,0)/2)} +
    {c(x + 1,y + 1)/2 − (a(0,0) − b(0,0)/2)}]/2]/2|

The data converted by the positive value transducer 1335 is transmitted to the second data input terminal B of the adder 1336 through the first data input terminal A and data output terminal of the adder 1336 and the D flip-flop 1337.

During the period (h), a arithmetic operation similar to that in the period (g) is carried out, and accordingly data indicative of |[[{c(x,y+1)/2−(a(0,1)−b(0,1)/2)}+{c(x+1,y+1)/2−(a(0,1)−b(0,1)/2)}]/2+[{c(x,y+2)/2−(a(0,1)−b(0,1)/2)}+{c(x+1,y+2)/2−(a(0,1)−b(0,1)/2)}]/2]/2| is calculated by the positive value transducer 1335 and transmitted to the adder 1336 in which data indicative of the following expression is calculated.

| [[{c(x,y)/2 − (a(0,0) − b(0,0)/2)} +
    {c(x + 1,y)/2 − (a(0,0) − b(0,0)/2)}]/2 +
    [{c(x,y + 1)/2 − (a(0,0) − b(0,0)/2)} +
    {c(x + 1,y + 1)/2 − (a(0,0) − b(0,0)/2)}]/2]/2 +
    [[{(x,y + 1)/2 − (a(0,1) − b(0,1)/2)} +
    {c(x + 1,y + 1)/2 − (a(0,1) − b(0,1)/2)}]/2 +
    [{c(x,y + 2)/2 − (a(0,1) − b(0,1)/2)} +
    {c(x + 1,y + 2)/2 − (a(0,1) − b(0,1)/2)}]/2]/2|

The data calculated by the adder 1336 is transmitted to the second data input terminal B of the adder 1336 through the D flip-flop 1337.

During the period (i), a arithmetic operation similar to that in the period (g) is carried out, and accordingly data indicative of |[[{c(x+1,y+1)/2−a(1,1)−b(1,1)/2)}+{c(x+2,y+1)/2−(a(1,1)−b(1,1)/2)}]/2+[{c(x+1,y+2)/2−(a(1,1)−b(1,1)/2)}+{c(x+2,y+2)/2−(a(1,1)−b(1,1)/2)}]/2]/2| is calculated by the positive value transducer 1335 and transmitted to the adder 1336 in which data indicative of the following expression is calculated.

| [[{c(x,y)/2 − (a(0,0) − b(0,0)/2)} +
    {c(x + 1,y)/2 − (a(0,0) − b(0,0)/2)}]/2 +
    [{c(x,y + 1)/2 − (a(0,0) − b(0,0)/2)} +
    {c(x + 1,y + 1)/2 − (a(0,0) − b(0,0)/2)}]/2]/2 +
    [[{(x,y + 1)/2 − (a(0,1) − b(0,1)/2)} +
    {c(x + 1,y + 1)/2 − (a(0,1) − b(0,1)/2)}]/2 +
    [{c(x,y + 2)/2 − (a(0,1) − b(0,1)/2)} +
    {c(x + 1,y + 2)/2 − (a(0,1) − b(0,1)/2)}]/2]/2 +
    [[{c(x + 1,y + 1)/2 − a(1,1) − b(1,1)/2)} +
    {c(x + 2,y + 1)/2 − (a(1,1) − b(1,1)/2)}]/2 +
    [{c(x + 1,y + 2)/2 − (a(1,1) − b(1,1)/2)} +
    {c(x + 2,y + 2)/2 − (a(1,1) − b(1,1)/2)}]/2]/2|

The data calculated by the adder 1336 is transmitted to the second data input terminal B of the adder 1336 through the D flip-flop 1337.

During the period (j), a arithmetic operation similar to that in the period (g) is carried out, and accordingly data indicative of |[[{c(x+1,y)/2−(a(1,0)−b(1,0)/2)}+{c(x+2,y)/2−(a(1,0)−b(1,0)/2)}]/2+[{c(x+1,y+1)/2−(a(1,0)−b(1,0)/2)}+{c(x+2,y+1)/2−(a(1,0)−b(1,0)/2)}]/2]/2| is calculated by the positive value transducer 1335 and transmitted to the adder 1336 in which data indicative of the following expression is calculated.

| [[{c(x,y)/2 − (a(0,0) − b(0,0)/2)} +                                (Q4)
    {c(x + 1,y)/2 − (a(0,0) − b(0,0)/2)}]/2 +
    [{c(x,y + 1)/2 − (a(0,0) − b(0,0)/2)} +
    {c(x + 1,y + 1)/2 − (a(0,0) − b(0,0)/2)}]/2]/2 +
    |[[{(x,y + 1)/2 − (a(0,1) − b(0,1)/2)} +
    {c(x + 1,y + 1)/2 − (a(0,1) − b(0,1)/2)}]/2 +
    [{c(x,y + 2)/2 − (a(0,1) − b(0,1)/2)} +
    {c(x + 1,y + 2)/2 − (a(0,1) − b(0,1)/2)}]/2]/2 +
    |[[{c(x + 1,y + 1)/2 − a(1,1) − b(1,1)/2)} +
    {c(x + 2,y + 1)/2 − (a(1,1) − b(1,1)/2)}]/2 +
    [{c(x + 1,y + 2)/2 − (a(1,1) − b(1,1)/2)} +
    {c(x + 2,y + 2)/2 − (a(1,1) − b(1,1)/2)}]/2]/2 +
    | [[{c(x + 1,y)/2 − (a(1,0) − b(1,0)/2)} +
    {c(x + 2,y)/2 − (a(1,0) − b(1,0)/2)}]/2 +
    [{c(x + 1,y + 1)/2 − (a(1,0) − b(1,0)/2)} +
    {c(x + 2,y + 1)/2 − (a(1,0) − b(1,0)/2)}]/2]/2|

In step with the pulse of the control signal LD in the period (j), the second data input terminal B of the selector 1338 is selected so as to connect with the data output terminal thereof. The data indicative of (Q4) calculated by the adder 1336 is outputted from the data output terminal DDo of each of the processor element PE1a(x,y) through the D flip-flop 1337, the selector 1338 and the D flip-flop 1339 in step with the eleventh pulse of the clock pulse CK1, i.e., the first pulse of the control signal CK2 in FIG. 13. In the case of the processor element PE1a(1,1), data indicative of the following expression is outputted through the data output terminal DDo of the processor element PE1a(1,1).

| [[{c(1,1)/2 − (a(0,0) − b(0,0)/2)} +
    {c(2,1)/2 − (a(0,0) − b(0,0)/2)}]/2 +
    [{c(1,2)/2 − (a(0,0) − b(0,0)/2)} +
    {c(2,2)/2 − (a(0,0) − b(0,0)/2)}]/2]/2 +
    | [[{c(1,2)/2 − (a(0,1) − b(0,1)/2)} +
    {c(2,2)/2 − (a(0,1) − b(0,1)/2)}]/2 +
    [{c(1,3)/2 − (a(0,1) − b(0,1)/2)} +
    {c(2,3)/2 − (a(0,1) − b(0,1)/2)}]/2]/2 +
    | [[{c(2,2)/2 − (a(1,1) − b(1,1)/2)} +
    {c(3,2)/2 − (a(1,1) − b(1,1)/2)}]/2 +
    [{c(2,3)/2 − (a(1,1) − b(1,1)/2)} +
    {c(3,3)/2 − (a(1,1) − b(1,1)/2)}]/2]/2 +
    | [[{c(2,1)/2 − (a(1,0) − b(1,0)/2)} +
    {c(3,1)/2 − (a(1,0) − b(1,0)/2)}]/2 +
    [{c(2,2)/2 − (a(1,0) − b(1,0)/2)} +
    {c(3,2)/2 − (a(1,0) − b(1,0)/2)}]/2]/2|

The foregoing expressions (Q1), (Q2), (Q3) and (Q4) are equivalent in value to the following expressions (Q1'), (Q2'), (Q3') and (Q4').

|[c(x,y) + b(0,0)]/2 − a(0,0)| +                                    (Q1')
    |[c(x,y + 1) + b(0,1)]/2 − a(0,1)| +
    |[c(x + 1,y + 1) + b(1,1)]/2 − a(1,1)| +
    |[c(x + 1,y) + b(1,0)]/2 − a(1,0)|

|[c(x,y) + c(x,y + 1)]/2 + b(0,0)]/2 − a(0,0)| +                    (Q2')
    |[c(x,y + 1) + c(x,y + 2)]/2 + b(0,1)]/2 − a(0,1)| +
    |[c(x + 1,y + 1) + c(x + 1,y + 2)]/2 + b(1,1)]/2 − a(1,1)| +
    |[c(x + 1,y) + c(x + 1,y + 1)]/2 + b(1,0)]/2 − a(1,0)|

|[c(x,y) + c(x + 1,y)]/2 + b(0,0)]/2 − a(0,0)| +                    (Q3')
    |[c(x,y + 1) + c(x + 1,y + 1)]/2 + b(0,1)]/2 − a(0,1)| +
    |[c(x + 1,y + 1) + c(x + 2,y + 1)]/2 + b(1,1)]/2 − a(1,1)| +
    |[c(x + 1,y) + c(x + 2,y)]/2 + b(1,0)]/2 − a(1,0)|

| [c(x,y) + c(x + 1,y) + c(x,y + 1) + c(x + 1,y + 1)]/4 +           (Q4')
    b(0,0)]/2 − a(0,0)| + | [c(x,y + 1) + c(x + 1,y + 1) +
    c(x,y + 2) + c(x + 1,y + 2)]/4 + b(0,1)]/2 − a(0,1)| +
    | [c(x + 1,y + 1) + c(x + 2,y + 1) + c(x + 1,y + 2) +
    c(x + 2,y + 2)]/4 + b(1,1)]/2 − a(1,1)| +
    | [c(x + 1,y) + c(x + 2,y) + c(x + 1,y + 1) +
    c(x + 2,y + 1)]/4 + b(1,0)]/2 − a(1,0)|

The foregoing expression (Q1') represents the first distortion value indicative of a difference between each pel data set of each of the interpolated blocks and each integer pel data set of the current blocks 1, each of the interpolated blocks being indicative of a mean between the specified reference block 2 of the first reference picture Pb and each of the first candidate blocks of the search window 3 of the second reference picture Pc shown in FIG. 4.

The foregoing expression (Q2') represents the second distortion value being indicative of a difference between each pel data set of each of the interpolated blocks and each integer pel data set of the current blocks 1, each of the interpolated blocks being indicative of a mean between the specified reference block 2 of the first reference picture Pb and each of the second candidate blocks vertically deviated by half-pel pitch from the first candidate blocks of the search window 3 of the second reference picture Pc shown in FIG. 4.

The foregoing expression (Q3') represents the third distortion value indicative of a difference between each pel data set of each of the interpolated blocks and each integer pel data set of the current blocks 1, each of the interpolated blocks being indicative of a mean between the specified reference block 2 of the first reference picture Pb and each of the third candidate blocks horizontally deviated by half-pel pitch from the first candidate blocks of the search window 3 of the second reference picture Pc shown in FIG. 4.

The foregoing expression (Q4') represents the fourth distortion value indicative of a difference between each pel data set of each of the interpolated blocks and each integer pel data set of the current blocks 1, each of the interpolated blocks being indicative of a mean between the specified reference block 2 of the first reference picture Pb and each of the fourth candidate blocks diagonally deviated by half-pel pitch from the third candidate blocks of the search window 3 of the second reference picture Pc shown in FIG. 4.

As will be appreciated from the aforementioned description, each of the processor elements PE1a(x,y) calculates all of the interpolated blocks, and the distortion values each indicative of a difference between the current block 1 and each of the first, second third and fourth candidate blocks. The total number of the first to fourth total candidate blocks is 25.

Before the beginning of the period (k), the control signal LD representative of "1" is received by the signal input terminal S of each of the selectors 1308, 1318, 1328 and 1338 of each of the processor elements PE1a(x,y) from the timing control unit 900, thereby causing the second data input terminal B of each of the selectors 1308, 1318, 1328 and 1338 to be electrically connected to the data output terminal Y of each of the selectors 1308, 1318, 1328 and 1338. In step with the pulse of the control signal CK2 in the period (k), each of the processor elements PE1a(x,y) outputs each of the distortion values through the data output terminals of each of the D flip-flop 1309, 1319, 1329, 1339 and the data output terminals DIo, DVo, DHo and DDo of each of the processor elements PE1a(x,y) shown in FIG. 10.

Each of the distortion values calculated by the processor elements PE1a(0,y) is received by the data input terminals I0–I9 of the selector 510 of the distortion selecting means 500 from each of the processor elements PE1a(0,y) through the data output terminals DIo, DVo, DDo, DHo of each of the processor elements PE1a(0,y). At the same time, each of the distortion values calculated by each of the processor elements PE1a(1,y) and PE1a(2,y) is supplied from each of the processor elements PE1a(1,y) and PE1a(2,y) to the left side processor elements PE1a(x−1,y) through the data output terminals DIo, DVo, DHo and DDo of each of the processor elements PE1a(x,y) and the data input terminals DIi, DVi, DHi and DDi of the left side processor elements PE1a(x−1,y).

During the period (l), the control signal LD representative of "0" is received by the signal input terminal S of each of the selectors 1308, 1318, 1328 and 1338 of each of the processor elements PE1a(x,y) from the timing control unit 900, thereby causing the first data input terminal A of each of the selectors 1308, 1318, 1328 and 1338 to be electrically connected to the data output terminal Y of each of the selectors 1308, 1318, 1328 and 1338. In step with the pulse of the control signal CK2 in the period (l), each of the processor elements PE1a(x,y) outputs each of the distortion values through the data output terminals of each of the D flip-flop 1309, 1319, 1329, 1339 and the data output terminals DIo, DVo, DHo and DDo of each of the processor elements PE1a(x,y) shown in FIG. 10.

Each of the distortion values calculated by each of the processor elements PE1a(1,y) is received by the data input terminals I0–I9 of the selector 510 of the distortion selecting means 500 from each of the processor elements PE1a(0,y) through the data output terminals DIo, DVo, DDo, DHo of each of the processor elements PE1a(0,y). At the same time, each of the distortion values calculated by each of the processor elements PE1a(2,y) is supplied from each of the processor elements PE1a(1,y) to the left side processor elements PE1a(0,y) through the data output terminals DIo, DVo, DHo and DDo of each of the processor elements PE1a(1,y) and the data input terminals DIi, DVi, DHi and DDi of the left side processor elements PE1a(0,y).

In step with the pulse of the control signal CK2 in the period (m), each of the processor elements PE1a(x,y) outputs each of the distortion values through the data output terminals of each of the D flip-flop 1309, 1319, 1329, 1339 and the data output terminals DIo, DVo, DHo and DDo of each of the processor elements PE1a(x,y) shown in FIG. 10.

Each of the distortion values calculated by each of the processor elements PE1a(2,y) is received by the data input terminals I0–I9 of the selector 510 of the distortion selecting means 500 from each of the processor elements PE1a(0,y) through the data output terminals DIo, DVo, DDo, DHo of each of the processor elements PE1a(0,y).

Before the beginning of the period (k), the D flip-flop 550 detects a low-to-high transition of the control signal LD received by the first signal input terminal 500a, and accordingly sets all data of the data output terminal of the D flip-flop 550 to "1". The maximum value is received by the second data input terminal B of the comparator 530 from the D flip-flop 550 through the data output terminal of the D flip-flop 550. The control signal Si representative of "0" to "9" is received by the signal input terminal S of the selector 510 of the distortion selecting means 500 from the timing control unit 900, thereby causing each of the data input terminals I0–I9 of the selector 510 to be electrically connected to the data output terminal of the selector 510, successively. The distortion value are subsequently received by the first data input terminal A of the comparator 530 of the distortion selecting means 500 from the selector 510, while the value which indicate the minimum distortion is received by the second data input terminal B of the comparator 530 from the D flip-flop 550. When the control signal UMASK represented by "1" is received by the second signal input terminal B of the logical product element 531 from the timing control unit 900, a signal on the first input terminal A of the logical product element 531 is outputted through the signal output terminal of the logical product element 531. The signal outputted from the logical product element 531 and indicated by "Min" is received by the signal input terminal S of the selector 540. When the signal "Min" on the signal input terminal S of the selector 540 is represented by "1", the first data input terminal A of the selector 540 is electrically connected to the data output terminal Y of the selector 540. The distortion value on the first data input terminal A of the selector 540 is transmitted from the selector 540 to the D flip-flop 550 through the data input terminal of the D flip-flop 550. In step with the pulse of the control signal CK3, the distortion value on the data input terminal of the D flip-flop 550 is outputted through the data output terminal of the D flip-flop 550.

During the period (k), each of the distortion values calculated by the processor elements PE1$a$(0,y) is compared by the comparator 530. During the period (l), each of the distortion values calculated by the processor elements PE1$a$(1,y) is compared by the comparator 530. During the period (m), each of the distortion values calculated by the processor elements PE1$a$(2,y) is compared by the comparator 530.

It is assumed that the distortion values outputted from the data output terminals DIo, DVo, DHo and DDo of each of the processor elements PE1$a$(x,y) are indicated by D(x,y), D(x,y+0.5), D(x+0.5,y) and D(x+0.5,y+0.5), respectively. During each of the periods (k) to (m), each of the distortion values is received by the data input terminals I0 to I9 of the selector 510 of the distortion selecting means 500 as shown in FIG. 25.

When the control signal UMASK received by the second signal input terminal B of the logical product element 531 is represented by "1", the signal on the first signal input terminal A of the logical product element 531 is outputted through the signal output terminal of the logical product element 531. When the signal outputted through the signal output terminal of the logical product element 531 is represented by "1", the first data input terminal A of the selector 540 is electrically connected to the data output terminal Y of the selector 540, and accordingly the distortion value received from the selector 510 is outputted to the D flip-flop 550 through the data output terminal Y of the selector 540 and the data input terminal of the D flip-flop 550.

When the control signal UMASK represents "1", the distortion values D(x,y) outputted at that time are designated and compared. Assuming that the control signal UMASK outputted from the timing control unit 900 has a signal pattern shown in FIG. 13, the distortion values D(0,0), D(0,0.5), D(0,1), D(0.5,0), D(0.5,0.5), D(0.5,1), D(1,0), D(1,0.5) and D(1,1) are compared by the comparator 530 in order to obtain the minimum distortion value.

Before the beginning of the period (k), all the output of the count output terminal Qn of the quinary counter 610 shown in FIG. 12 is set to "0" in accordance with the control signal LD. Likewise, all the output of count output terminal Qn of the quinary counter 620 is set to "0" in accordance with the control signal LD.

After all the output of the count output terminal Qn of the quinary counter 620 are set to "0", the quinary counter 620 counts up from "0" in step with the control signal CK3 received by the signal input terminal CK, and outputs, through the count output terminal Qn, the count number that reverts to "0" in the sequence of counting after reaching a maximum value of "4". In addition, the quinary counter 620 outputs a carry signal through the signal output terminal CYo each time the count number reverts to "0". When the D flip-flop 640 detects a rising edge of a pulse received by the signal input terminal 640$a$, i.e., when the control signal "Min" received by the signal input terminal 640$a$ of the D flip-flop 640 from the logical product element 531 of the distortion selecting means 500 is changed from "0" to "1", the D flip-flop 640 latches, on the data output terminal, data received at that time by the data input terminal and outputs the latched data as a vertical coordinate MVy of the motion vector.

After all the output of the count output terminal Qn of the quinary counter 610 are set to "0", the quinary counter 610 counts up from "0" in step with the carry signal received by the signal input terminal CYi, and outputs, through the count output terminal Qn, the count number that reverts to "0" in the sequence of counting after reaching a maximum value of "4". When the D flip-flop 630 detects a rising edge of a pulse received by the signal input terminal 630$a$, i.e., when the control signal "Min" received by the signal input terminal 630$a$ of the D flip-flop 630 from the logical product element 531 of the distortion selecting means 500 is changed from "0" to "1", the D flip-flop 630 latches, on the data output terminal, data received at that time by the data input terminal and outputs the latched data as a horizontal coordinate MVx of the motion vector.

When the comparisons of all the distortion values are finished, the minimum distortion value is outputted from the data output terminal of the D flip-flop 550 of the distortion selecting means 500. At the same time, a motion vector corresponding to the minimum distortion value is outputted from the data output terminals of the D flip-flops 630 and 640 of the motion vector calculating means 600.

According to the first embodiment, it is unnecessary for the motion estimation apparatus to directly calculate the interpolated blocks, thereby making it possible to make the apparatus small-sized and increase the calculation speed of the apparatus. Since the pel data sets of the template block 4$a$ is calculated in accordance with an expression represented by "a(x,y)–b(x,y)/2", an arithmetic element for calculating the difference data can be constituted by a subtracter, i.e., the subtracter 1303 shown in FIG. 10.

The current picture Pa, the first reference picture Pb and the second reference picture Pc may form pictures of the video sequence at time t0, t1 and t2, respectively. If the time t0, t1 and t2 are defined as |t0–t1|≦|t0–t2|, a search window within which the reference block 2 is searched can be relatively decreased in size. If the time t0, t1, t2 are defined as |t0–t1|>|t0–t2|, the search window 3 can be relatively decreased in size.

The motion estimation apparatus is provided with the second, third and fourth difference calculating means 1032 to 1034, second, third and fourth converting means 1042 to 1044, and second, third and fourth distortion calculating means 1120, 1130 and 1140 in addition to the first difference calculating means 1031, the first converting means 1041 and the first distortion calculating means 1110. Therefore, the motion estimation apparatus can perform multiple half-pel searches with the same number of pel references as single search.

Although the adder 1333 of the processor element PE1$a$(x,y) is shown in FIG. 10 as receiving data from the multipliers 1324 of the processor elements PE1$a$(x,y) and PE1$a$(x,y+1), the adder 1333 of the processor element PE1$a$(x,y) may receive data from the multipliers 1314 of the processor elements PE1$a$(x,y) and PE1$a$(x+1,y).

Figure 26:
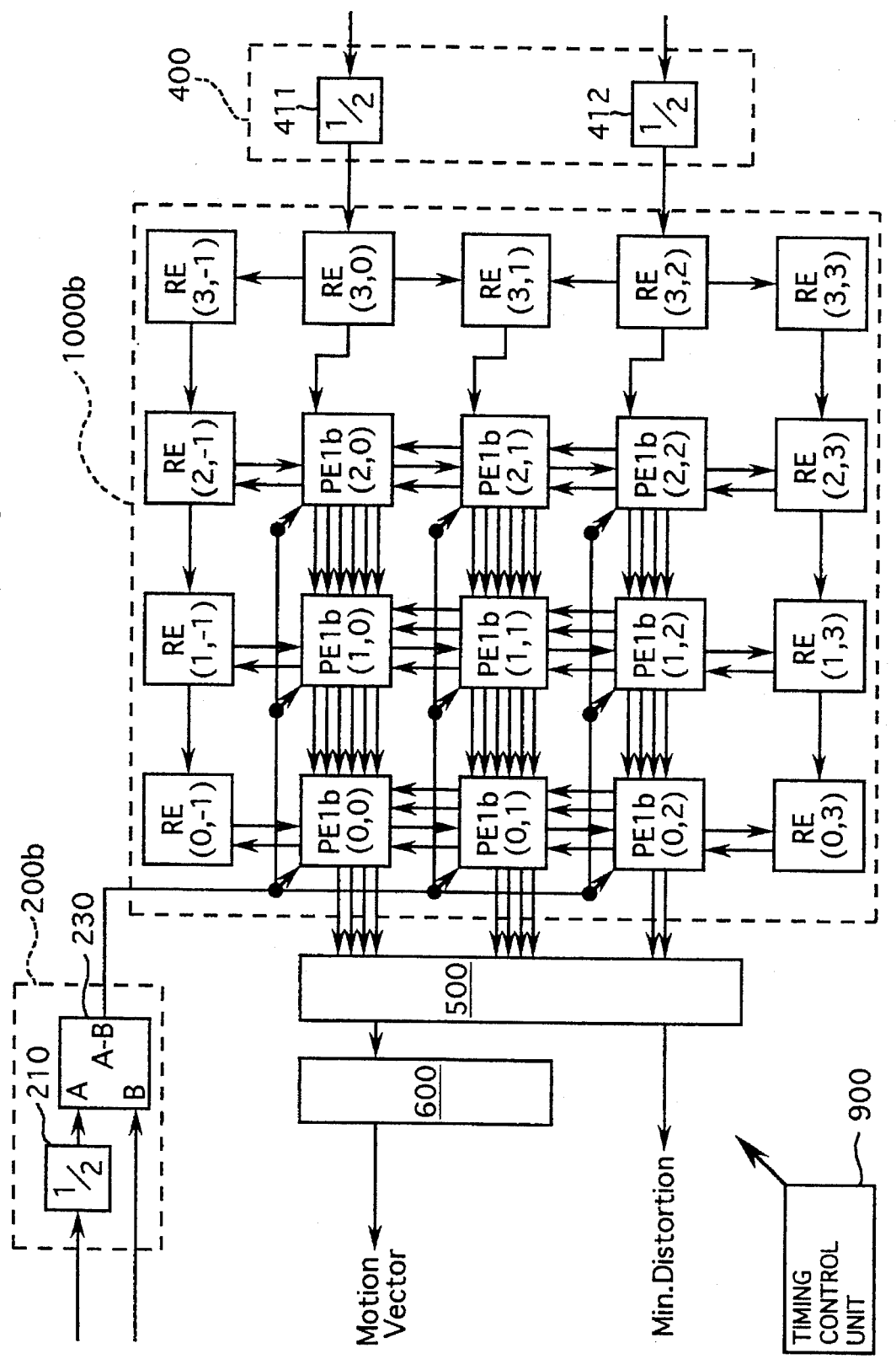
FIG. 26 is a block diagram showing a second embodiment of the motion estimation apparatus according to the present invention.
Figure 27:
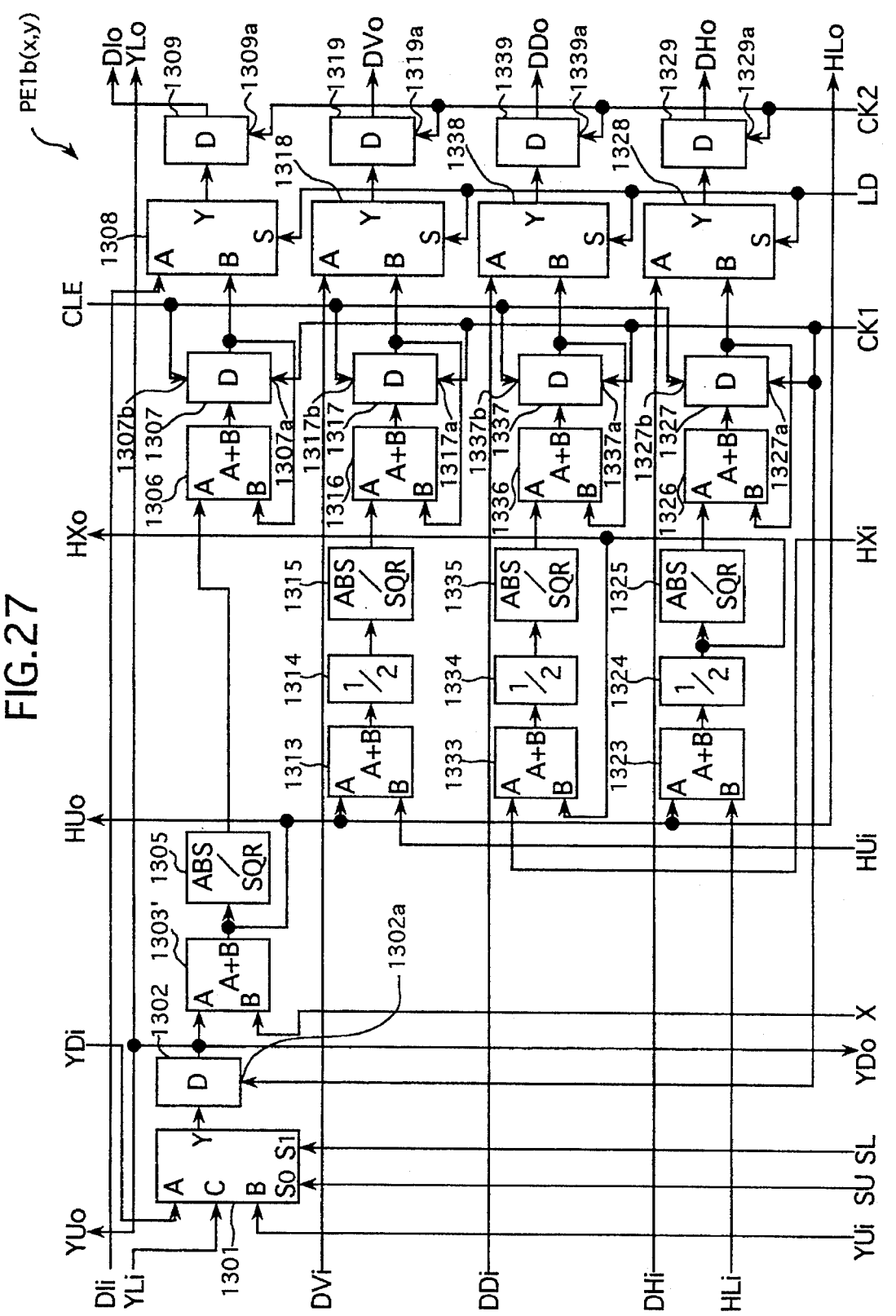
FIG. 27 is a block diagram showing each of processor elements shown in FIG. 26.
Figure 29:
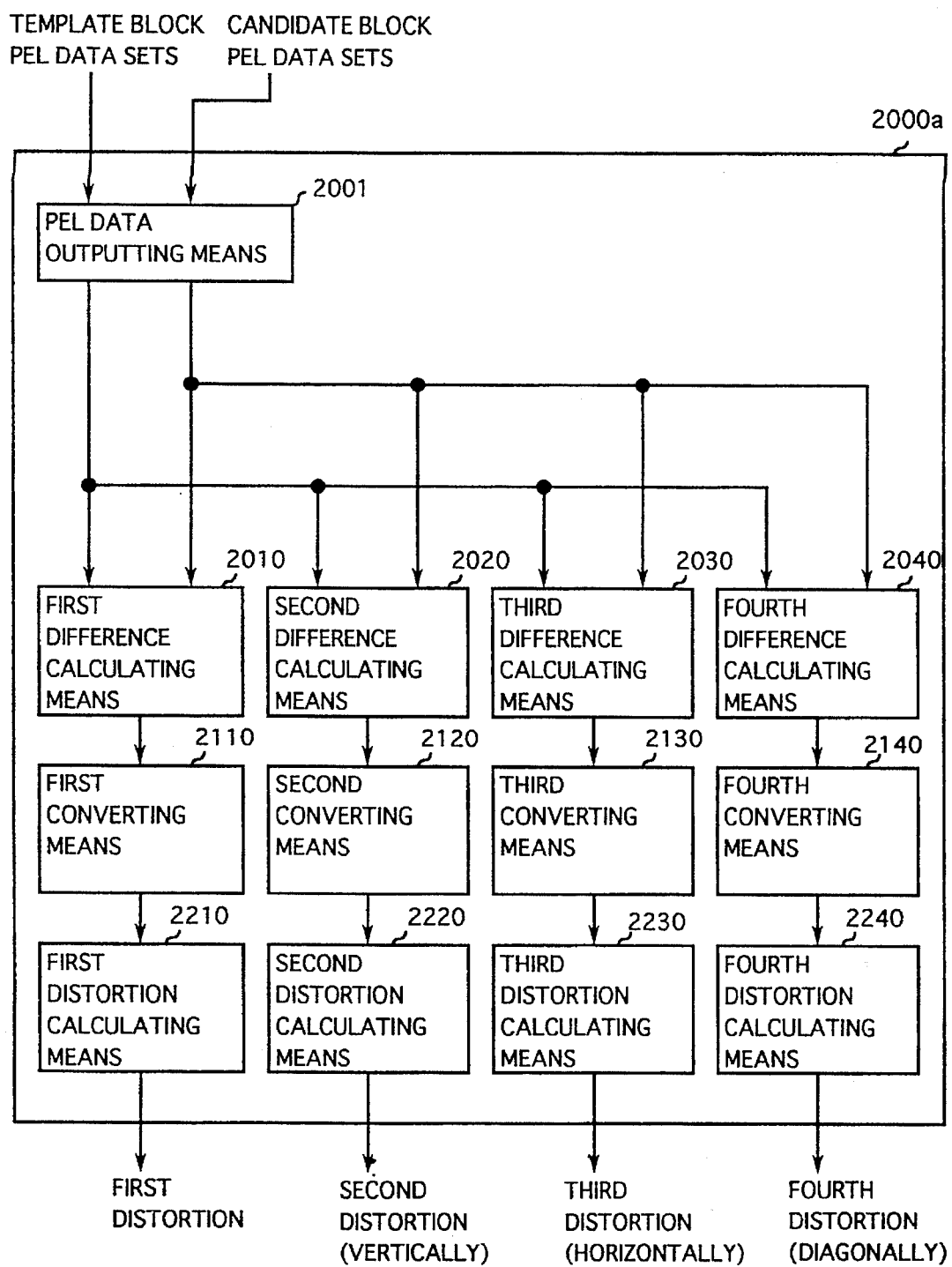
FIG. 29 is a block diagram showing distortion calculating means included in a third embodiment of the motion estimation apparatus according to the present invention.

Referring now to FIGS. 26 to 28 of the accompanying drawings, a preferred second embodiment of the motion estimation apparatus according to the present invention will be described hereinafter. The second embodiment of the motion estimation apparatus includes the same means and constitutional elements as the first embodiment of the motion estimation apparatus does. The means and constitutional elements of the second embodiment are respectively designated by the reference numerals denoting the individual constitutional elements of the first embodiment for omitting repeated description thereof. The motion estimation apparatus is shown in FIG. 26 as comprising template block obtaining means 200b and distortion calculating means 1000b. The obtaining means 200b comprises a subtracter 230 for receiving the multiplied data b(m,n)/2 from the multiplier 210 and the pel data a(m,n) of the current block 1 and subtracting the pel data of the current block 1 from the multiplied data to obtain a template block 4b shown in FIG. 28. The distortion calculating means 1000b comprises nine processor elements PE1b(x,y). In FIG. 27, each of the processor elements PE1b(x,y) includes a adder 1303' for receiving the pel data of the candidate block 6 from the D flip-flop 1302 and the pel data of the template block 4b from the subtracter 230 of the template block obtaining means 200b shown in FIG. 26 and add the pel data of the candidate block 6 and the pel data of the template block 4b. The second embodiment of the motion estimation apparatus thus constructed also can calculate the same motion vector as the apparatus shown in FIG. 8.

Referring to FIGS. 29 to 32 of the accompanying drawings, a preferred third embodiment of the motion estimation apparatus according to the present invention will be described hereinafter. The third embodiment of the motion estimation apparatus includes the same means and constitutional elements as the first embodiment of the motion estimation apparatus does. The means and constitutional elements of the third embodiment are respectively designated by the reference numerals denoting the individual constitutional elements of the first embodiment for omitting repeated description thereof. The motion estimation apparatus includes distortion calculating means 2000a shown in FIG. 29 and comprising pel data outputting means 2001, first difference calculating means 2010, first converting means 2110, first distortion calculating means 2210, second difference calculating means 2020, second converting means 2120, second distortion calculating means 2220, third difference calculating means 2030, third converting means 2130, third distortion calculating means 2230, fourth difference calculating means 2040, fourth converting means 2140 and fourth distortion calculating means 2240.

The pel data outputting means 2001 is operated to receive the integer pel data sets of the template block 4a from the template block data calculating means 200a and the integer pel data sets of the first candidate block from the candidate block data calculating means 400, and output a pair of the integer pel data sets of the template block 4a and the candidate block 6 corresponding in position to each other to the first, second, third and fourth difference calculating means 2010, 2020, 2030 and 2040.

On the basis of the integer pel data sets of each of the first candidate blocks and the integer pel data sets of the template block 4a, the first difference calculating means 2010 calculates first difference data sets each indicative of a difference between each pel data set of each of the interpolated blocks and each integer pel data set of the current block 1 corresponding in position to each other. The first converting means 2110 converts the first difference data sets to positive data sets, respectively. The first distortion calculating means 2210 calculates the sum of the converted first difference data sets based on each of the first candidate blocks to obtain each of the first distortion values.

The second difference calculating means 2020 calculates the sum of two of the integer pel data sets included in the search window 3 and vertically deviated by one-pel pitch from each other, and multiplies the sum by ½ to obtain second difference data sets. The second converting means 2120 converts the second difference data sets to positive data sets, respectively. The second distortion calculating means 2220 calculates the sum of the converted second difference data sets based on each of the second candidate blocks to obtain each of the second distortion values.

The third difference calculating means 2030 calculates the sum of two of the integer pel data sets include in the search window 3 and horizontally deviated by one-pel pitch from each other, and multiplies the sum by ½ to obtain third difference data sets. The third converting means 2130 converts the third difference data sets to positive data sets, respectively. The third distortion calculating means 2230 calculates the sum of the converted third difference data sets based on each of the third candidate blocks to obtain each of the third distortion values.

The fourth difference calculating means 2040 calculates the sum of four of the integer pel data sets included in the search window 3 and multiplies the sum by ¼ to obtain fourth difference data sets. The four of the integer pel data sets are arranged in the form of a square and deviated by one-pel pitch from one another. The fourth converting means 2140 converts the fourth difference data sets to positive data sets, respectively. The fourth distortion calculating means 2240 calculates the sum of the converted fourth difference data sets based on each of the fourth candidate blocks to obtain each of the fourth distortion values.

Figure 30:
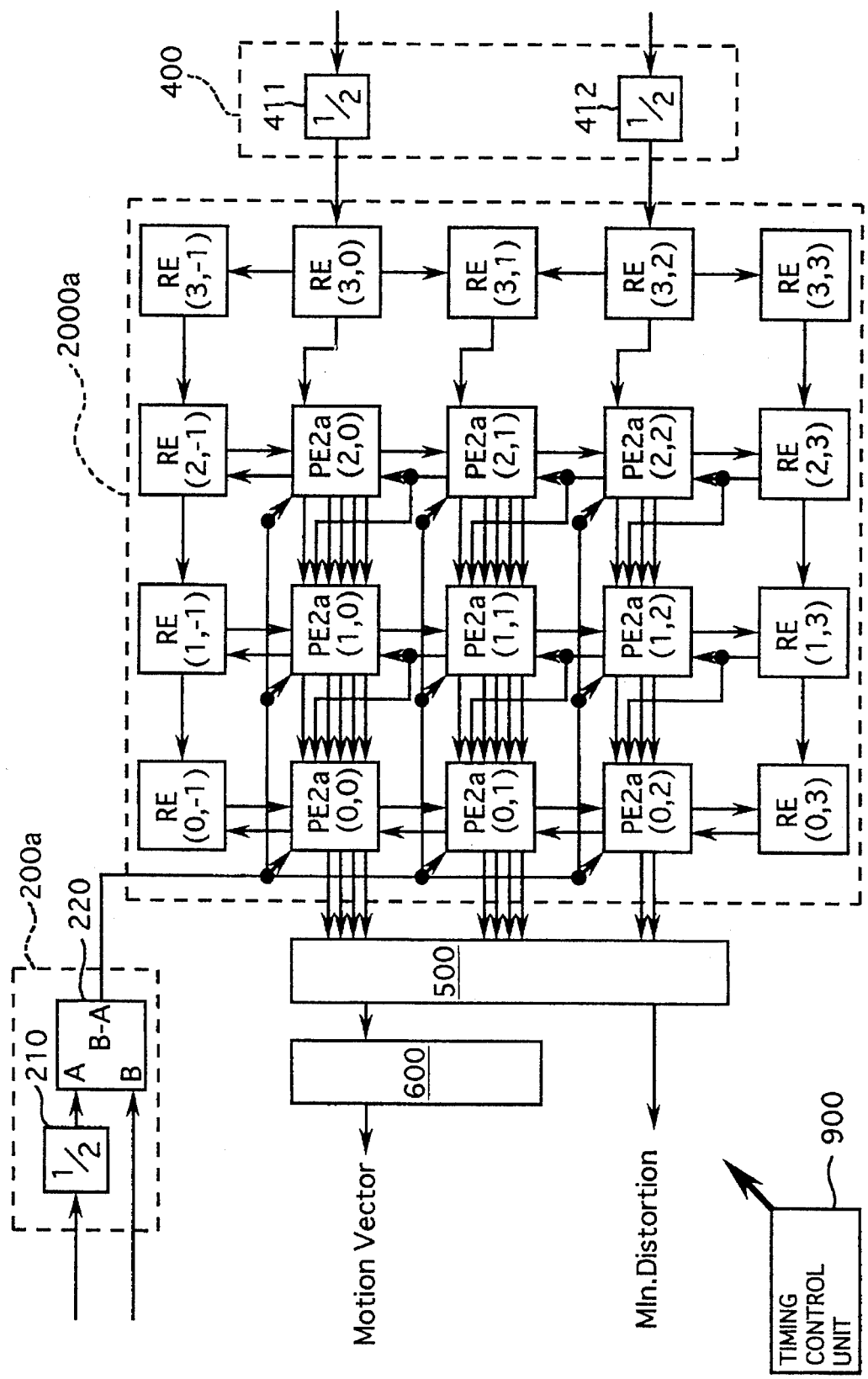
FIG. 30 is a block diagram showing the motion estimation apparatus of the second embodiment.
Figure 31:
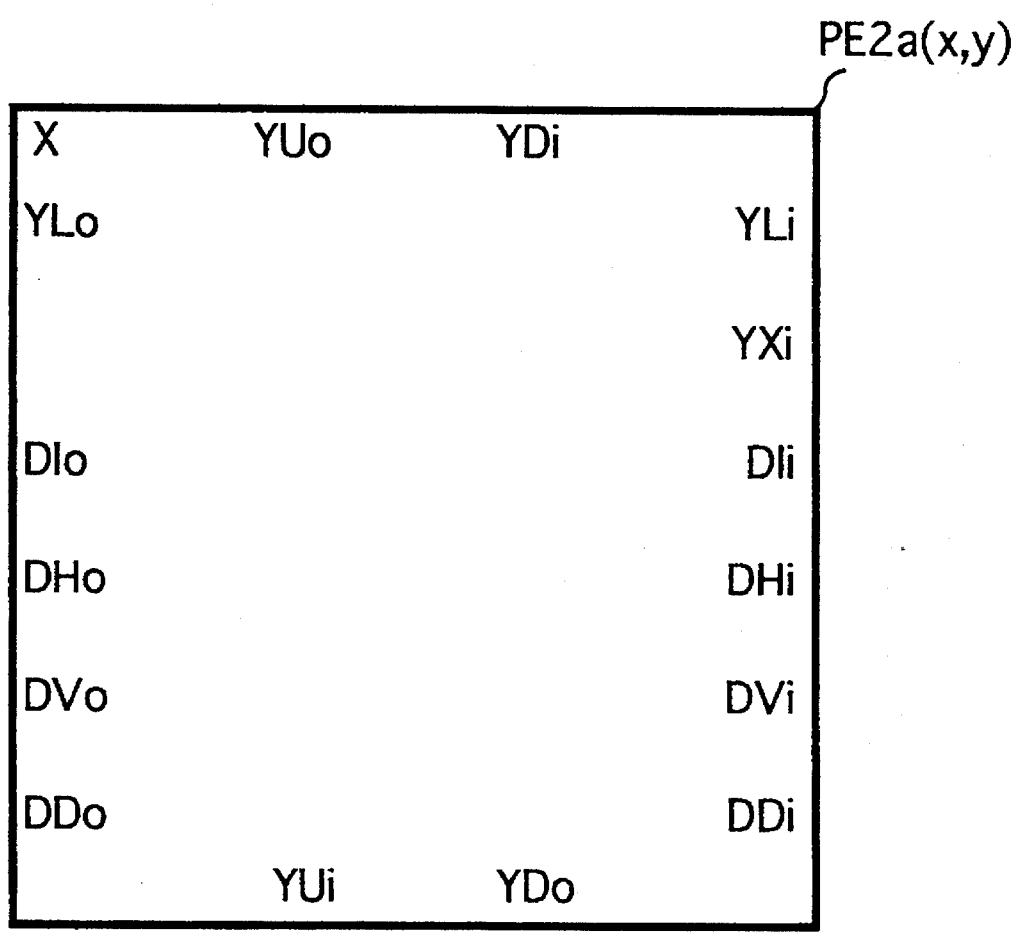
FIG. 31 is a plan view showing each of processor elements shown in FIG. 30.

The distortion calculating means 2000a is shown in FIG. 30 as comprising nine processor elements PE2a(x,y) set in the form of a matrix array. As shown in FIG. 31, each of the processor elements PE2a(x,y) has data input terminals X, YDi, YLi, YXi, DIi, DHi, DVi, DDi and YUi, and data output terminals YUo, YLo, DIo, DHo, DVo, DDo and YDo. Each of the processor elements PE2a(x,y) further has signal input terminals (not shown) and signal output terminals (not shown) electrically connected to the timing control unit 900.

Figure 32:
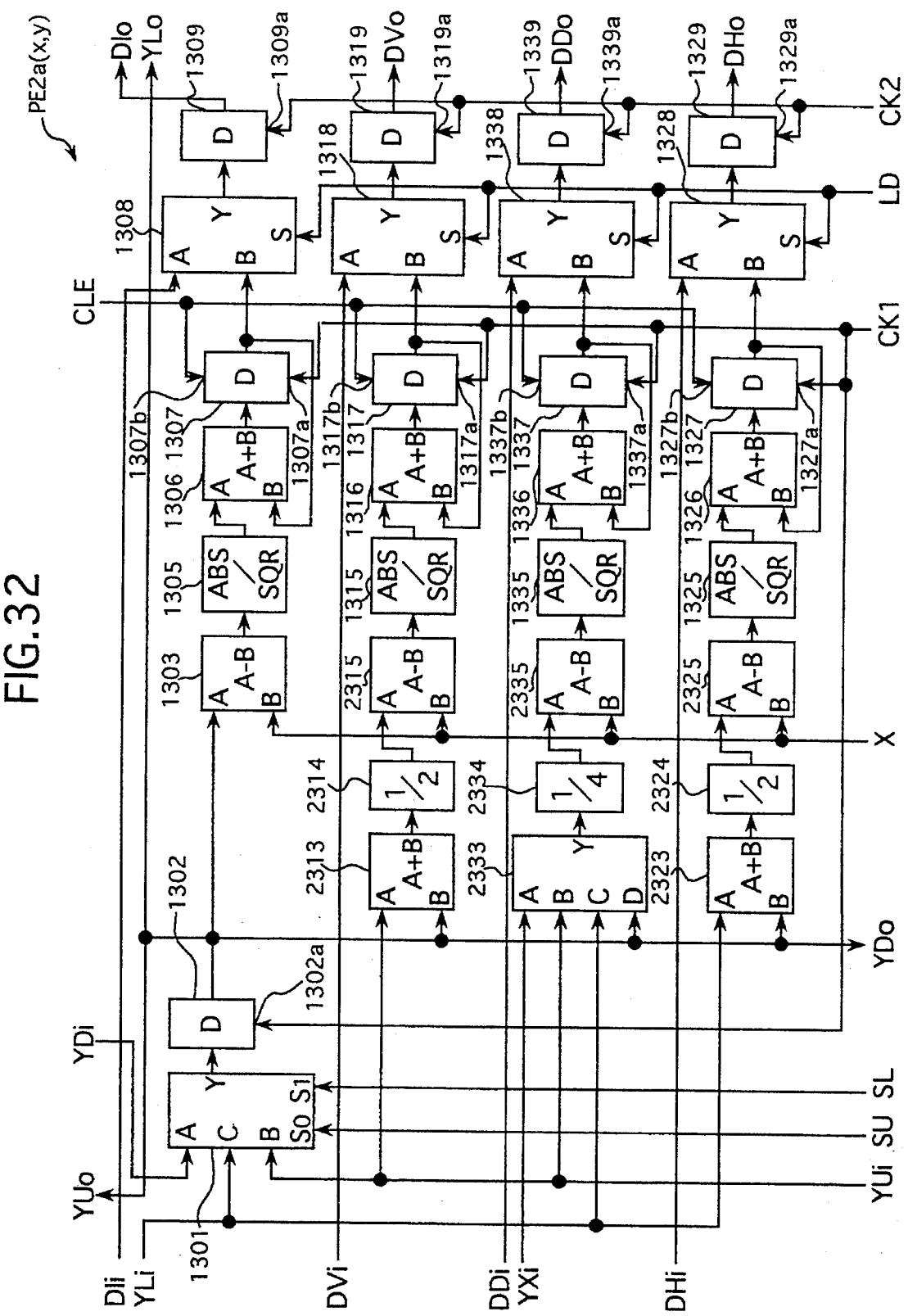
FIG. 32 is a block diagram showing a circuit of each of the processor elements shown in FIG. 31.

In FIG. 32, each of the processor elements PE2a(x,y) comprises adders 2313, 2323 and 2333, multipliers 2314, 2324 and 2334, and subtracters 2315, 2325 and 2335.

The adder 2313 of the processor element PE2a(x,y) is adapted to add data from the D flip-flop 1302 of the same processor element PE2a(x,y) and data from the D flip-flop 2302 of the processor element PE2a(x,y+1) and to output the added data. The multiplier 2314 multiplies the data from the adder 2313 by ½ and transmits the multiplied data to the subtracter 2315. The subtracter 2315 is operated to subtract the data outputted from the subtracter 220 shown in FIG. 30 from the data from the multiplier 2314 and to output the subtracted data to the positive transducer 1315.

The adder 2323 of the processor element PE2a(x,y) is adapted to add data from the D flip-flop 1302 of the same processor element PE2a(x,y) and data from the D flip-flop 1302 of the processor element PE2a(x+1,y) and to output the added data. The multiplier 2324 multiplies the data from the adder 2323 by ½ and transmits the multiplied data to the subtracter 2325. The subtracter 2325 is operated to subtract the data outputted from the subtracter 220 shown in FIG. 30 from the data outputted from the multiplier 2324 and to output the subtracted data to the positive transducer 1325.

The adder 2333 of the processor element PE2a(x,y) is adapted to add data from the D flip-flop 1302 of the same processor element PE2a(x,y), data from the D flip-flop 1302 of the processor element PE2a(x,y+1) data from the D flip-flop 1302 of the processor element PE2a(x+1,y) and data from the D flip-flop 1302 of the processor element PE2a(x+1,y+1), and to output the added data. The multiplier 2334 multiplies the data from the adder 2333 by ¼ and transmits the multiplied data to the subtracter 2335. The subtracter 2335 is operated to subtract the data outputted from the subtracter 220 shown in FIG. 30 from the data outputted from the multiplier 2334 and to output the subtracted data to the positive transducer 1335.

As will be understood from the aforesaid recitation, the adders 2313, 2323 and 2333 directly receive the integer pel data of the search window 3 to generate the half-pel data included in the search window 3. The third embodiment of the motion estimation apparatus also can calculate the same motion vector as the apparatus shown in FIG. 8.

Figure 33:
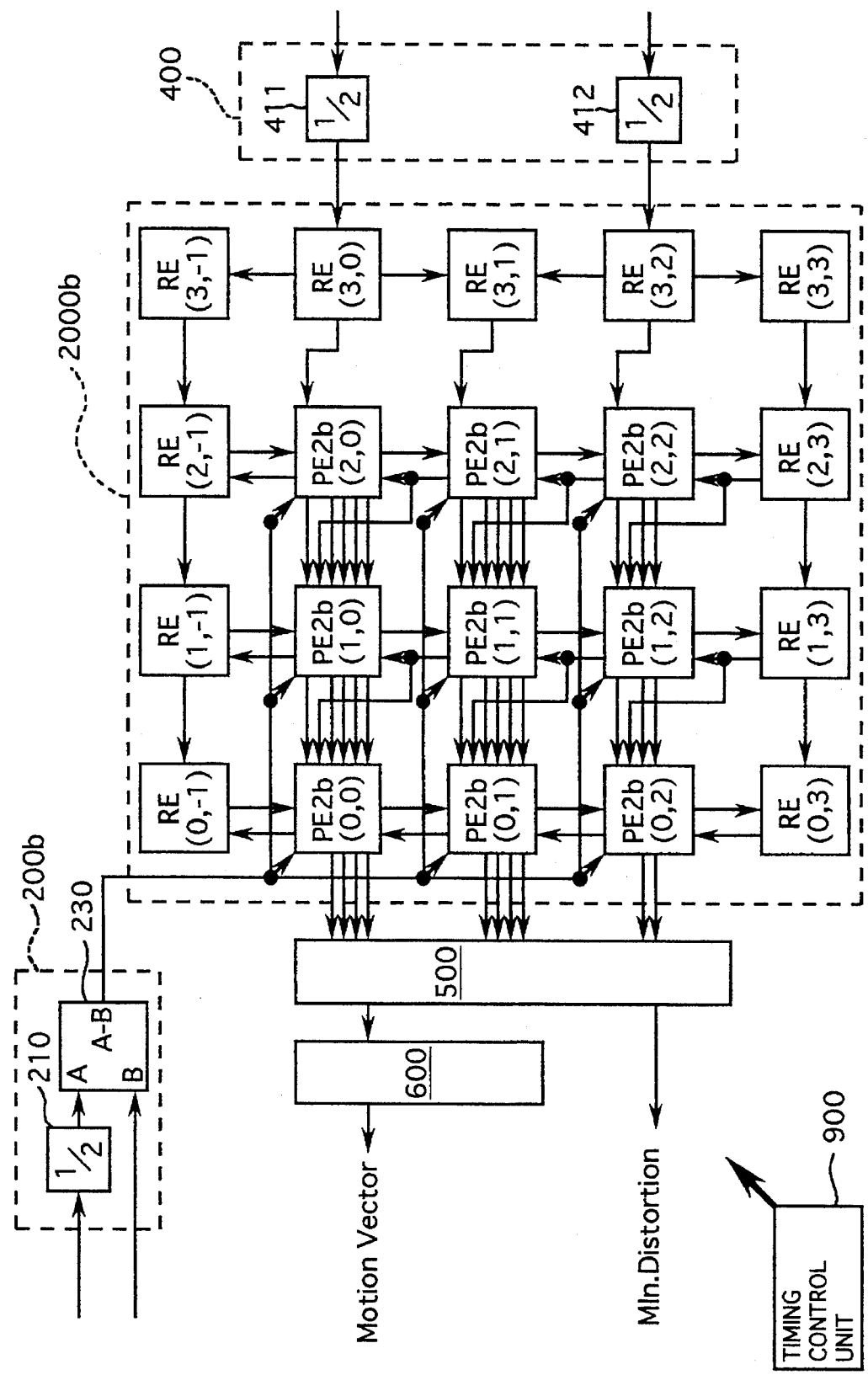
FIG. 33 is a block diagram showing a fourth embodiment of the motion estimation apparatus according to the present invention.
Figure 34:
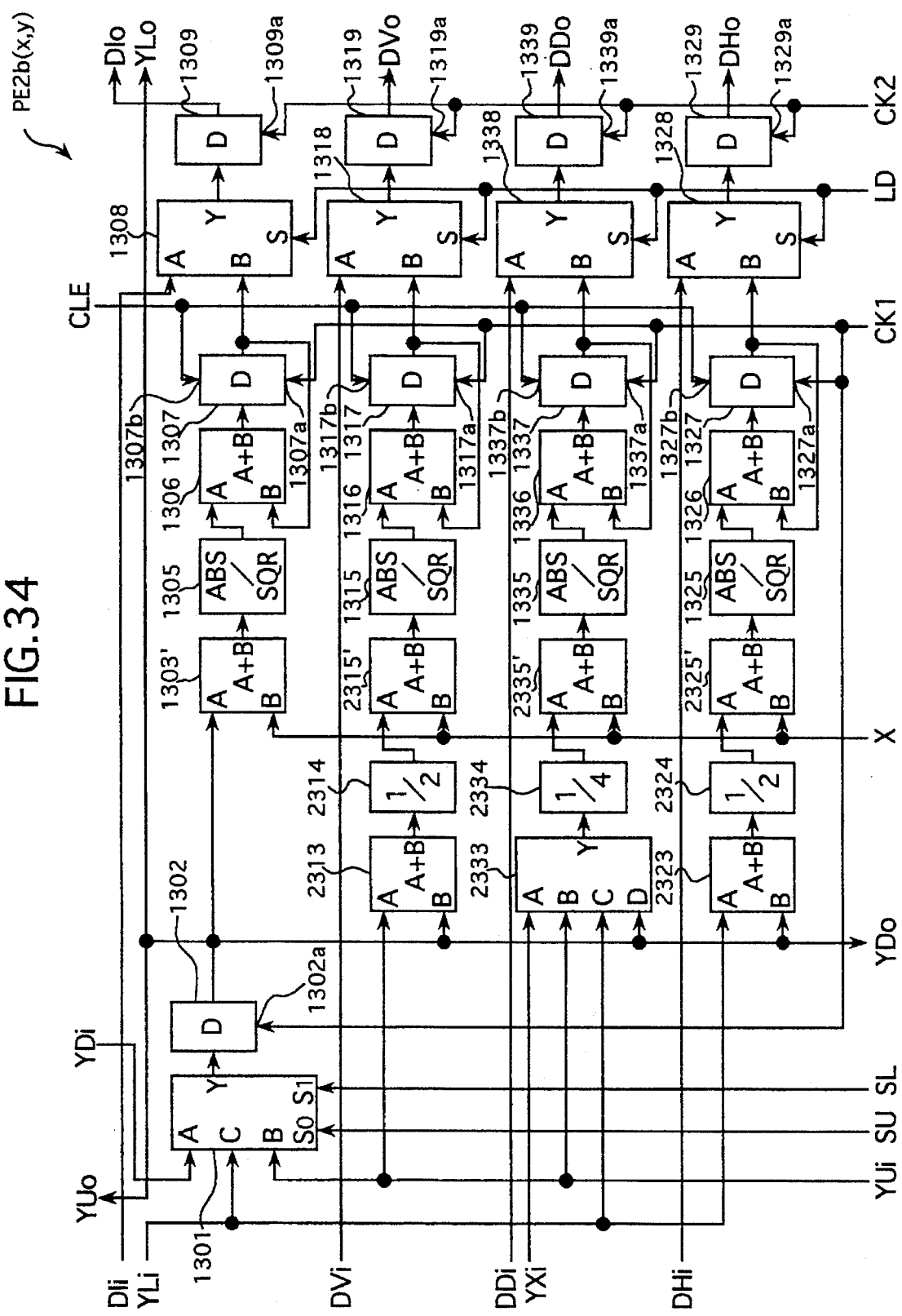
FIG. 34 is a block diagram showing a circuit of each of processor elements shown in FIG. 33.

Referring to FIGS. 33 to 34 of the accompanying drawings, a preferred fourth embodiment of the motion estimation apparatus according to the present invention will be described hereinafter. The fourth embodiment of the motion estimation apparatus includes the same means and constitutional elements as the second and third embodiments of the motion estimation apparatus does. The means and constitutional elements of the fourth embodiment are respectively designated by the reference numerals denoting the individual constitutional elements of the second and third embodiments for omitting repeated description thereof. The motion estimation apparatus is shown in FIG. 33 as comprising distortion calculating means 2000b including nine processor elements PE2b(x,y). As shown in FIG. 34, each of the processor elements PE2b(x,y) comprises adders 2315', 2325' and 2335'. The adder 2315' receives the multiplied data from the multiplier 2314 and pel data of the template block 4b from the subtracter 230 shown in FIG. 33 and adds the received multiplied data and pel data. The output of the adder 2315' is transmitted to the positive value transducer 1315. The adder 2325' receives the multiplied data from the multiplier 2324 and pel data of the template block 4b from the subtracter 230 shown in FIG. 33 and adds the received multiplied data and pel data. The output of the adder 2325' is transmitted to the positive value transducer 1325. The adder 2335' receives the multiplied data from the multiplier 2334 and pel data of the template block 4b from the subtracter 230 shown in FIG. 33 and adds the received multiplied data and pel data. The output of the adder 2335' is transmitted to the positive value transducer 1335. The fourth embodiment of the motion estimation apparatus also can calculate the same motion vector as the apparatus shown in FIG. 8.

Figure 35:
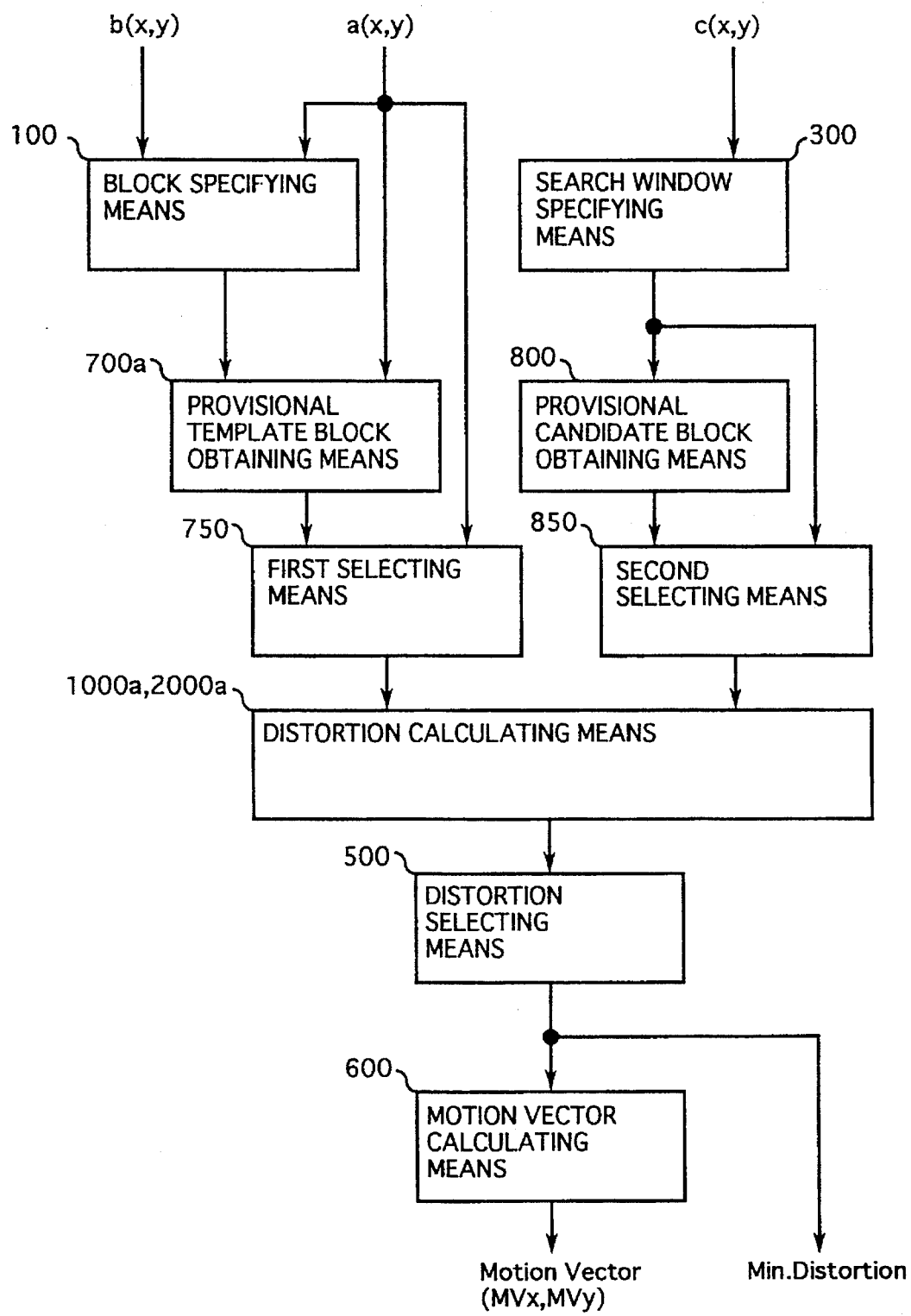
FIG. 35 is a block diagram showing a fifth embodiment of the motion estimation apparatus according to the present invention.
Figure 36:
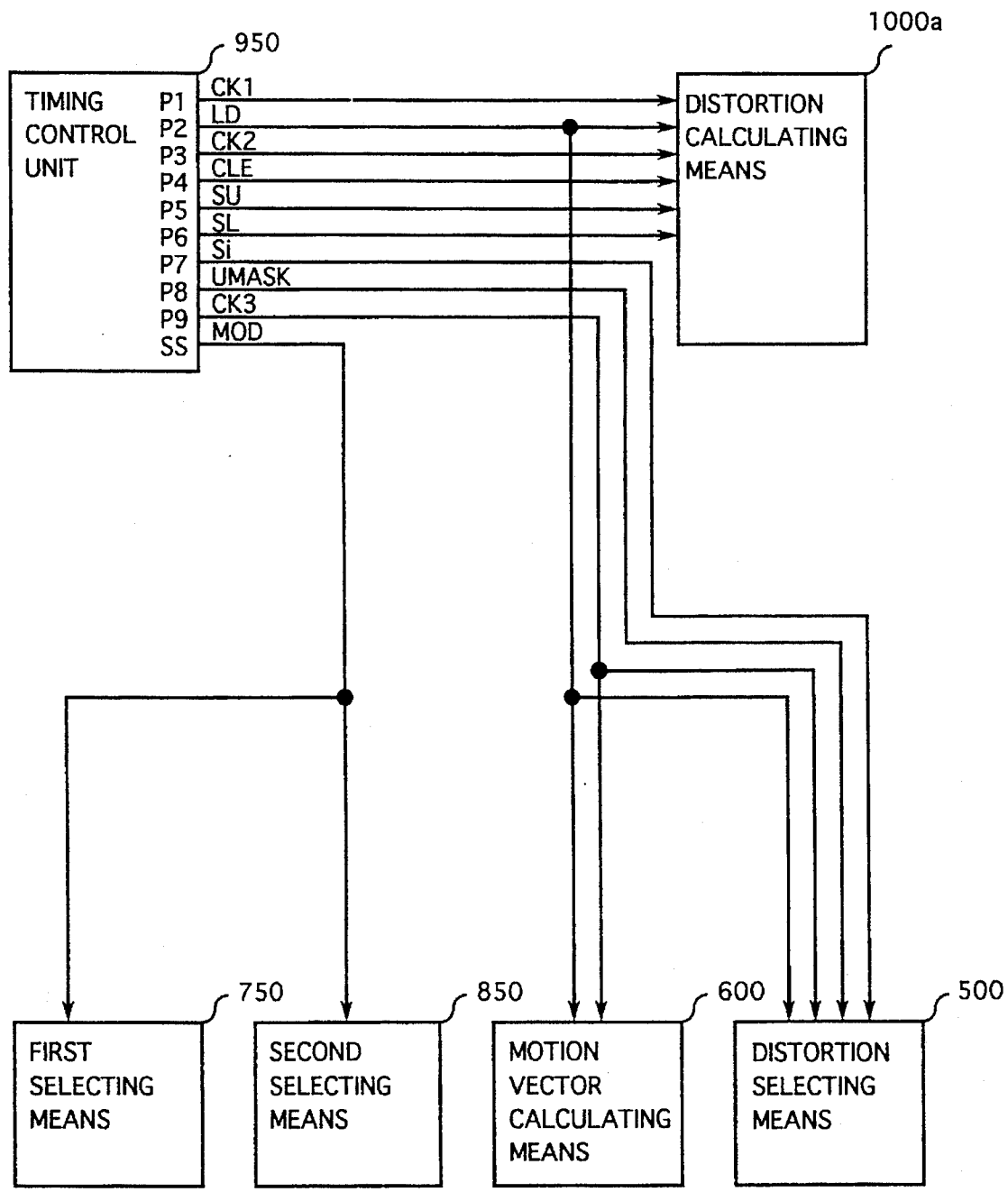
FIG. 36 is a block diagram showing a timing control unit and showing signals supplied from the timing control unit to first selecting means, second selecting means, distortion calculating means, distortion selecting means and the motion vector calculating means shown in FIG. 35.
Figure 37:
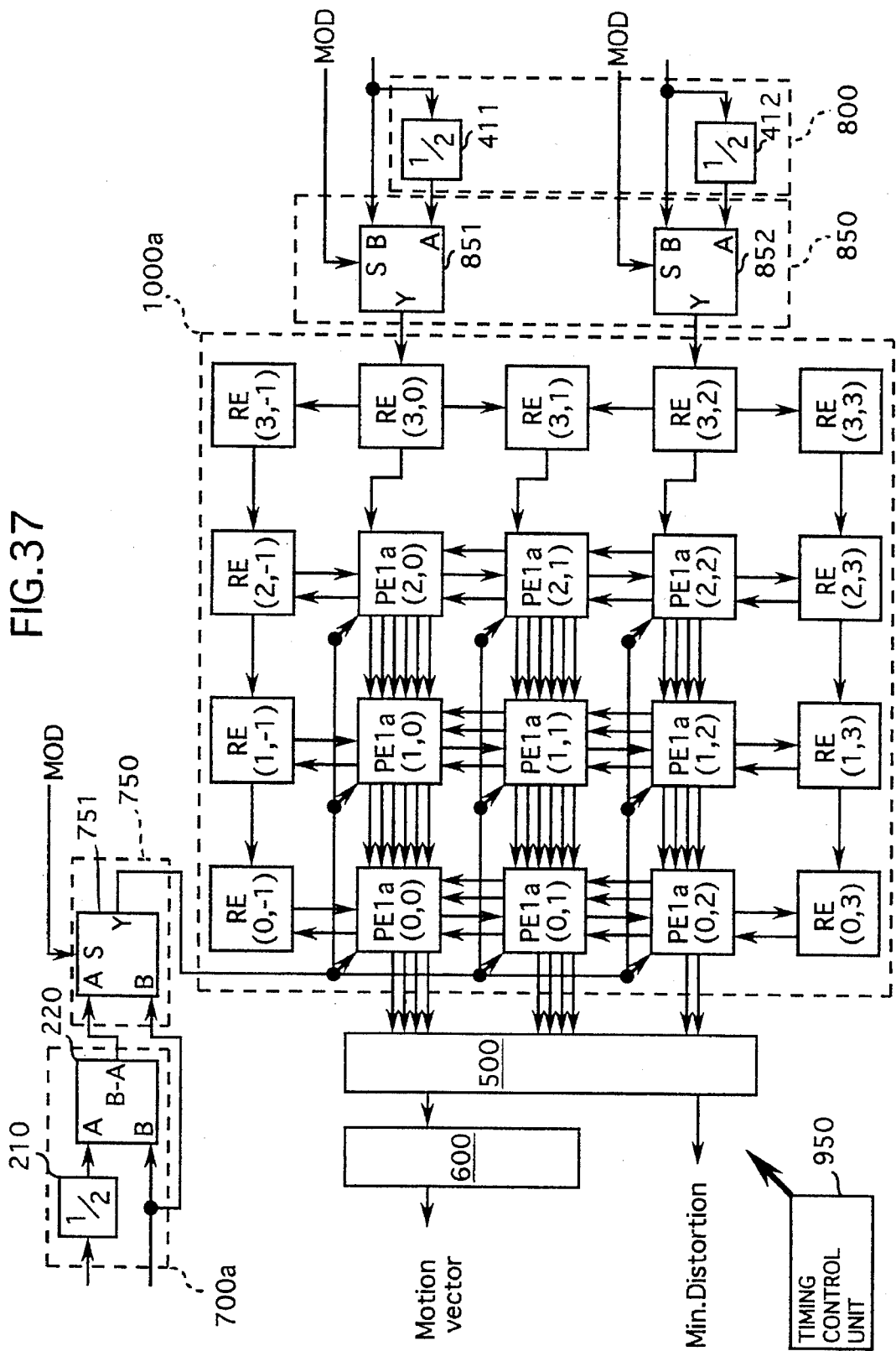
FIG. 37 is a block diagram showing a sixth embodiment of the estimation apparatus according to the present invention.

Referring to FIGS. 35 to 37 of the accompanying drawings, a preferred fifth embodiment of the motion estimation apparatus according to the present invention will be described hereinafter. The fifth embodiment of the motion estimation apparatus includes the same means and constitutional elements as the first embodiment of the motion estimation apparatus includes. The means and constitutional elements of the fifth embodiment are respectively designated by the reference numerals denoting the individual constitutional elements of the first embodiment for omitting repeated description thereof. The motion estimation apparatus is shown in FIG. 35 as comprising provisional template block obtaining means 700a, first selecting means 750, provisional candidate block obtaining means 800 and second selecting means 850. The provisional template block obtaining means 700a is operated to obtain a provisional template block by multiplying pel data sets of the specified reference 2 block by the first coefficient E and by subtracting the multiplied pel data sets of the specified reference block 2 from the pel data sets of the current block 1, respectively, so as to calculate pel data sets each indicative of a difference between each multiplied pel data set of the specified reference block 2 and each pel data set of the current block 1 corresponding in position to each other. The first selecting means 750 is operated to select one from the current block 1 and the provisional template block and output the selected block as a template block. The provisional candidate block obtaining means 800 is operated to obtain provisional candidate blocks by multiplying, by a second coefficient F, each of the pel data sets of the reference blocks 3c included in the search window 3. The second selecting means 850 is operated to select one from a group of the candidate blocks 3c and a group of the provisional candidate blocks and output the selected blocks as candidate blocks. The reference blocks are selected when the current blocks are selected by the provisional template block obtaining means 700a. The provisional candidate blocks are selected when the provisional template blocks are selected by the provisional template block obtaining means 700a.

The motion estimation apparatus is shown in FIG. 36 as comprising a timing control unit 950 which generates and outputs the same signals CK1, LD, CK2, CLE, SU, SL, Si, UMASK and CK3 as the timing control unit 900 does. The timing control unit 950 further generates a control signal MOD and outputs the control signal to the first selecting means 750 and the second selecting means 850 through an output terminal SS. The selections by the first selecting means 750 and the second selecting means 850 are made in accordance with the control signal MOD from the timing control unit 950.

Figure 40:
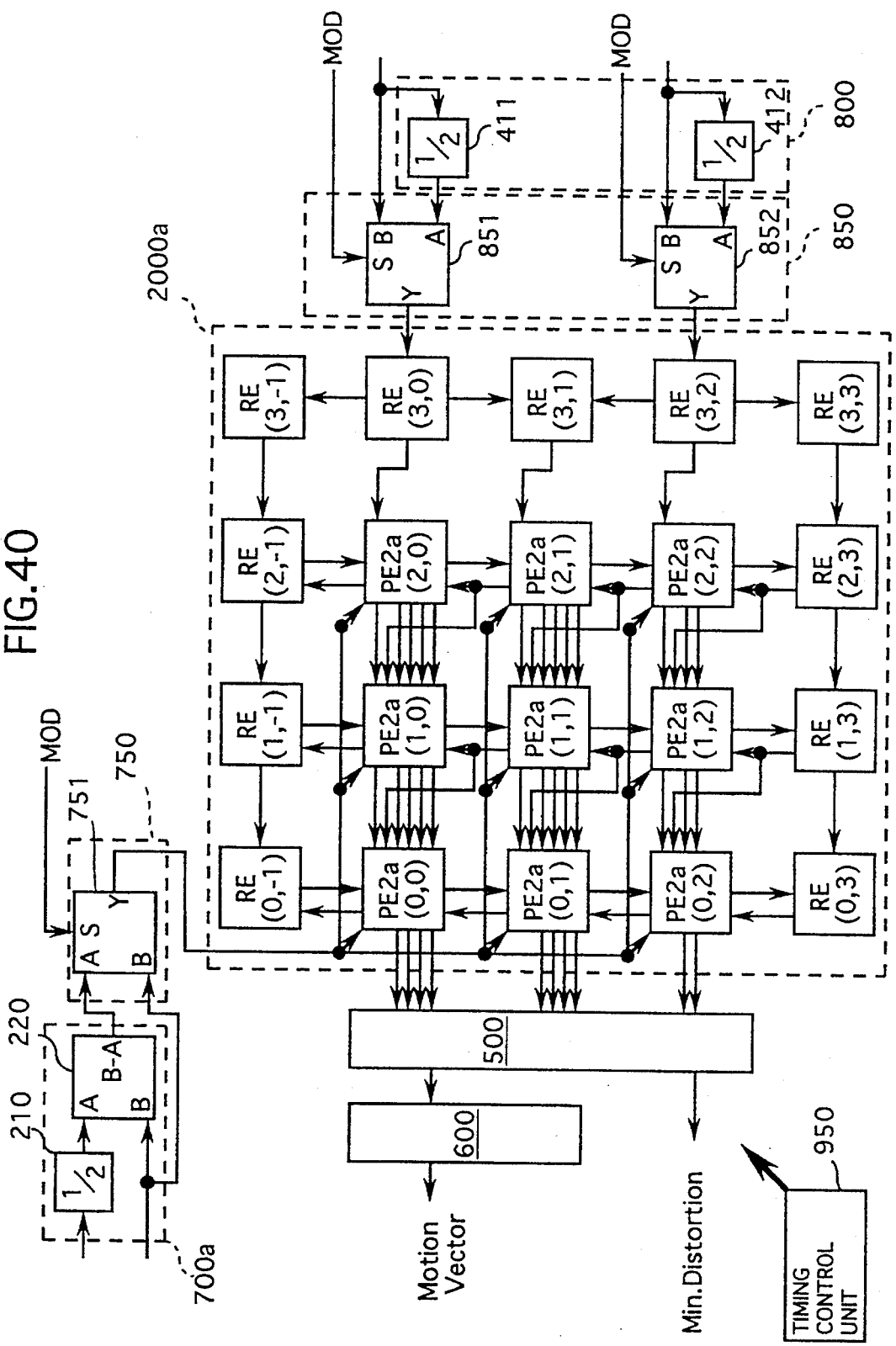
FIG. 40 is a block diagram showing an eighth embodiment of the motion estimation apparatus according to the present invention.

The provisional template block obtaining means 750a, the first selecting means 750, the provisional candidate block obtaining means 800 and the second selecting means 850 are concretely shown in FIGS. 37 and 40. The constitutional elements shown in FIGS. 37 and 40 are identical with those shown in FIGS. 8 and 30, respectively, except for the provisional template block obtaining means 750a, the first selecting means 750, the provisional candidate block obtaining means 800 and the second selecting means 850.

The provisional template block obtaining means 750a includes the multipliers 210 and subtracter 220 described hereinbefore. The first selecting means 750 comprises a selector 751 which has data input terminals A and B, a data output terminal Y and a signal input terminal S. The selector 751 is operated to receive data from the subtracter 220 through the data input terminal A and data indicative of the current block through data input terminal B and select either of the data input terminal A and the data on the data input terminal B in accordance with the control signal MOD on the signal input terminal S. In the present embodiment, the data input terminal A of the selector 751 is selected when the control signal MOD is representative of "1". The data input terminal B of the selector 751 is selected when the control signal MOD is representative of "0". The selected data is transmitted from the selector 751 through the signal input terminal Y to the processor elements PE1a(x,y). According to the fifth embodiment of the motion estimation apparatus, one motion estimation apparatus serves not only as an apparatus capable of performing interpolation prediction or dual-prime prediction but also as another apparatus capable of performing forward or backward prediction.

Figure 38:
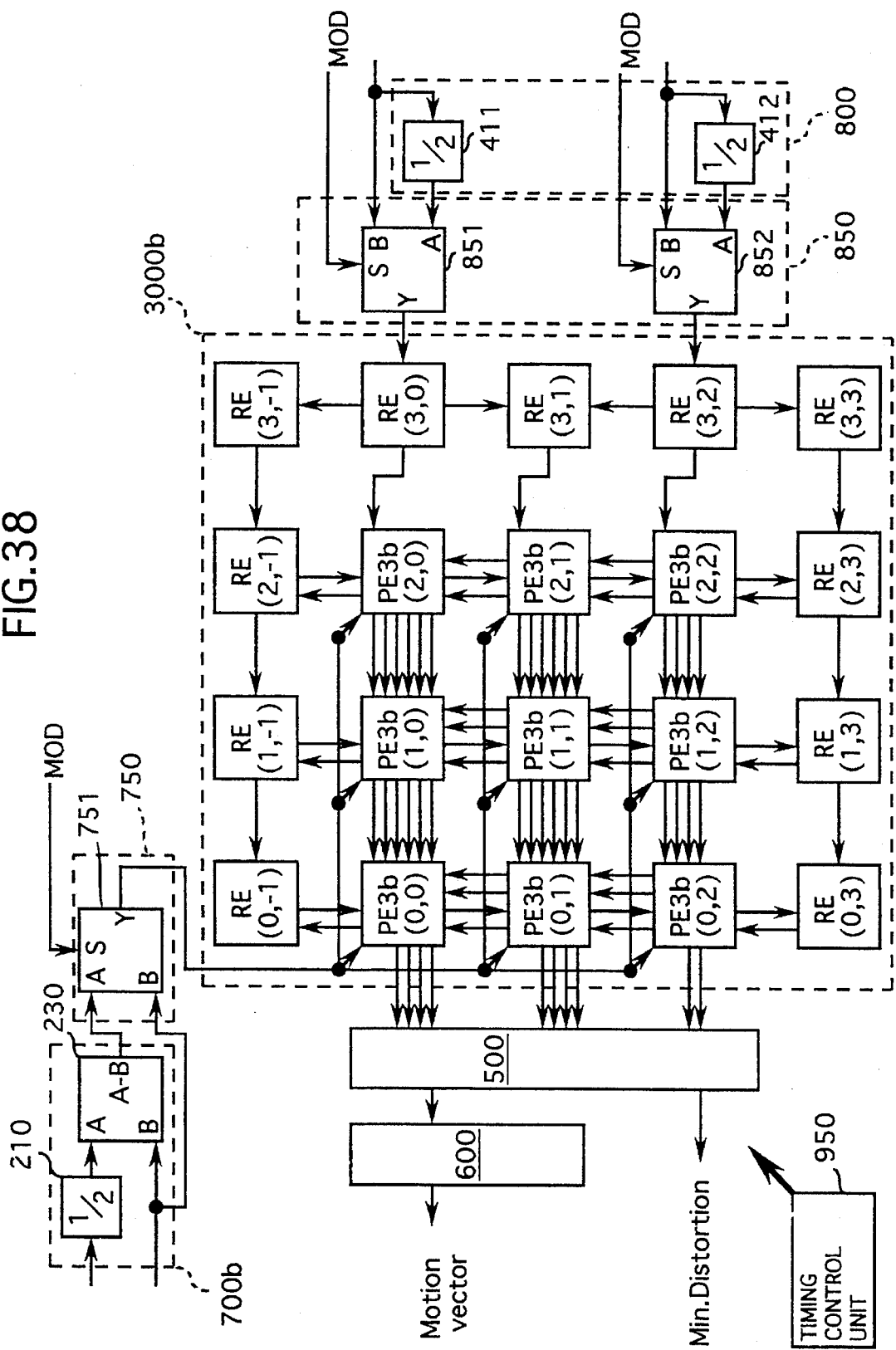
FIG. 38 is a block diagram showing a seventh embodiment of the estimation apparatus according to the present invention.
Figure 39:
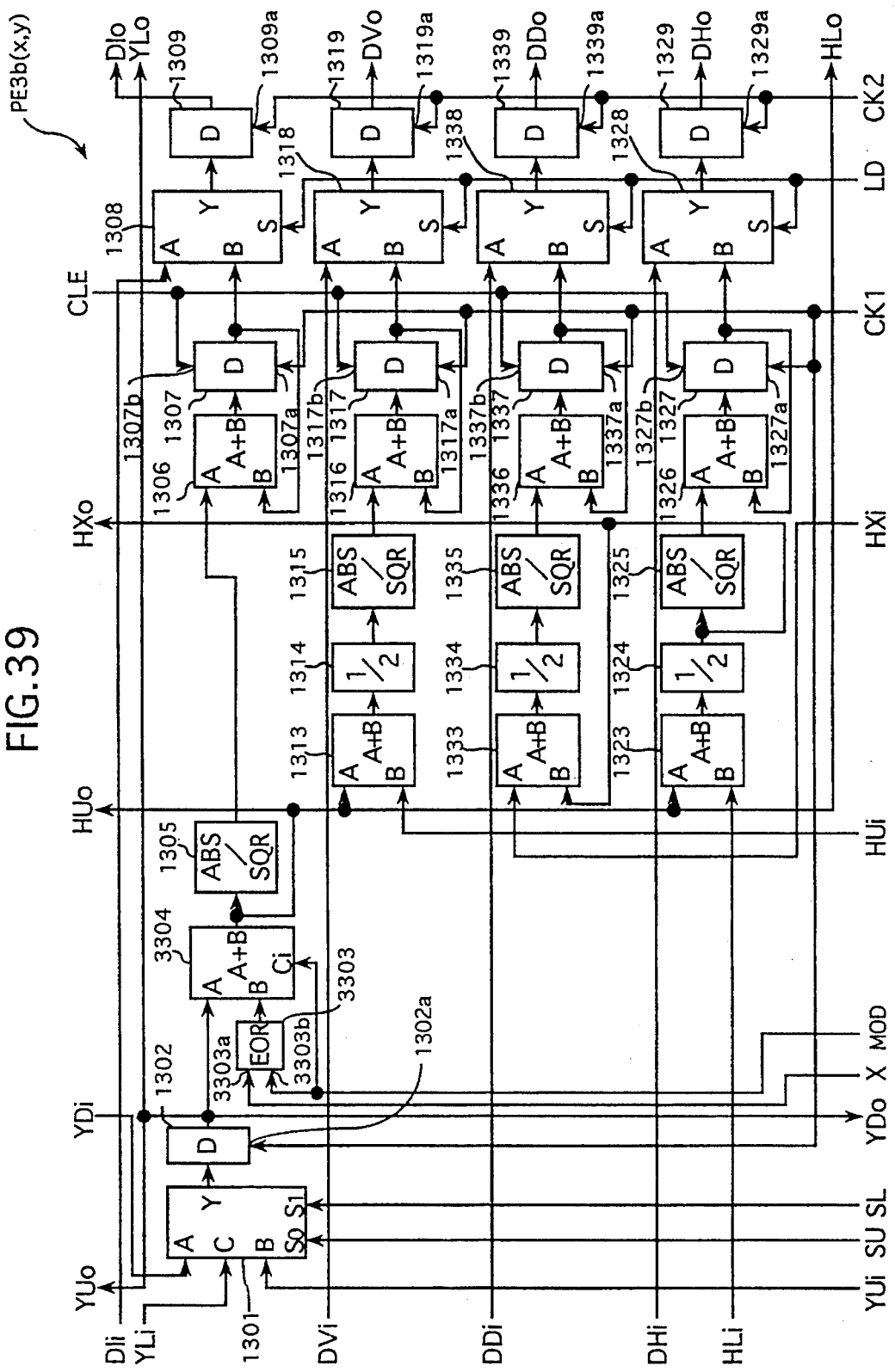
FIG. 39 is a block diagram showing a circuit of each of processor elements shown in FIG. 38.

Referring to FIGS. 38 and 39 of the accompanying drawings, a preferred sixth embodiment of the motion estimation apparatus according to the present invention will be described hereinafter. The sixth embodiment of the motion estimation apparatus includes the same means and constitutional elements as the second and fifth embodiments of the motion estimation apparatus does. The means and constitutional elements of the sixth embodiment are respectively designated by the reference numerals denoting the individual constitutional elements of the second and fifth embodiments for omitting repeated description thereof. As shown in FIG. 38, the motion estimation apparatus comprises nine processor elements PE3b(x,y). Each of the processor elements PE3b(x,y) includes an Exclusive-OR element 3303 and an adder 3304. The Exclusive-OR elements 3303 receives the pel data of the template block from the selector 751 shown in FIG. 38 and the control signal MOD from the timing control unit 950 shown in FIG. 38. When the control signal MOD is representative of "0", the Exclusive-OR element 3303 outputs the received pel data of the template block as it is. When the control signal MOD is representative of "1", the Exclusive-OR element 3303 changes bits representing the received pel data of the template block from "0" to "1" and from "1" to "0" and outputs the changed pel data. When the control signal MOD is representative of "0", the adder 3304 adds the pel data of the candidate block from the D flip-flop 1302 and the changed pel data from the Exclusive-OR element 3303 and transmits the added data to the positive value transducer 1305. When the control signal MOD is representative of "1", the adder 3304 adds the pel data from the D flip-flop 1302, the changed pel data and data representative of "1", and transmits the added data to the positive value transducer 1305. The sixth embodiment of the motion estimation apparatus also can calculate the same motion vector as the apparatus shown in FIG. 26.

Referring to FIG. 40 of the accompanying drawings, a preferred seventh embodiment of the motion estimation apparatus according to the present invention will be described hereinafter. The seventh embodiment of the motion estimation apparatus includes the same means and constitutional elements as the third and fifth embodiments of the motion estimation apparatus does. The means and constitutional elements of the seventh embodiment are respectively designated by the reference numerals denoting the individual constitutional elements of the third and fifth embodiments for omitting repeated description thereof. The seventh embodiment of the motion estimation apparatus also can calculate the same motion vector as the apparatus shown in FIG. 30.

Figure 41:
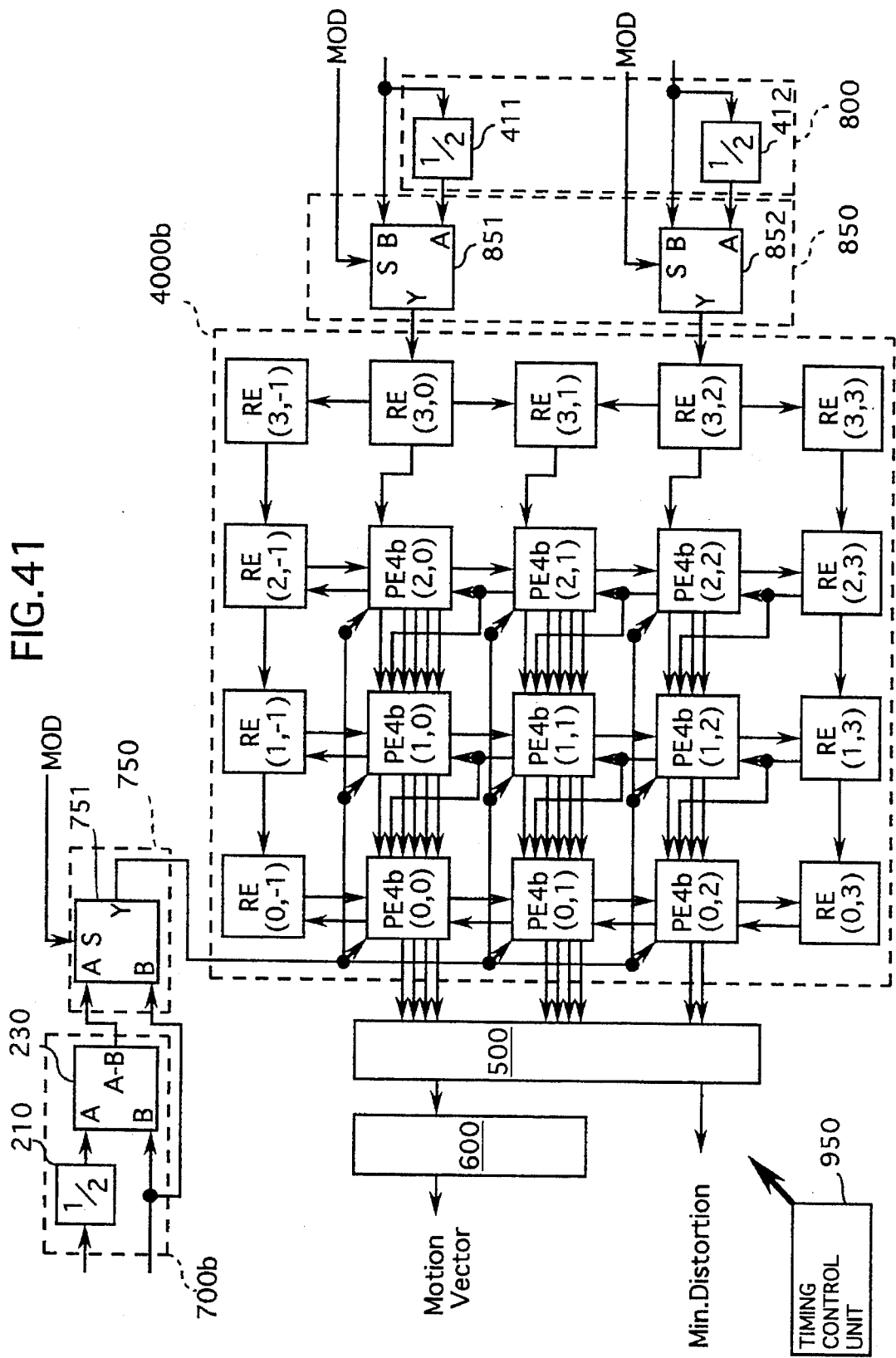
FIG. 41 is a block diagram showing a ninth embodiment of the motion estimation apparatus according to the present invention.
Figure 42:
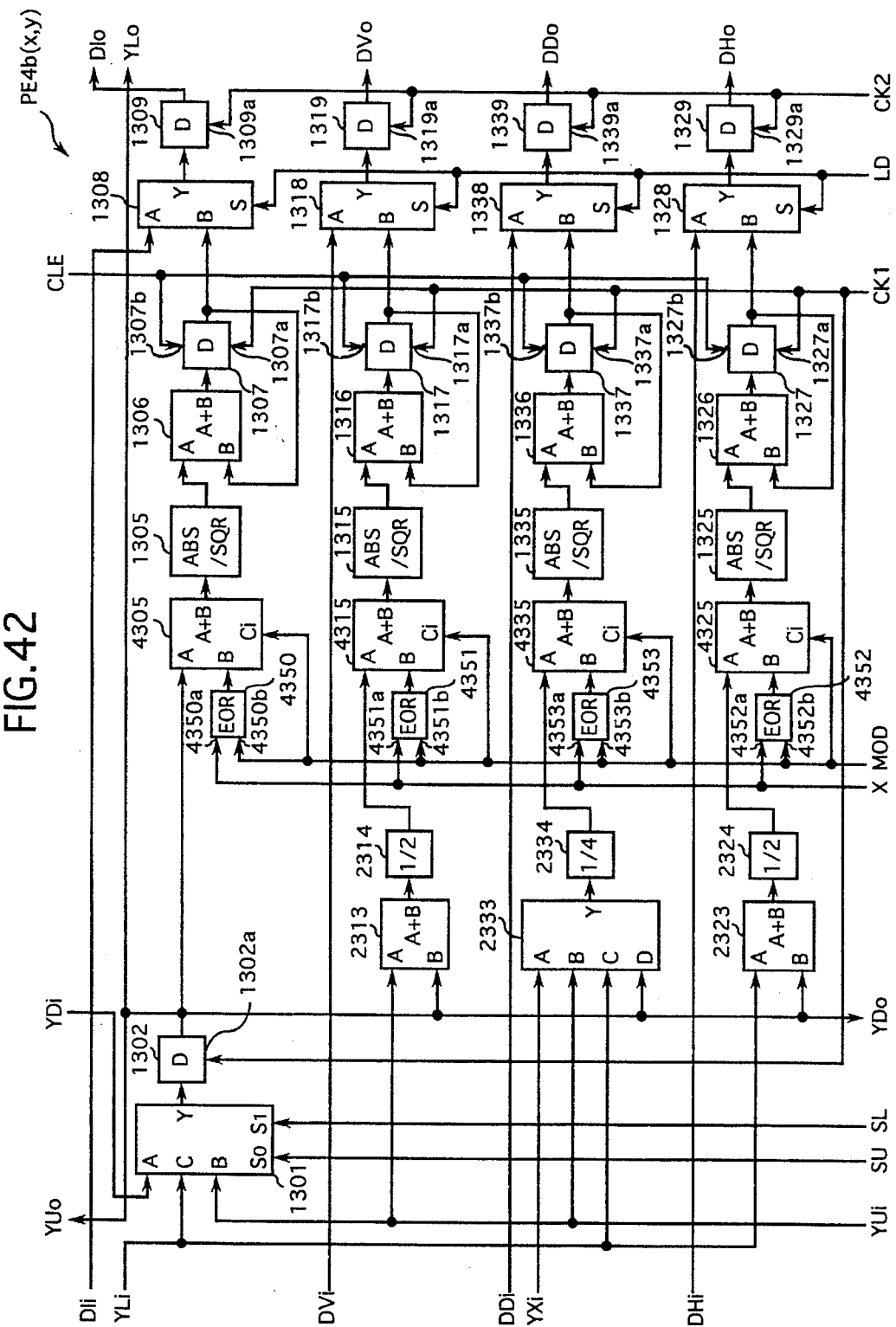
FIG. 42 is a block diagram showing a circuit of each of processor elements shown in FIG. 41.
Figure 43:
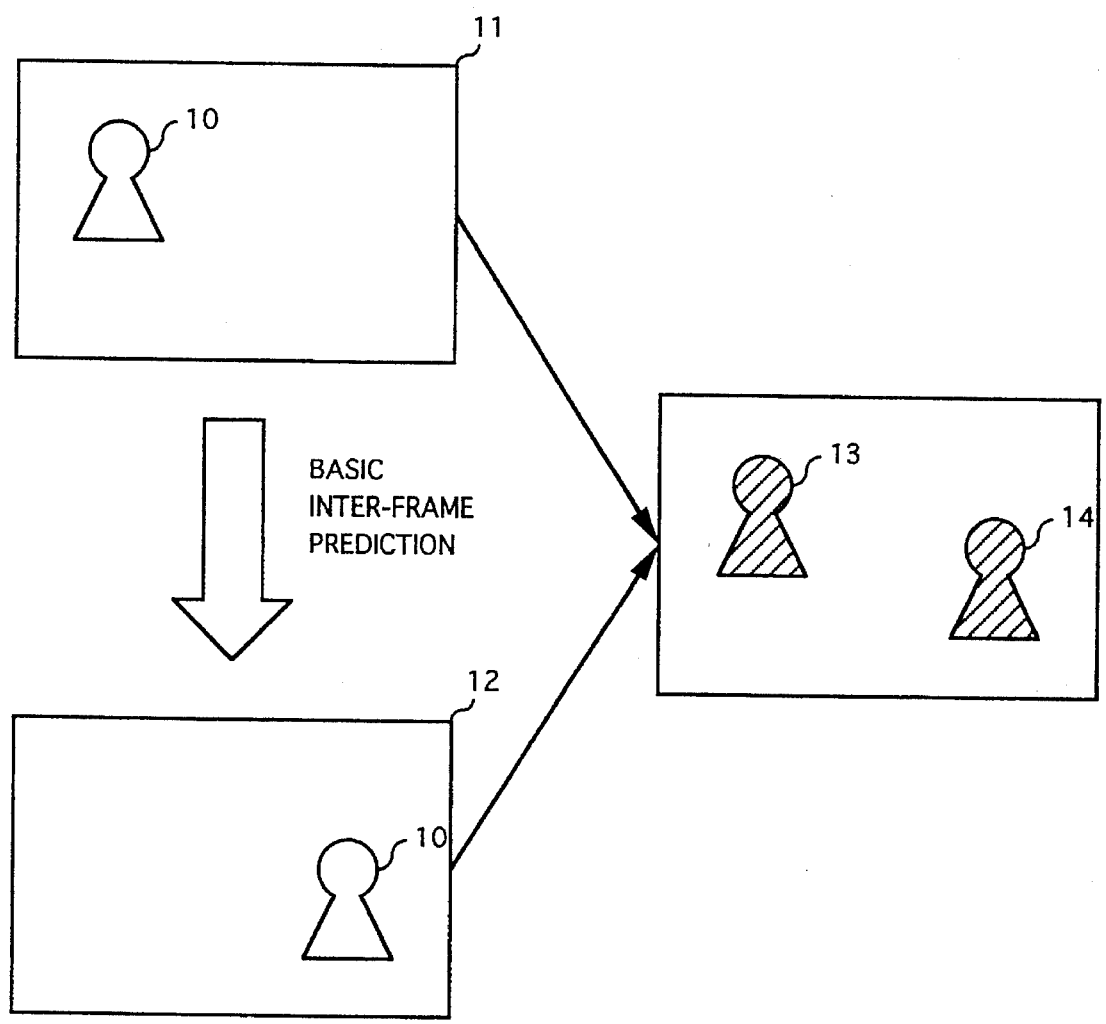
FIG. 43 is a diagram for explaining a conventional basic inter-frame predicting coding method.
Figure 44:
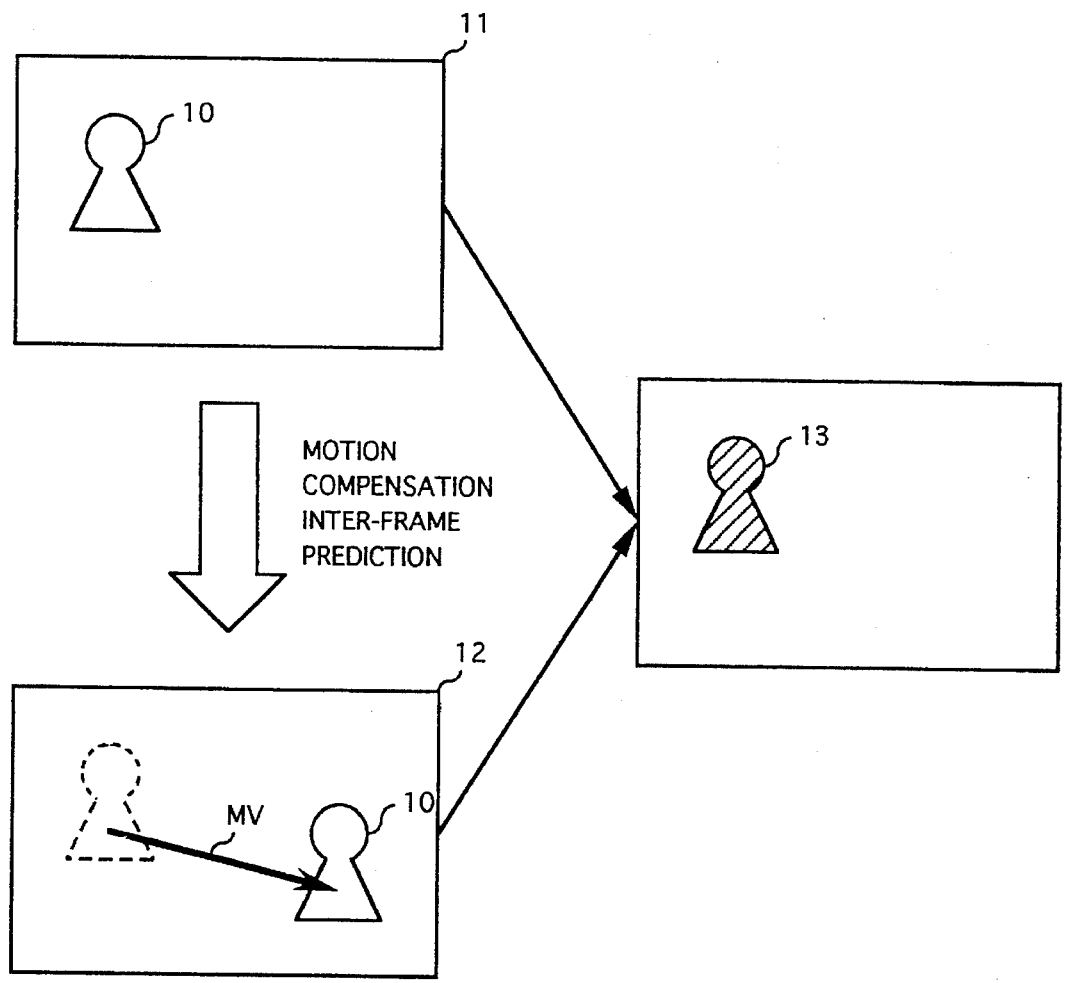
FIG. 44 is a diagram for explaining a conventional motion compensation inter-frame predicting coding method.

Referring to FIGS. 41 and 42 of the accompanying drawings, a preferred eighth embodiment of the motion estimation apparatus according to the present invention will be described hereinafter. The eighth embodiment of the motion estimation apparatus includes the same means and constitutional elements as the fourth and fifth embodiments of the motion estimation apparatus does. The means and constitutional elements of the eighth embodiment are respectively designated by the reference numerals denoting the individual constitutional elements of the fourth and fifth embodiments for omitting repeated description thereof. The motion estimation apparatus is shown in FIG. 41 as comprising nine processor elements PE4b(x,y). As shown in FIG. 42, each of the processor elements PE4b(x,y) comprises adders 4305, 4315, 4325 and 4335, and Exclusive-OR elements 4350, 4351, 4352 and 4353. The Exclusive-OR elements 4350 receives the pel data of the template block from the selector 751 shown in FIG. 41 and the control signal MOD from the timing control unit 950 shown in FIG. 41. When the control signal MOD is representative of "0", each of the Exclusive-OR elements 4350, 4351, 4352 and 4353 outputs the received pel data of the template block as it is. When the control signal MOD is representative of "1", each of the Exclusive-OR elements 4350, 4351, 4352 and 60 4353 changes bits representing the received pel data from "1" to "0" and from "0" to "1". When the control signal MOD is representative of "0", the adder 4305 adds the pel data from the D flip-flop 1302 and the changed pel data, and transmits the added data to the positive value transducer 1305. When the control signal MOD is representative of "1", the adder 4305 adds the pel data from the D flip-flop 1302, the changed pel data and data representative of "1", and transmits the added data to the positive value transducer 1305. When the control signal MOD is representative of "0", the adder 4315 adds the pel data from the multiplier 2314 and the changed pel data, and transmits the added data to the positive value transducer 1315. When the control signal MOD is representative of "1", the adder 4315 adds the pel data from the multiplier 2314, the changed pel data and data representative of "1", and transmits the added data to the positive value transducer 13 15. When the control signal MOD is representative of "0", the adder 4325 adds the pel data from the multiplier 2324 and the changed pel data, and transmits the added data to the positive value transducer 1325. When the control signal MOD is representative of "1", the adder 4325 adds the pel data from the multiplier 2324, the changed pel data and data representative of "1", and transmits the added data to the positive value transducer 1325. When the control signal MOD is representative of "0", the adder 4335 adds the pel data from the multiplier 2334 and the changed pel data, and transmits the added data to the positive value transducer 1335. When the control signal MOD is representative of "1", the adder 4335 adds the pel data from the multiplier 2334, the changed pel data and data representative of "1", and transmits the added data to the positive value transducer 1335. The eighth embodiment of the motion estimation apparatus also can calculate the same motion vector as the apparatus shown in FIG. 30.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A motion estimation method for calculating a motion vector to estimate a current picture partially forming a video sequence on the basis of first and second reference pictures partially forming said video sequence, said current picture being partially formed by a current block including a plurality of pels represented by pel data sets, respectively, said first reference picture being formed by reference blocks each equal in size to said current block, each of the reference blocks of said first reference picture including a plurality of pels represented by pel data sets, respectively, said second reference picture being formed by reference blocks each equal in size to said current block, each of the reference blocks of said second reference picture including a plurality of pels represented by pel data sets, respectively, and said motion vector being indicative of a displacement between said current block and one of the reference blocks of said second reference picture, comprising the steps of:

(a) specifying a reference block similar to said current block from among the reference blocks of said first reference picture;

(b) multiplying each pel data set of the specified reference block by a first coefficient;

(c) obtaining a template block by calculating pel data sets each indicative of a difference between each multiplied pel data set of the specified reference block and each pel data set of the current block corresponding in position to each other;

(d) specifying part or the whole of said second reference picture as a search window;

(e) obtaining candidate blocks by multiplying, by a second coefficient, each of the pel data sets of the reference blocks included in said search window;

(f) calculating, on the basis of the pel data sets of each of candidate blocks and the pel data sets of said template block, distortion values each indicative of a difference between each of interpolated blocks and said current block, each of the interpolated blocks being indicative of a mean between the specified reference block of said first reference picture and each of the reference blocks of said search window;

(g) selecting a minimum distortion value from among the distortion values; and (h) specifying a reference block of said second reference picture bringing the minimum distortion value to obtain said motion vector.

2. A motion estimation method as set forth in claim 1, in which said obtaining step (c) comprises the step (c1) of subtracting the multiplied pel data sets of the specified reference block from the pel data sets of said current block, respectively, to obtain said template block, said calculating step (f) comprising the steps of:

(f1) subtracting the pel data sets of said template block from the pel data sets of each candidate block, respectively, to obtain local distortion values each indicative of a difference between each pel data set of each of the interpolated blocks and each pel data set of said template block;

(f2) converting the calculated local distortion values into positive values; and (f3) summing up the converted local distortion values to obtain said interpolated blocks.

3. A motion estimation method as set forth in claim 1, in which the specifying step (a) comprises the step (a1) of selecting one most similar to said current block from among the reference blocks of said first reference picture by using of a motion compensation inter-frame predictive coding algorithm.

4. A motion estimation method as set forth in claim 1, in which said search window is specified on the basis of a displacement between said current block and the specified reference block of said first reference picture in said specified step (d).

5. A motion estimation method as set forth in claim 4, in which said specifying step (d) comprises the step of:

(d1) calculating a motion vector indicative of the displacement between said current block and the specified reference block of said first reference picture; and (d2) scaling the motion vector estimated in said estimating step (d1) with respect to said second reference picture to obtain a point on said first reference picture, said search window being specified so as to include the point.

6. A motion estimation method as set forth in claim 2, in which the local distortion values are converted to positive values through absolute value arithmetic in said converting step (f2).

7. A motion estimation method as set forth in claim 2, in which the local distortion values are converted to positive values through square arithmetic in said converting step (f2).

8. A motion estimation method as set forth in claim 1, in which said current picture, said first reference picture and said second reference picture form pictures of said video sequence at time t0, t1 and t2, respectively, t0, t1 and t2 being defined as $|t0-t1| \leq |t0-t2|$.

9. A motion estimation method as set forth in claim 1, in which said current picture, said first reference picture and said second reference picture form pictures of said video sequence at time t0, t1 and t2, respectively, t0, t1 and t2 being defined as $|t0-t1| > |t0-t2|$.

10. A motion estimation method as set forth in claim 1, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said calculating step (f) comprising the steps of:

(f1) calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;

(f2) calculating the sum of two of the first difference data sets vertically deviated by half-pel pitch from each other and multiplying the sum by ½ to obtain second difference data sets;

(f3) calculating the sum of two of the first difference data sets horizontally deviated by half-pel pitch from each other and multiplying the sum by ½ to obtain third difference data sets;

(f4) calculating the sum of two of the second difference data sets horizontally deviated by half-pel pitch from each other and multiplying the calculated sum by ½ to obtain fourth difference data sets;

(f5) converting the first, second, third and fourth difference data sets to positive values;

(f6) calculating the sum of the converted first difference data sets based on each of the first candidate blocks to obtain each of the first distortion values;

(f7) calculating the sum of the converted second difference data sets based on each of the second candidate blocks to obtain each of the second distortion values;

(f8) calculating the sum of the converted third difference data sets based on each of the third candidate blocks to obtain each of the third distortion values; and (f9) calculating the sum of the converted fourth difference data sets based on each of the fourth candidate blocks to obtain each of the fourth distortion values.

11. A motion estimation method as set forth in claim 1, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said calculating step (f) comprising the steps of:

(f1) calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;

(f2) calculating the sum of two of the first difference data sets vertically deviated by half-pel pitch from each other and multiplying the sum by ½ to obtain second difference data sets;

(f3) calculating the sum of two of the first difference data sets horizontally deviated by half-pel pitch from each other and multiplying the sum by ½ to obtain third difference data sets;

(f4) calculating the sum of two of the third difference data sets vertically deviated by half-pel pitch from each other and multiplying the calculated sum by ½ to obtain fourth difference data sets;

(f5) converting the first, second, third and fourth difference data sets to positive values;

(f6) calculating the sum of the converted first difference data sets based on each of the first candidate blocks to obtain each of the first distortion values;

(f7) calculating the sum of the converted second difference data sets based on each of the second candidate blocks to obtain each of the second distortion values;

(f8) calculating the sum of the converted third difference data sets based on each of the third candidate blocks to obtain each of the third distortion values; and (f9) calculating the sum of the converted fourth difference data sets based on each of the fourth candidate blocks to obtain each of the fourth distortion values.

12. A motion estimation method as set forth in claim 1, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said calculating step (f) comprising the steps of:

(f1) calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;

(f2) calculating the sum of two of the integer pel data sets included in said search window and vertically deviated by one-pel pitch from each other, and multiplying the sum by ½ to obtain second difference data sets;

(f3) calculating the sum of two of the integer pel data sets include in said search window and horizontally deviated by one-pel pitch from each other, and multiplying the sum by ½ to obtain third difference data sets;

(f4) calculating the sum of four of the integer pel data sets included in said search window and multiplying the sum by ¼ to obtain fourth difference data sets, said four of the integer pel data sets being arranged in the form of a square and deviated by one-pel pitch from one another;

(f5) converting the first, second, third and fourth difference data sets to positive values;

(f6) calculating the sum of the converted first difference data sets based on each of the first candidate blocks to obtain each of the first distortion values;

(f7) calculating the sum of the converted second difference data sets based on each of the second candidate blocks to obtain each of the second distortion values;

(f8) calculating the sum of the converted third difference data sets based on each of the third candidate blocks to obtain each of the third distortion values; and (f9) calculating the sum of the converted fourth difference data sets based on each of the fourth candidate blocks to obtain each of the fourth distortion values.

13. A motion estimation method as set forth in claim 1, in which said obtaining step (c) comprises the step (c1) of subtracting the pel data sets of said current block from the multiplied pel data sets of the specified reference block, respectively, to obtain said template block, said calculating step (f) comprising the steps of:

(f1) adding the pel data sets of said template block to the pel data sets of each candidate block, respectively, to obtain local distortion values each indicative of a difference between each pel data set of each of the interpolated blocks and each pel data set of said template block;

(f2) converting the calculated local distortion values into positive values; and (f3) summing up the converted local distortion values to obtain said interpolated blocks.

14. A motion estimation apparatus for calculating a motion vector to estimate a current picture partially forming a video sequence on the basis of first and second reference pictures partially forming said video sequence, said current picture being partially formed by a current block including a plurality of pels represented by pel data sets, respectively, said first reference picture being formed by reference blocks each equal in size to said current block, each of the reference blocks of said first reference picture including a plurality of pels represented by pel data sets, respectively, said second reference picture being formed by reference blocks each equal in size to said current block, each of the reference blocks of said second reference picture including a plurality of pels represented by pel data sets, respectively, and said motion vector being indicative of a displacement between said current block and one of the reference blocks of said second reference picture, comprising of:

- block specifying means for specifying a reference block similar to said current block from among the reference blocks of said first reference picture;
- template block obtaining means for obtaining a template block by multiplying each pel data set of the specified reference block by a first coefficient and by calculating pel data sets each indicative of a difference between each multiplied pel data set of the specified reference block and each pel data set of the current block corresponding in position to each other;
- search window specifying means for specifying part or the whole of said second reference picture as a search window;
- candidate block obtaining means for obtaining candidate blocks by multiplying, by a second coefficient, each of the pel data sets of the reference blocks included in said search window;
- distortion calculating means for calculating, on the basis of the pel data sets of each of candidate blocks and the pel data sets of said template block, distortion values each indicative of a difference between each of interpolated blocks and said current block, each of the interpolated blocks being indicative of a mean between the specified reference block of said first reference picture and each of the reference blocks of said search window;
- distortion selecting means for selecting a minimum distortion value from among the distortion values; and
- motion vector calculating means for calculating said motion vector by specifying a reference block of said second reference picture bringing the minimum distortion value.

15. A motion estimation apparatus as set forth in claim 14, in which said template block obtaining means (200a) comprises:

- a multiplying unit for multiplying the pel data sets of the specified reference block by said first coefficient; and
- a subtracting unit for subtracting the multiplied pel data sets of the specified reference block from the pel data sets of said current block, respectively, to obtain said template block.

16. A motion estimation apparatus as set forth in claim 15, in which said distortion calculating means comprises:

- a subtracting unit for subtracting the pel data sets of said template block from the pel data sets of each candidate block, respectively, to obtain local distortion values each indicative of a difference between each pel data set of each of the interpolated blocks and each pel data set of said template block;
- a converting unit for converting the calculated local distortion values into positive values; and
- a summing unit for summing up the converted local distortion values to obtain said interpolated blocks.

17. A motion estimation apparatus as set forth in claim 14, in which the pels of said current block are arranged in the form of a matrix array formed by M columns of N pels, said M and N being integers, respectively, the pels of said search window being arranged in the form of a matrix array formed by L columns of H pels, said L and H being integers greater than said M and N, respectively, said distortion calculating means comprising (L-M+1)×(H-N+1) processor elements each calculating each of said distortion values.

18. A motion estimation apparatus as set forth in claim 14, in which said block specifying means is operated to select one most similar to said current block from among the reference blocks of said first reference picture by using of a motion compensation inter-frame predictive coding algorithm.

19. A motion estimation apparatus as set forth in claim 14, in which said search window specifying means is operated to specify said search window on the basis of a displacement between said current block and the specified reference block of said first reference picture.

20. A motion estimation apparatus as set forth in claim 19, in which said search window specifying means comprises:

- estimating means for estimating a motion vector indicative of the displacement between said current block and the specified reference block of said first reference picture; and
- scaling means for scaling the motion vector estimated by estimating means with respect to said second reference picture to obtain a point on said first reference picture, said search window being specified so as to include the point.

21. A motion estimation apparatus as set forth in claim 16, in which said converting unit is operated to convert the local distortion values to positive values through absolute value arithmetic.

22. A motion estimation apparatus as set forth in claim 16, in which said converting unit is operated to convert the local distortion values to positive values through square arithmetic.

23. A motion estimation apparatus as set forth in claim 14, in which said current picture, said first reference picture and said second reference picture form pictures of said video sequence at time t0, t1 and t2, respectively, t0, t1 and t2 being defined as $|t0-t1| \leq |t0-t2|$.

24. A motion estimation apparatus as set forth in claim 14, in which said current picture, said first reference picture and said second reference picture form pictures of said video sequence at time t0, t1 and t2, respectively, t0, t1 and t2 being defined as $|t0-t1| > |t0-t2|$.

25. A motion estimation apparatus as set forth in claim 14, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said distortion calculating means comprising:

- first difference calculating means for calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;

second difference calculating means for calculating the sum of two of the first difference data sets vertically deviated by half-pel pitch from each other and multiplying the sum by ½ to obtain second difference data sets;

third difference calculating means for calculating the sum of two of the first difference data sets horizontally deviated by half-pel pitch from each other and multiplying the sum by ½ to obtain third difference data sets;

fourth difference calculating means for calculating the sum of two of the second difference data sets horizontally deviated by half-pel pitch from each other and multiplying the calculated sum by ½ to obtain fourth difference data sets;

first converting means for converting the first difference data sets to positive data sets;

second converting means for converting the second difference data sets to positive data sets;

third converting means for converting the third difference data sets to positive data sets;

fourth converting means for converting the fourth difference data sets to positive data sets;

first distortion calculating means for calculating the sum of the converted first difference data sets based on each of the first candidate blocks to obtain each of the first distortion values;

second distortion calculating means for calculating the sum of the converted second difference data sets based on each of the second candidate blocks to obtain each of the second distortion values;

third distortion calculating means for calculating the sum of the converted third difference data sets based on each of the third candidate blocks to obtain each of the third distortion values; and fourth distortion calculating means for calculating the sum of the converted fourth difference data sets based on each of the fourth candidate blocks to obtain each of the fourth distortion values.

26. A motion estimation apparatus as set forth in claim 14, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said distortion calculating means comprising:

first difference calculating means for calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;

second difference calculating means for calculating the sum of two of the first difference data sets vertically deviated by half-pel pitch from each other and multiplying the sum by ½ to obtain second difference data sets;

third difference calculating means for calculating the sum of two of the first difference data sets horizontally deviated by half-pel pitch from each other and multiplying the sum by ½ to obtain third difference data sets;

fourth difference calculating means for calculating the sum of two of the third difference data sets vertically deviated by half-pel pitch from each other and multiplying the calculated sum by ½ to obtain fourth difference data sets;

first converting means for converting the first difference data sets to positive data sets, respectively;

second converting means for converting the second difference data sets to positive data sets, respectively;

third converting means for converting the third difference data sets to positive data sets, respectively;

fourth converting means for converting the fourth difference data sets to positive data sets, respectively;

first distortion calculating means for calculating the sum of the converted first difference data sets based on each of the first candidate blocks to obtain each of the first distortion values;

second distortion calculating means for calculating the sum of the converted second difference data sets based on each of the second candidate blocks to obtain each of the second distortion values;

third distortion calculating means for calculating the sum of the converted third difference data sets based on each of the third candidate blocks to obtain each of the third distortion values; and fourth distortion calculating means for calculating the sum of the converted fourth difference data sets based on each of the fourth candidate blocks to obtain each of the fourth distortion values.

27. A motion estimation apparatus as set forth in claim 14, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said distortion calculating means comprising:

first difference calculating means for calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;

second difference calculating means for calculating the sum of two of the integer pel data sets included in said search window and vertically deviated by one-pel pitch from each other, and multiplying the sum by ½ to obtain second difference data sets;

third difference calculating means for calculating the sum of two of the integer pel data sets include in said search window and horizontally deviated by one-pel pitch from each other, and multiplying the sum by ½ to obtain third difference data sets;

fourth difference calculating means for calculating the sum of four of the integer pel data sets included in said search window and multiplying the sum by ¼× to obtain fourth difference data sets, said four of the integer pel data sets being arranged in the form of a square and deviated by one-pel pitch from one another;

first converting means for converting the first difference data sets to positive data sets, respectively;

second converting means for converting the second difference data sets to positive data sets, respectively;

third converting means for converting the second difference data sets to positive data sets, respectively;

fourth converting means for converting the third difference data sets to positive data sets, respectively;

first distortion calculating means for calculating the sum of the converted first difference data sets based on each of the first candidate blocks to obtain each of the first distortion values;

second distortion calculating means for calculating the sum of the converted second difference data sets based on each of the second candidate blocks to obtain each of the second distortion values;

third distortion calculating means for calculating the sum of the converted third difference data sets based on each of the third candidate blocks to obtain each of the third distortion values; and fourth distortion calculating means for calculating the sum of the converted fourth difference data sets based on each of the fourth candidate blocks to obtain each of the fourth distortion values.

28. A motion estimation apparatus as set forth in claim 14, in which said template block obtaining means comprises:

a multiplying unit for multiplying the pel data sets of the specified reference block by said first coefficient; and a subtracting unit for subtracting the pel data sets of said current block from the multiplied pel data sets of the specified reference block, respectively, to obtain said template block.

29. A motion estimation apparatus as set forth in claim 28, in which said distortion calculating means comprises:

an adding unit for adding the pel data sets of said template block to the pel data sets of each candidate block, respectively, to obtain local distortion values each indicative of a difference between each pel data set of each of the interpolated blocks and each pel data set of said template block;

a converting unit for converting the calculated local distortion values into positive values; and a summing unit for summing up the converted local distortion values to obtain said interpolated blocks.

30. A motion estimation apparatus for calculating a motion vector to estimate a current picture partially forming a video sequence on the basis of first and second reference pictures partially forming said video sequence, said current picture being partially formed by a current block including a plurality of pels represented by pel data sets, respectively, said first reference picture being formed by reference blocks each equal in size to said current block, each of the reference blocks of said first reference picture including a plurality of pels represented by pel data sets, respectively, said second reference picture being formed by reference blocks each equal in size to said current block, each of the reference blocks of said second reference picture including a plurality of pels represented by pel data sets, respectively, and said motion vector being indicative of a displacement between said current block and one of the reference blocks of said second reference picture, comprising of:

block specifying means for specifying a reference block similar to said current block from among the reference blocks of said first reference picture;

provisional template block obtaining means for obtaining a provisional template block by multiplying each pel data set of the specified reference block by a first coefficient and by subtracting the multiplied pel data sets of the specified reference block from the pel data sets of said current block, respectively;

first selecting means for selecting one from said current block and said provisional template block and outputting the selected current block as a template block;

search window specifying means for specifying part or the whole of said second reference picture as a search window;

provisional candidate block obtaining means for obtaining provisional candidate blocks by multiplying, by a second coefficient, each pel data set of the reference blocks included in said search window;

second selecting means for selecting one from a group of said reference blocks and a group of said provisional candidate blocks and outputting the selected reference blocks as candidate blocks, said reference blocks being selected when said current blocks are selected by said provisional template block obtaining means, and said provisional candidate blocks being selected when said provisional template blocks are selected by said provisional template block obtaining means;

distortion calculating means for calculating, on the basis of the pel data sets of each of candidate blocks and the pel data sets of said template block, distortion values each indicative of a difference between each of interpolated blocks and said current block, each of the interpolated blocks being indicative of a mean between the specified reference block of said first reference picture and each of the reference blocks of said search window;

distortion selecting means for selecting a minimum distortion value from among the distortion values; and motion vector calculating means for calculating said motion vector by specifying a reference block of said second reference picture bringing the minimum distortion value.

31. A motion estimation apparatus as set forth in claim 30, in which said distortion calculating means comprises:

a subtracting unit for subtracting the pel data sets of said template block from the pel data sets of each candidate block, respectively, to obtain local distortion values each indicative of a difference between each pel data set of each of the interpolated blocks and each pel data set of said template block;

a converting unit for converting the calculated local distortion values into positive values; and a summing unit for summing up the converted local distortion values to obtain said interpolated blocks.

32. A motion estimation apparatus as set forth in claim 30, in which the pels of said current block are arranged in the form of a matrix array formed by M columns of N pels, said M and N being integers, respectively, the pels of said search window being arranged in the form of a matrix array formed by L columns of H pels, said L and H being integers greater than said M and N, respectively, said distortion calculating means comprising (L-M+1)×(H-N+1) processor elements each calculating each of said distortion values.

33. A motion estimation apparatus as set forth in claim 30, in which said block specifying means is operated to select one most similar to said current block from among the reference blocks of said first reference picture by using of a motion compensation inter-frame predictive coding algorithm.

34. A motion estimation apparatus as set forth in claim 30, in which said search window specifying means is operated to specify said search window on the basis of a displacement between said current block and the specified reference block of said first reference picture.

35. A motion estimation apparatus as set forth in claim 34, in which said search window specifying means comprises:

estimating means for estimating a motion vector indicative of the displacement between said current block and the specified reference block of said first reference picture; and scaling means for scaling the motion vector estimated by estimating means with respect to said second reference picture to obtain a point on said first reference picture, said search window being specified so as to include the point.

36. A motion estimation apparatus as set forth in claim 31, in which said converting unit is operated to convert the local distortion values to positive values through absolute value arithmetic.

37. A motion estimation apparatus as set forth in claim 31, in which said converting unit is operated to convert the local distortion values to positive values through square arithmetic.

38. A motion estimation apparatus as set forth in claim 30, in which said current picture, said first reference picture and said second reference picture form pictures of said video sequence at time t0, t1 and t2, respectively, t0, t1 and t2 being defined as |t0−t1|≦|t0−t2|.

39. A motion estimation apparatus as set forth in claim 30, in which said current picture, said first reference picture and said second reference picture (Pc) form pictures of said video sequence at time t0, t1 and t2, respectively, t0, t1 and t2 being defined as |t0−t1|>|t0−t2|.

40. A motion estimation apparatus as set forth in claim 30, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said distortion calculating means comprising:

first difference calculating means for calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;

second difference calculating means for calculating the sum of two of the first difference data sets vertically deviated by half-pel pitch from each other and multiplying the sum by ½ to obtain second difference data sets;

third difference calculating means for calculating the sum of two of the first difference data sets horizontally deviated by half-pel pitch from each other and multiplying the sum by ½ to obtain third difference data sets;

fourth difference calculating means for calculating the sum of two of the second difference data sets horizontally deviated by half-pel pitch from each other and multiplying the calculated sum by ½ to obtain fourth difference data sets;

first converting means for converting the first difference data sets to positive data sets;

second converting means for converting the second difference data sets to positive data sets;

third converting means for converting the third difference data sets to positive data sets;

fourth converting means for converting the fourth difference data sets to positive data sets;

first distortion calculating means for calculating the sum of the converted first difference data sets based on each of the first candidate blocks to obtain each of the first distortion values;

second distortion calculating means for calculating the sum of the converted second difference data sets based on each of the second candidate blocks to obtain each of the second distortion values;

third distortion calculating means for calculating the sum of the converted third difference data sets based on each of the third candidate blocks to obtain each of the third distortion values; and fourth distortion calculating means for calculating the sum of the converted fourth difference data sets based on each of the fourth candidate blocks to obtain each of the fourth distortion values.

41. A motion estimation apparatus as set forth in claim 30, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said distortion calculating means comprising:

- first difference calculating means for calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;
- second difference calculating means for calculating the sum of two of the first difference data sets vertically deviated by half-pel pitch from each other and multiplying the sum by ½ to obtain second difference data sets;
- third difference calculating means for calculating the sum of two of the first difference data sets horizontally deviated by half-pel pitch from each other and multiplying the sum by ½ to obtain third difference data sets;
- fourth difference calculating means for calculating the sum of two of the third difference data sets vertically deviated by half-pel pitch from each other and multiplying the calculated sum by ½ to obtain fourth difference data sets;
- first converting means for converting the first difference data sets to positive data sets, respectively;
- second converting means for converting the second difference data sets to positive data sets, respectively;
- third converting means for converting the third difference data sets to positive data sets, respectively;
- fourth converting means for converting the fourth difference data sets to positive data sets, respectively;
- first distortion calculating means for calculating the sum of the converted first difference data sets based on each of the first candidate blocks to obtain each of the first distortion values;
- second distortion calculating means for calculating the sum of the converted second difference data sets based on each of the second candidate blocks to obtain each of the second distortion values;
- third distortion calculating means for calculating the sum of the converted third difference data sets based on each of the third candidate blocks to obtain each of the third distortion values; and
- fourth distortion calculating means for calculating the sum of the converted fourth difference data sets based on each of the fourth candidate blocks to obtain each of the fourth distortion values.

42. A motion estimation apparatus as set forth in claim 30, in which the candidate blocks consists of first candidate blocks, second candidate blocks each vertically deviated by half-pel pitch from each of the first candidate blocks, third candidate blocks each horizontally deviated by half-pel pitch from each of the first candidate blocks, and fourth candidate blocks each diagonally deviated by half-pel pitch from each of the first candidate blocks, the first candidate blocks being formed by integer pels, the second, third and fourth candidate blocks being formed by half-pels interposed between two of integer pels adjacent to each other, the integer pels of the first candidate blocks being represented by integer pel data sets, respectively, the half pels of each of the second, third and fourth candidate blocks being represented by half pel data sets, respectively, said distortion values consisting of first distortion values based on the first candidate blocks, second distortion values based on the second candidate blocks, respectively, third distortion values based on the third candidate blocks, respectively, fourth distortion values based on the fourth candidate blocks, respectively, and said distortion calculating means comprising:

- first difference calculating means for calculating, on the basis of the integer pel data sets of each of the first candidate blocks and the integer pel data sets of said template block, first difference data sets each indicative of a difference between each pel data set of each of said interpolated blocks and each integer pel data set of said current block corresponding in position to each other;
- second difference calculating means for calculating the sum of two of the integer pel data sets included in said search window and vertically deviated by one-pel pitch from each other, and multiplying the sum by ½ to obtain second difference data sets;
- third difference calculating means for calculating the sum of two of the integer pel data sets include in said search window and horizontally deviated by one-pel pitch from each other, and multiplying the sum by ½ to obtain third difference data sets;
- fourth difference calculating means for calculating the sum of four of the integer pel data sets included in said search window and multiplying the sum by ¼ to obtain fourth difference data sets, said four of the integer pel data sets being arranged in the form of a square and deviated by one-pel pitch from one another;
- first converting means for converting the first difference data sets to positive data sets, respectively;
- second converting means for converting the second difference data sets to positive data sets, respectively;
- third converting means for converting the second difference data sets to positive data sets, respectively;
- fourth converting means for converting the third difference data sets to positive data sets, respectively;
- first distortion calculating means for calculating the sum of the converted first difference data sets based on each of the first candidate blocks to obtain each of the first distortion values;
- second distortion calculating means for calculating the sum of the converted second difference data sets based on each of the second candidate blocks to obtain each of the second distortion values;
- third distortion calculating means for calculating the sum of the converted third difference data sets based on each of the third candidate blocks to obtain each of the third distortion values; and
- fourth distortion calculating means for calculating the sum of the converted fourth difference data sets based on each of the fourth candidate blocks to obtain each of the fourth distortion values.

* * * * *